(12) United States Patent
Theodore et al.

(10) Patent No.: US 9,566,553 B2
(45) Date of Patent: Feb. 14, 2017

(54) FLUID SEPARATION ASSEMBLY AND METHOD

(71) Applicant: The Boeing Company, Chicago, IL (US)

(72) Inventors: Brent Kenneth Theodore, Rossmoor, CA (US); Donald Ray Snow, Jr., Fountain Valley, CA (US); James P. Huang, Irvine, CA (US); Michael J. Robinson, Huntington Beach, CA (US); Ivana Jojic, Bellevue, WA (US); Benjamin Bikson, Newton, MA (US)

(73) Assignees: The Boeing Company, Chicago, IL (US); Porogen Corporation, Woburn, MA (US)

( * ) Notice: Subject to any disclaimer, the term of this patent is extended or adjusted under 35 U.S.C. 154(b) by 0 days.

(21) Appl. No.: 14/803,026

(22) Filed: Jul. 17, 2015

(65) Prior Publication Data

US 2015/0344146 A1 Dec. 3, 2015

Related U.S. Application Data

(63) Continuation-in-part of application No. 13/411,548, filed on Mar. 3, 2012, now Pat. No. 9,084,962.

(Continued)

(51) Int. Cl.
*B01D 53/22* (2006.01)
*B01D 63/02* (2006.01)
(Continued)

(52) U.S. Cl.
CPC ............ *B01D 63/025* (2013.01); *B01D 63/02* (2013.01); *B01D 63/022* (2013.01); *B64D 37/32* (2013.01);
(Continued)

(58) Field of Classification Search
CPC ........ B01D 53/228; B01D 53/22; B01D 63/02; B01D 63/022; B01D 63/025; B01D 2053/224; B01D 2256/10; B01D 2257/104; B01D 2257/502; B01D 2257/00; B01D 2313/10; B01D 2313/12; B01D 2313/21; B01D 2313/38; B01D 2319/04; B01D 2257/80; B64D 37/32; B64D 2013/0677; Y02T 50/44
See application file for complete search history.

(56) References Cited

U.S. PATENT DOCUMENTS 3,968,192 A 7/1976 Hoffman, III et al.
4,061,574 A 12/1977 Clark
(Continued)

FOREIGN PATENT DOCUMENTS

EP 0798034 A1 10/1997
EP 1108458 A1 6/2001
(Continued)

OTHER PUBLICATIONS

Federal Aviation Regulation (FAR) Part 25 Section 25.981(b) effective as of Sep. 19, 2008, "Fuel tank ignition prevention", http://www.airweb.faa.gov/Regulatory_and_Guidance_Library/rgFAR.nsf/0/339DAEE3E0A6379D862574CF00641951?OpenDocument, 3 pages.
(Continued)

*Primary Examiner* — Anthony Shumate

(57) ABSTRACT

A fluid separation assembly and method are provided. The assembly has a hollow fiber bundle with a plurality of hollow fiber membranes. The assembly further has a pair of tubesheets, each encapsulating respective ends of the hollow fiber bundle. The assembly further has a plurality of radial through openings formed along a circumference of one or both of the tubesheets and radially through a body portion in
(Continued)

one or both of the tubesheets. The radial through openings include center connected radial through openings and partial radial through openings, and intersect each, or substantially each, of the hollow fiber membranes. The assembly further has a housing surrounding the hollow fiber bundle and the tubesheets. The housing has a feed inlet port, a permeate outlet port, and a non-permeate outlet port. The feed inlet port and the non-permeate outlet port are in parallel alignment with a longitudinal central axis of the housing.

20 Claims, 27 Drawing Sheets

Related U.S. Application Data

(60) Provisional application No. 61/494,867, filed on Jun. 8, 2011.

(51) Int. Cl.
  *B64D 37/32* (2006.01)
  *B64D 13/06* (2006.01)

(52) U.S. Cl.
  CPC ..... *B01D 2053/224* (2013.01); *B01D 2256/10* (2013.01); *B01D 2257/104* (2013.01); *B01D 2257/502* (2013.01); *B01D 2257/80* (2013.01); *B01D 2313/10* (2013.01); *B01D 2313/12* (2013.01); *B01D 2313/21* (2013.01); *B01D 2313/38* (2013.01); *B64D 2013/0677* (2013.01); *Y02T 50/44* (2013.01)

(56) References Cited

U.S. PATENT DOCUMENTS

| | | | |
|---|---|---|---|
| 4,219,613 A | 8/1980 | Anand et al. | |
| 4,263,017 A * | 4/1981 | Karn | B01D 53/22 210/321.74 |
| 4,451,369 A * | 5/1984 | Sekino | B01D 53/22 210/321.9 |
| 4,652,373 A | 3/1987 | Trimmer | |
| 5,013,331 A | 5/1991 | Edwards et al. | |
| 5,211,728 A | 5/1993 | Trimmer | |
| 5,282,964 A | 2/1994 | Young et al. | |
| 5,897,729 A | 4/1999 | Bikson et al. | |
| 6,904,930 B2 * | 6/2005 | Susko | B64D 37/32 137/209 |
| 7,152,635 B2 | 12/2006 | Moravec et al. | |
| 7,204,868 B2 | 4/2007 | Snow, Jr. | |
| 7,219,510 B2 * | 5/2007 | Jones | B01D 53/22 62/401 |
| 7,442,230 B2 | 10/2008 | Snow, Jr. | |
| 8,366,804 B2 | 2/2013 | Liu et al. | |
| 9,061,249 B2 * | 6/2015 | Evosevich | B01D 67/0067 |
| 9,084,962 B2 * | 7/2015 | Theodore | B01D 63/022 |
| 9,199,191 B2 * | 12/2015 | Fukuda | B01D 53/22 |
| 2005/0103193 A1 * | 5/2005 | Lyons | B01D 53/22 95/54 |
| 2005/0247197 A1 | 11/2005 | Snow, Jr. | |
| 2007/0157803 A1 | 7/2007 | McNeil et al. | |
| 2009/0302163 A1 * | 12/2009 | Sanford | B64D 37/32 244/135 R |
| 2012/0304856 A1 | 12/2012 | Kanetsuki et al. | |
| 2012/0312162 A1 * | 12/2012 | Theodore | B01D 63/022 95/47 |
| 2013/0071594 A1 * | 3/2013 | Bikson | B01D 53/228 428/36.9 |
| 2013/0071793 A1 | 3/2013 | Ma et al. | |
| 2013/0081537 A1 * | 4/2013 | Bikson | B01D 53/228 95/54 |
| 2014/0053726 A1 | 2/2014 | Evosevich et al. | |
| 2014/0116249 A1 | 5/2014 | Evosevich et al. | |
| 2014/0175227 A1 | 6/2014 | Bikson | |
| 2014/0208947 A1 * | 7/2014 | Fautsch | B01D 63/021 96/8 |
| 2015/0007729 A1 * | 1/2015 | Kanetsuki | B01D 63/023 96/8 |

FOREIGN PATENT DOCUMENTS

| | | |
|---|---|---|
| WO | WO97/33682 A1 | 9/1997 |
| WO | WO2006/079782 A2 | 8/2006 |

OTHER PUBLICATIONS

Notification of Transmittal of the International Search Report and the Written Opinion of the International Searching Authority, 17 pages, Mailed Mar. 13, 2013, for international application PCT/US2012/041723 relating to U.S. Appl. No. 13/411,548, Applicant the Boeing Company, 17 pgs.
Notification of Transmittal of the International Search Report and the Written Opinion of the International Searching Authority, 17 pages, Mailed Mar. 26, 2013, for international application PCT/US2012/041731 relating to parent U.S. Appl. No. 13/411,548, Applicant the Boeing Company.
USPTO Non-Final Office Action, Dated Jun. 19, 2014, issued for related parent U.S. Appl. No. 13/411,548, 34 pages.
USPTO Final Office Action, Dated Dec. 22, 2014, issued for related parent U.S. Appl. No. 13/411,548, 15 pages.

* cited by examiner

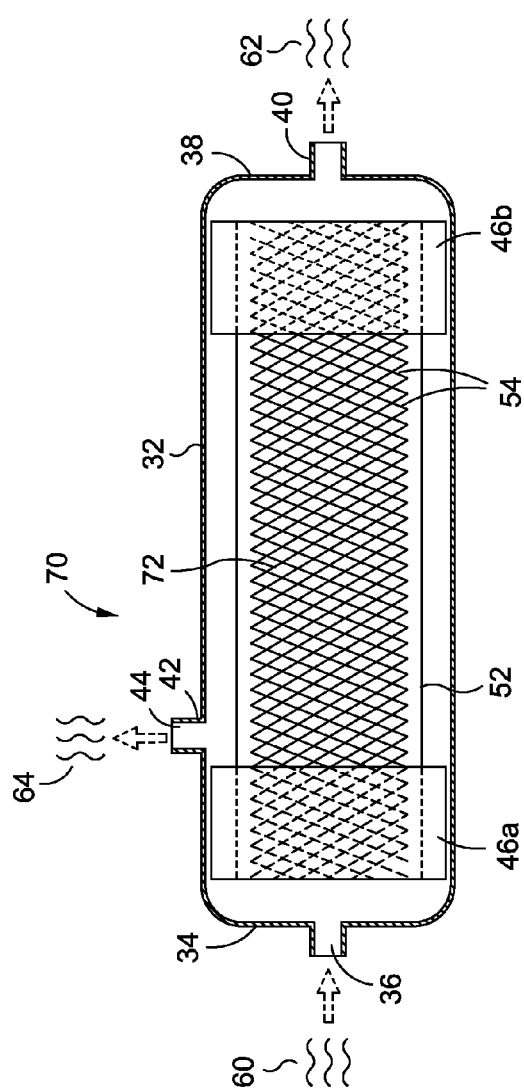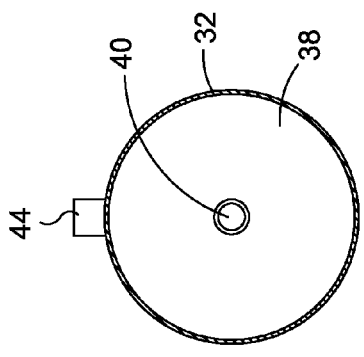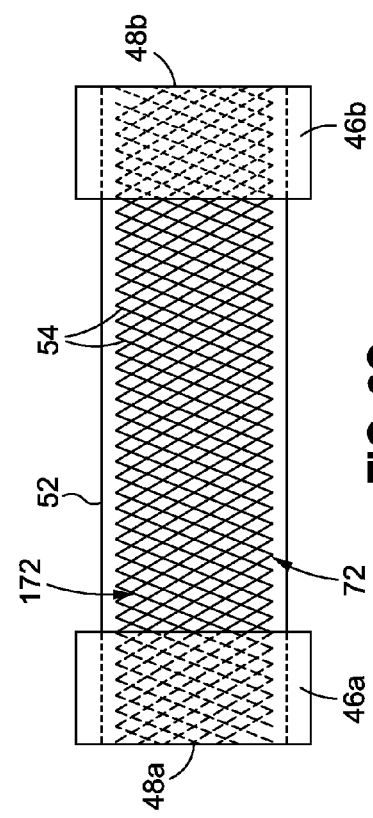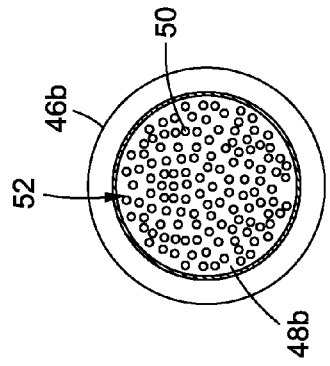

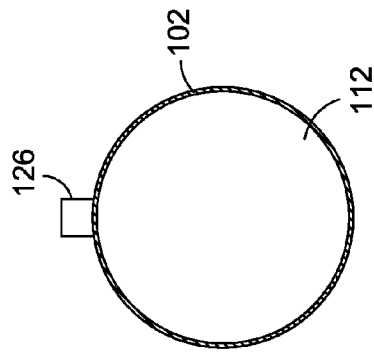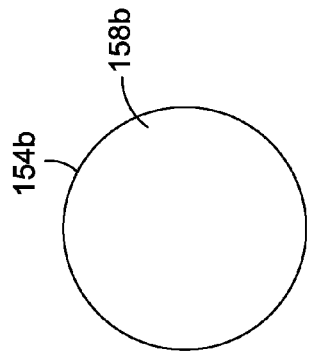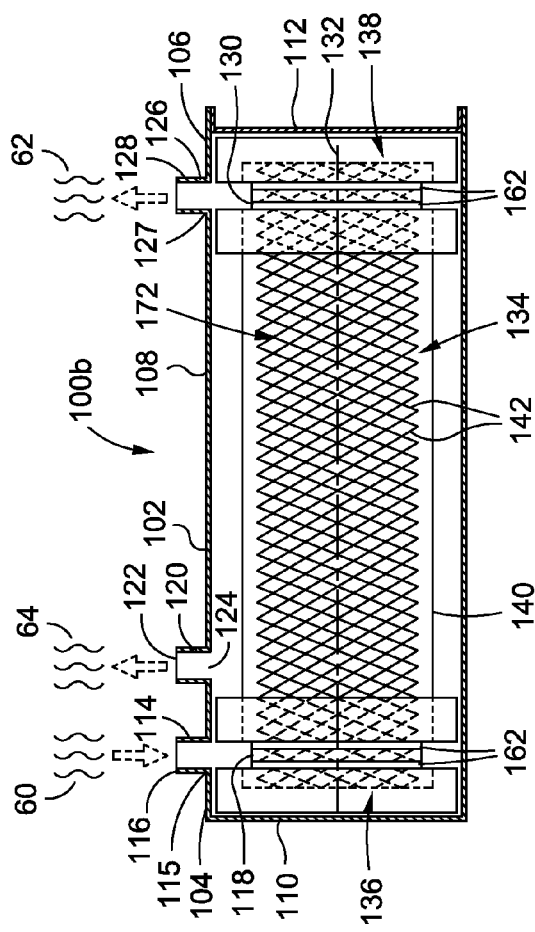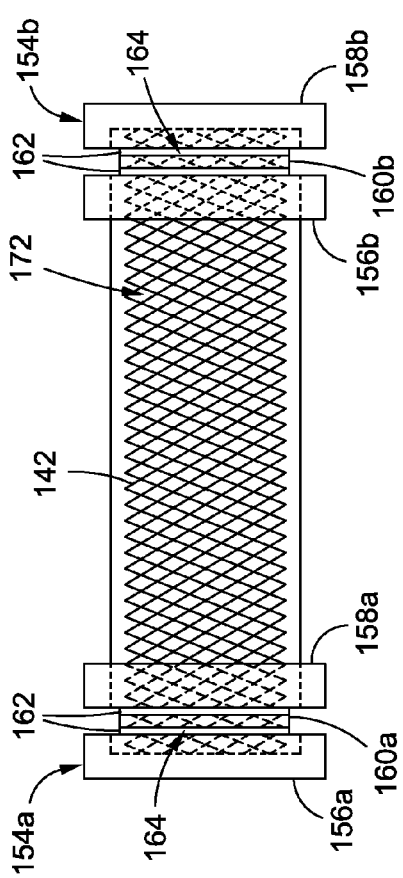

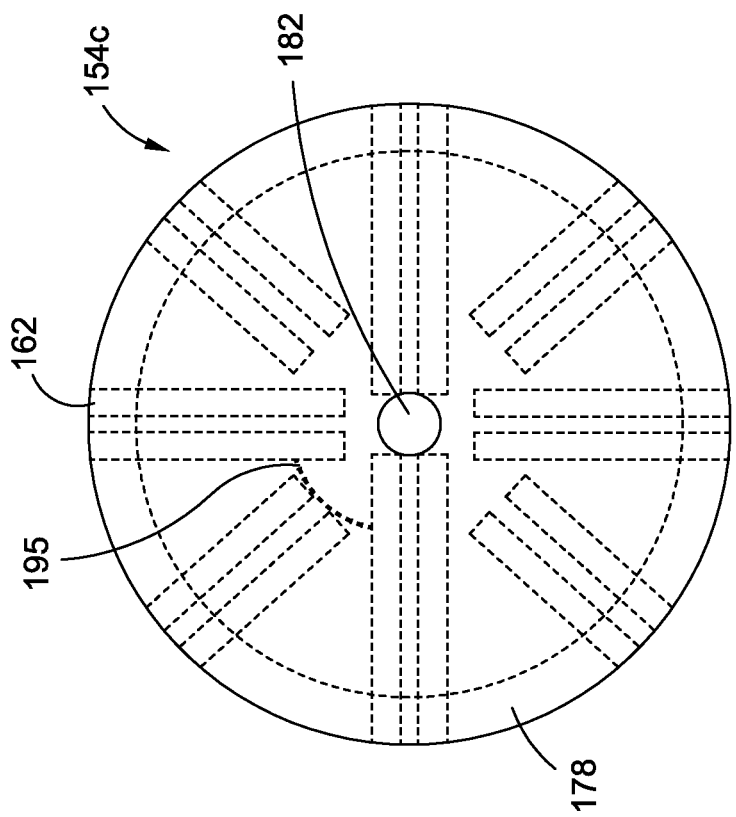
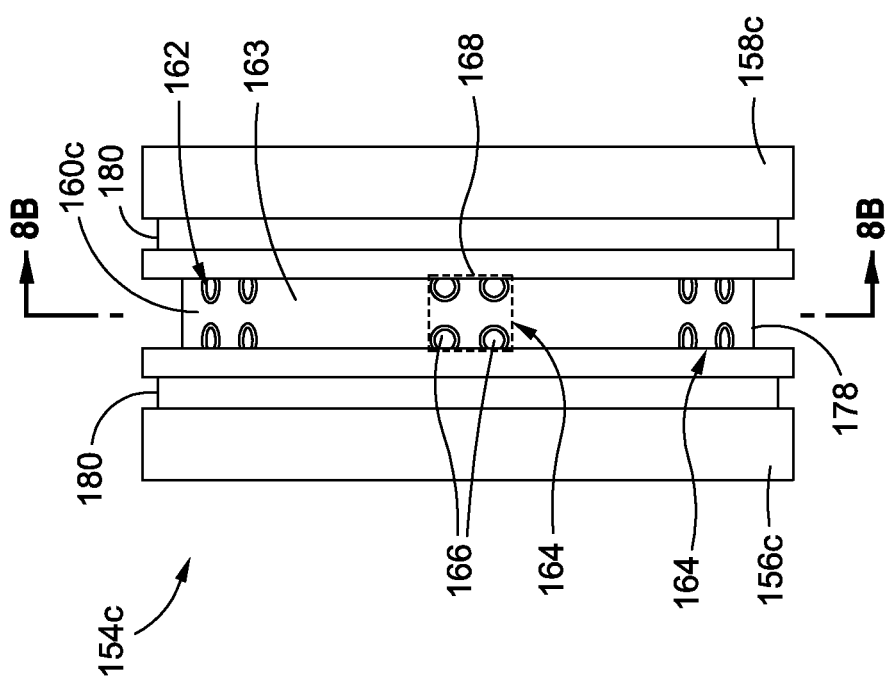
FIG. 8B
FIG. 8A

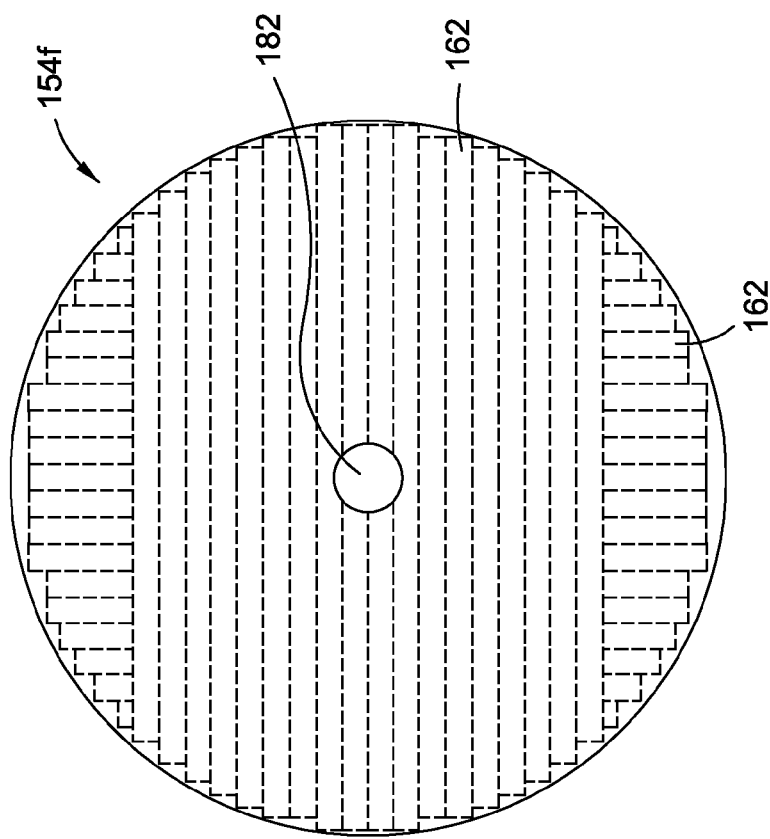
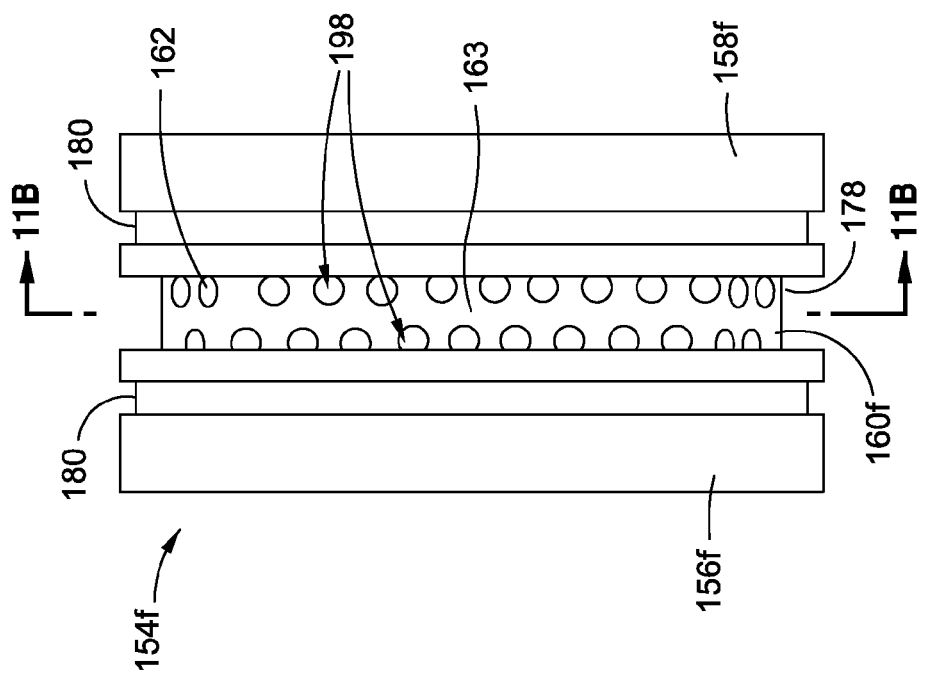
FIG. 11A
FIG. 11B

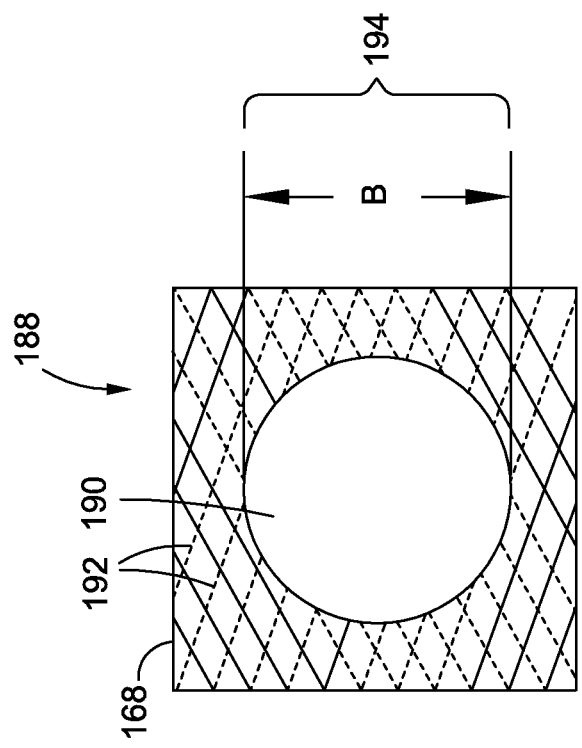
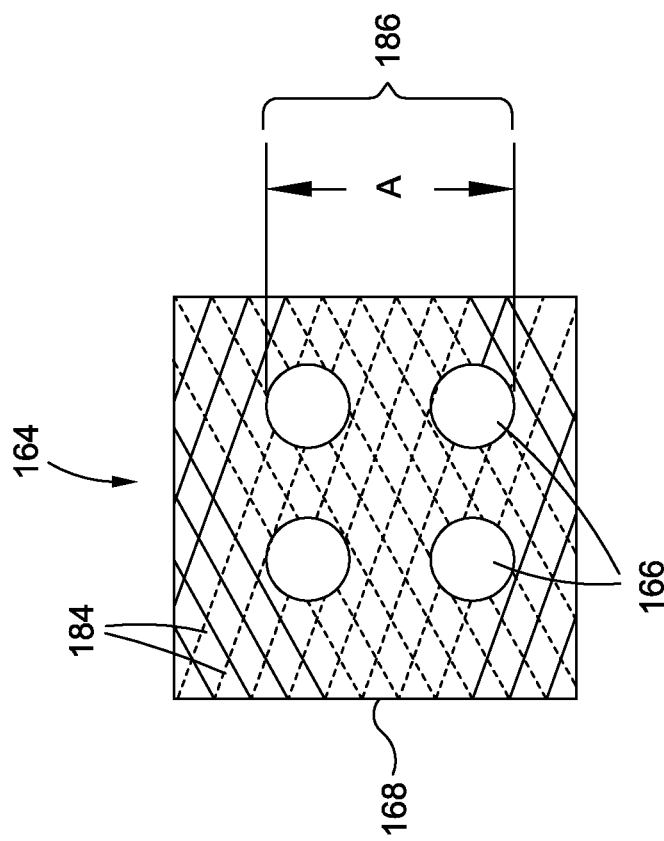

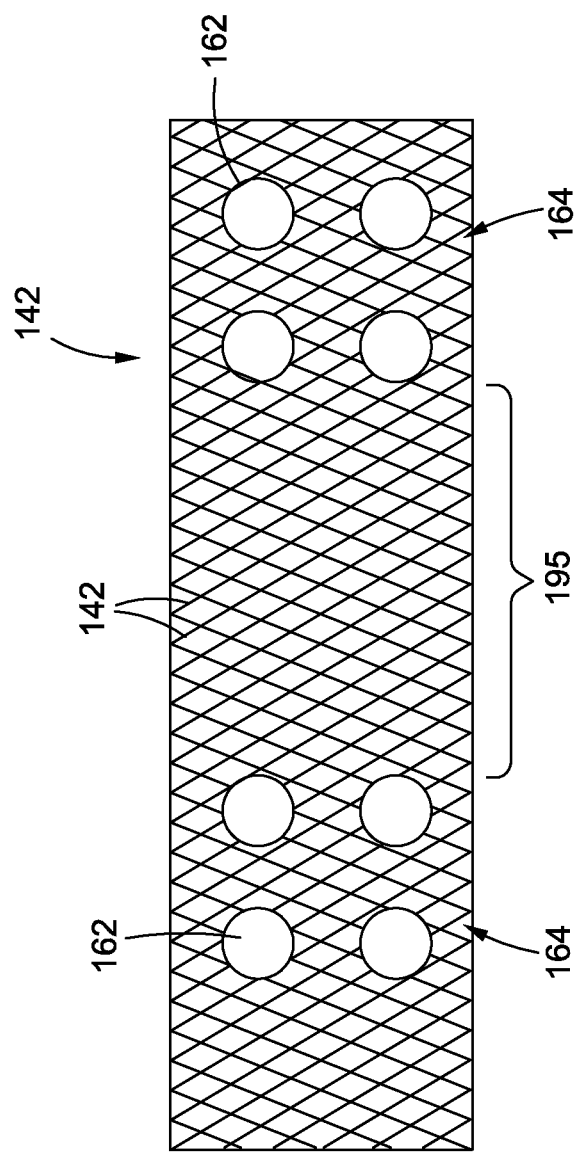

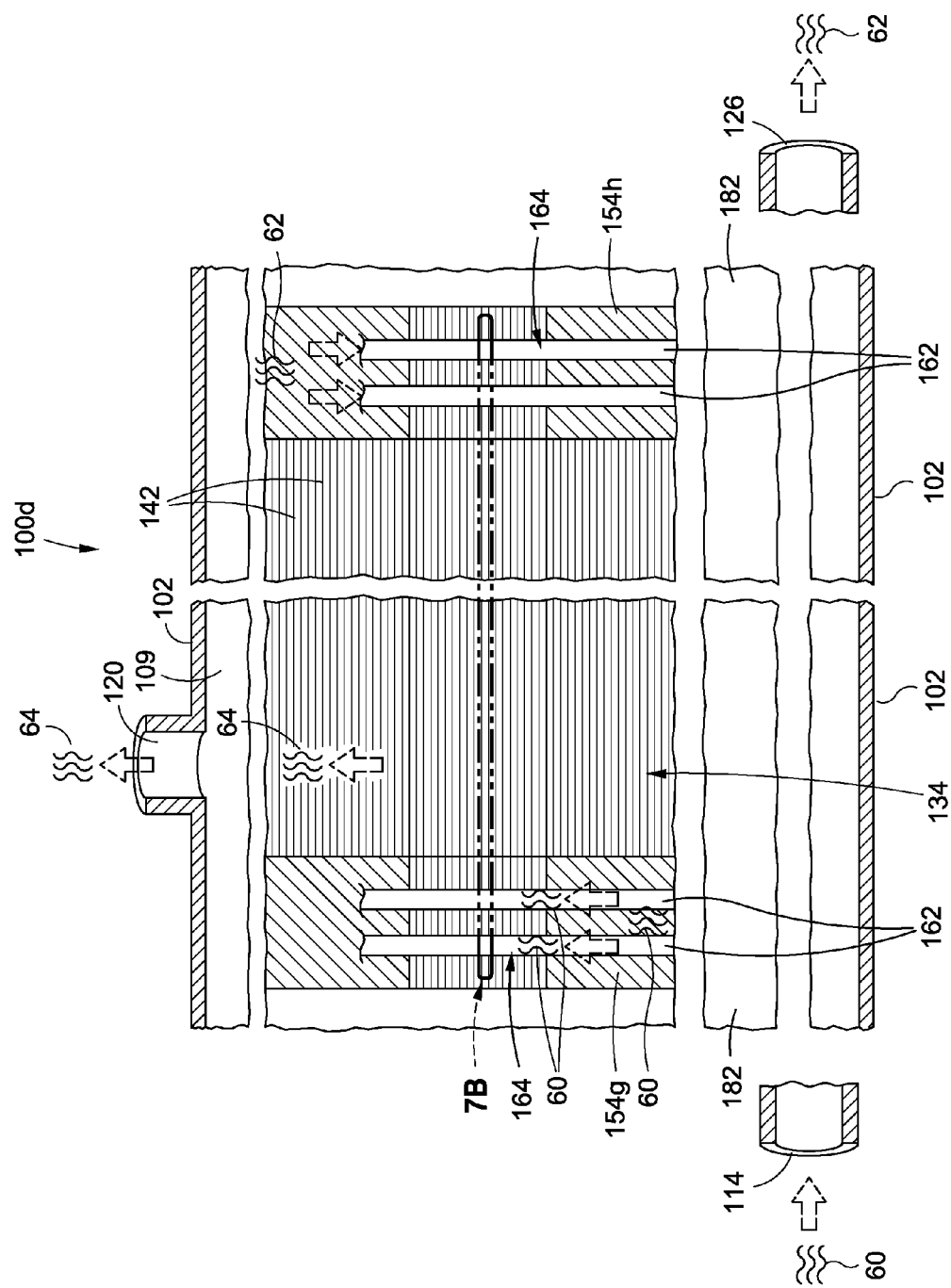

FLUID SEPARATION ASSEMBLY AND METHOD

CROSS-REFERENCE TO RELATED APPLICATIONS

The present application is a continuation-in-part application of and claims priority to pending U.S. patent application Ser. No. 13/411,548, filed Mar. 3, 2012, entitled FLUID SEPARATION ASSEMBLY AND METHOD, which claims priority to U.S. Provisional Patent Application Ser. No. 61/494,867, filed Jun. 8, 2011, both of which are incorporated herein by reference in their entireties.

FIELD

The disclosure relates generally to fluid separation assemblies or modules, and more particularly, to gas or air separation assemblies or modules for transport vehicles, such as aircraft.

BACKGROUND

Pursuant to Federal Aviation Regulation (FAR) Section 25.981(b) and European Aviation Safety Agency Certification Specification (EASA CS) Section 25.981(b)(2)(b)(3) amendment 6, new commercial aircraft are required to have a low flammability exposure. This has led to the development of inert gas generating systems (also known as OBIGGS (on board inert gas generating systems), FRS (flammability reduction system), NGS (nitrogen generating system), FTIS (fuel tank inerting system)) on commercial aircraft. In addition, many military aircraft have incorporated fuel tank inerting systems into their designs. Such fuel tank inerting systems supply an inert gas, such as nitrogen enriched air (NEA), to purge fuel tanks and effectively reduce oxygen concentration levels therein. The component of such fuel tank inerting systems that enriches nitrogen is generally known as the gas separation assembly, or more particularly, as the air separation module (ASM). The gas separation assembly or ASM is used to generate NEA. Known gas separation assemblies or ASMs typically includes a fiber bundle 52 comprised of hollow fiber membranes 54 held by tubesheets 46 on each end and encapsulated by a shell or housing 32 (see FIG. 2A). Known gas separation assemblies or ASMs expose the hollow fiber membranes 54 by cutting off one side of the tubesheet 46 to expose the hollow fiber membranes 54 and openings 50 on the face 48 of the tubesheet 46.

Known tubesheets may be flat, may not be easily reinforced, and may typically be the life-limiting component of the gas separation assembly or ASM. In known gas separation assembly or ASM designs, feed gas, such as pressurized air, flows into or enters the gas separation assembly or ASM on one side of the tubesheet. Such design uses the tubesheet as a pressure boundary and can put stress or pressure on the tubesheet, which can reduce the service life of the tubesheet, and in turn, reduce the service life of the gas separation assembly or ASM. Moreover, the exposed hollow fiber membranes may be embedded in an epoxy matrix, and pressurizing the face or flat end of the tubesheet having the exposed hollow fiber membranes that have been embedded in the epoxy matrix may cause the epoxy matrix to crack and/or creep or separate from the fiber bundle, thus causing an aperture or opening for depressurization, which can lead to failure of the gas separation assembly or ASM. Further, due to material properties and design of known tubesheets, the gas separation assembly or ASM may not meet its expected service life at a desired system temperature.

To increase the service life of the gas separation assembly or ASM, known inerting systems have lowered the operating temperature of the system. The tubesheet material may have greater strength at lower temperatures but the lower temperature can reduce the inerting system's performance and may drive the need for additional gas separation assembly or ASM weight or pressure-boosting components. This is because higher temperatures may increase the efficiency of the separation of nitrogen and oxygen. Moreover, some known systems, commonly known as shell-side feed systems, reverse the flow of the feed gas, such as air, which allows the gas separation assembly or ASM shell or housing to provide support to the tubesheet. However, this can also reduce the performance of the gas separation assembly or ASM.

In addition, known gas separation assembly or ASM designs and systems may use the tubesheet as a pressure boundary. The tubesheet is flat, cannot easily be reinforced, and is typically the life-limiting part of the ASM. Pressurizing the flat end or tubesheet of the air separation bundle of fiber tubes that has been solidified by a plastic resin may cause the plastic resin edge ring around the outer perimeter of the bundle of fiber tubes to crack and separate from the bundle, causing an aperture for depressurizing, and possibly rendering the ASM or air separation system inoperable. This, in turn, may cause such known gas separation assembly or ASM designs and systems to operate at suboptimal temperatures to extend the life of the ASM. The lower temperatures, in turn, may drive the need for additional ASM weight or pressure-boosting components.

Further, known gas separation assembly or ASM designs and systems may use a fluid separation assembly with a side port radial feed design that may have a high gas or fluid flow, such as air or high pressure air, in an area or channel near a feed inlet port. This may result in a corresponding high pressure drop in this area or channel. Moreover, known gas separation assembly or ASM designs and systems having a fluid separation assembly with a side port radial feed design may be difficult to retrofit or may require numerous interface changes if a design other than a side port radial feed design is desired.

Accordingly, there is a need in the art for a gas separation assembly or ASM and method that provide advantages over known assemblies, systems, and methods. In particular, there is a need in the art for a gas separation assembly or ASM and method that allow the gas separation assembly or ASM to operate at optimum temperature and pressure for a desired application, that provide a decreased pressure drop, and that provide simple and efficient retrofitting of known designs and systems.

SUMMARY

This need for a gas separation assembly or ASM and method is satisfied. As discussed in the below detailed description, embodiments of the assembly and method may provide significant advantages over existing assemblies, systems, and methods.

In an exemplary embodiment of the disclosure, there is provided a fluid separation assembly. The fluid separation assembly comprises a hollow fiber bundle comprising a plurality of hollow fiber membranes. The fluid separation assembly further comprises a pair of tubesheets each encapsulating respective ends of the hollow fiber bundle.

The fluid separation assembly further comprises a plurality of radial through openings formed along a circumference of one or both of the tubesheets and radially through a body portion in one or both of the tubesheets. The plurality of radial through openings comprises center connected radial through openings and partial radial through openings. The plurality of radial through openings intersect each, or substantially each, of the plurality of hollow fiber membranes.

The fluid separation assembly further comprises a housing surrounding the hollow fiber bundle and the pair of tubesheets. The housing has a feed inlet port, a permeate outlet port, and a non-permeate outlet port. The feed inlet port and the non-permeate outlet port are in parallel alignment with a longitudinal central axis of the housing. The feed gas, permeate gas, or non-permeate gas are introduced into or removed from the plurality of hollow fiber membranes via the plurality of radial through openings formed in one or both of the tubesheets.

In another embodiment of the disclosure, there is provided an aircraft comprising a fuselage, at least one fuel tank mounted to the fuselage, at least one fuel tank vent operatively connected to the fuel tank, and an inert gas generating system for generating a non-permeate gas on board the aircraft.

The inert gas generating system comprises a fluid separation assembly having a center tube radial feed design. The fluid separation assembly comprises a hollow fiber bundle comprising a plurality of hollow fiber membranes. The fluid separation assembly further comprises a pair of tubesheets, each encapsulating respective ends of the hollow fiber bundle.

The fluid separation assembly further comprises a plurality of radial through openings formed along a circumference of one or both of the tubesheets and radially through a body portion in one or both of the tubesheets. The plurality of radial through openings comprises center connected radial through openings and partial radial through openings. The plurality of radial through openings intersect each, or substantially each, of the plurality of hollow fiber membranes.

The fluid separation assembly further comprises a housing surrounding the hollow fiber bundle and the pair of tubesheets. The housing has a feed inlet port, a permeate outlet port, and a non-permeate outlet port. The feed inlet port and the non-permeate outlet port are in parallel alignment with a longitudinal central axis of the housing. The feed gas, permeate gas, or non-permeate gas are introduced into or removed from the plurality of hollow fiber membranes via the plurality of radial through openings formed in one or both of the tubesheets.

In another embodiment of the disclosure, there is provided a method for reducing pressure drop in a fluid separation assembly. The method comprises providing a fluid separation assembly having a center tube radial feed configuration.

The fluid separation assembly comprises a hollow fiber bundle comprising a plurality of hollow fiber membranes; a pair of tubesheets, each encapsulating respective ends of the hollow fiber bundle; and a housing surrounding the hollow fiber bundle and the pair of tubesheets. The housing has a feed inlet port, a permeate outlet port, and a non-permeate outlet port. The feed inlet port and the non-permeate outlet port are in parallel alignment with a longitudinal central axis of the housing.

The method further comprises forming a plurality of radial through openings along a circumference of one or both of the tubesheets and radially through a body portion in one or both of the tubesheets, such that the plurality of radial through openings intersect each, or substantially each, of the hollow fiber membranes. The plurality of radial through openings comprise center connected radial through openings and partial radial through openings.

The method further comprises introducing feed gas into the fluid separation assembly via the feed inlet port. The method further comprises flowing the feed gas through the center connected radial through openings, around the circumference of the one or both tubesheets, and into the partial radial through openings, thereby reducing pressure drop in the fluid separation assembly.

The method further comprises removing permeate gas from the fluid separation assembly via the permeate outlet port. The method further comprises the step of removing non-permeate gas from the fluid separation assembly via the non-permeate outlet port.

In another embodiment of the disclosure, there is provided a fluid separation assembly. The assembly comprises a hollow fiber bundle comprising a plurality of hollow fiber membranes. The assembly further comprises a first tubesheet and a second tubesheet encapsulating respective ends of the hollow fiber bundle, wherein one of the tubesheets has a plurality of radial through openings formed in the tubesheet. The assembly further comprises a housing surrounding the hollow fiber bundle and the first and second tubesheets, the housing having a feed inlet port, a permeate outlet port, and a non-permeate outlet port. The feed gas, permeate gas, or non-permeate gas are introduced into or removed from the hollow fiber membranes via the plurality of radial through openings formed in the tubesheet, such that the radial through openings of the tubesheet intersect each or substantially each of the hollow fiber membranes.

In another embodiment of the disclosure, there is provided a fluid separation assembly. The assembly comprises a hollow fiber bundle comprising a plurality of hollow fiber membranes. The assembly further comprises a first tubesheet and a second tubesheet encapsulating respective ends of the hollow fiber bundle, wherein at least one tubesheet has a plurality of radial through openings formed in the at least one tubesheet. The radial through openings are in a repeating four opening pattern comprising four openings in a substantially square configuration. The assembly further comprises a housing surrounding the hollow fiber bundle and the first and second tubesheets, the housing having a feed inlet port, a permeate outlet port, and a non-permeate outlet port. Feed gas, permeate gas, or non-permeate gas are introduced into or removed from the hollow fiber membranes via the plurality of radial through openings formed in the at least one tubesheet, such that the radial through openings of the at least one tubesheet intersect each or substantially each of the hollow fiber membranes.

In another embodiment of the disclosure, there is provided an aircraft comprising an airframe, at least one fuel tank mounted on the airframe, at least one fuel tank vent operatively connected to the fuel tank, and an inert gas generating system for generating inert gas on board the aircraft. The inert gas generating system includes a gas separation assembly. The gas separation assembly comprises a hollow fiber bundle comprising a plurality of hollow fiber membranes. The gas separation assembly further comprises a first tubesheet and a second tubesheet encapsulating respective ends of the hollow fiber bundle, wherein one of the tubesheets has a plurality of radial through openings formed in the tubesheet. The gas separation assembly further comprises a housing surrounding the hollow fiber bundle and the first and second tubesheets, the housing having a feed inlet port, a permeate outlet port, and a non-permeate outlet port. Feed gas, permeate gas, or non-permeate gas are introduced into or removed from the hollow fiber membranes via the plurality of radial through openings formed in the tubesheet, such that the radial through openings of the tubesheet intersect each or substantially each of the hollow fiber membranes.

In another embodiment of the disclosure, there is provided a method for supplying nitrogen enriched air from a fluid separation assembly to at least one fuel tank of a transport vehicle. The method comprises providing a fluid separation assembly. The fluid separation assembly comprises a hollow fiber bundle comprising a plurality of hollow fiber membranes. The fluid separation assembly further comprises a first tubesheet and a second tubesheet encapsulating respective ends of the hollow fiber bundle, wherein the first tubesheet has a plurality of radial through openings formed in the tubesheet that intersect each or substantially each of the hollow fiber membranes. The fluid separation assembly further comprises a housing surrounding the hollow fiber bundle and the first and second tubesheets, the housing having a feed inlet port, a permeate outlet port, and a non-permeate outlet port. The method further comprises introducing air through the feed inlet port and through the radial through openings to induce air flow through the hollow fiber membranes. The method further comprises removing non-nitrogen permeate gases from the hollow fiber membranes along the fiber bundle and out through the permeate outlet port. The method further comprises removing the nitrogen enriched air out through the non-permeate outlet port. The method further comprises supplying the nitrogen enriched air to at least one fuel tank of a transport vehicle.

In another embodiment of the disclosure, there is provided a method for minimizing pressure loads and bending moments in a fluid separation assembly. The method comprises providing a fluid separation assembly. The fluid separation assembly comprises a hollow fiber bundle comprising a plurality of hollow fiber membranes. The fluid separation assembly further comprises a first tubesheet and a second tubesheet encapsulating respective ends of the hollow fiber bundle. The fluid separation assembly further comprises a housing surrounding the hollow fiber bundle and the first and second tubesheets, the housing having a feed inlet port, a permeate outlet port, and a non-permeate outlet port. The method further comprises forming a plurality of radial through openings in one of the tubesheets, such that the radial through openings intersect each or substantially each of the hollow fiber membranes. The method further comprises introducing or removing feed gas, permeate gas, or non-permeate gas into and out of the hollow fiber membranes via the radial through openings, thereby minimizing pressure loads and bending moments on the tubesheet.

In another embodiment of the disclosure, there is provided a method of generating nitrogen enriched air (NEA). The method comprises introducing feed gas comprising air, radially through radial through openings formed in a first tubesheet encapsulated end of a hollow fiber bundle of hollow fiber membranes. The radial through openings are formed along a circumference of and radially through a body portion of the first tubesheet, and intersect each, or substantially each, of the hollow fiber membranes. The method further comprises permeating a permeate gas comprising one or more of oxygen, carbon dioxide, and water through walls of the hollow fiber membranes. The method further comprises flowing out non-permeate gas comprising nitrogen enriched air (NEA), from an opening of a second tubesheet encapsulated end of the hollow fiber bundle of hollow fiber membranes.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 3A is an illustration of a side view in cross-section of another known gas separation assembly;

FIG. 3B is an illustration of a right end view of the gas separation assembly of FIG. 3A;

FIG. 3C is an illustration of a side view of the fiber bundle with tubesheets of the known gas separation assembly of FIG. 3A;

FIG. 3D is an illustration of a right end view of the fiber bundle with tubesheet of FIG. 3C;

FIG. 5E is an illustration of a side view in cross-section of another one of the embodiments of a fluid separation assembly of the disclosure;

FIG. 5F is an illustration of a right end view of the fluid separation assembly of FIG. 5E;

FIG. 5G is an illustration of a side view of the fiber bundle with tubesheets of the gas separation assembly of FIG. 5E;

FIG. 5H is an illustration of a right end view of a tubesheet of FIG. 5G;

FIG. 8A is an illustration of a side view of one of the embodiments of a tubesheet that may be used in one of the embodiments of the fluid separation assembly of the disclosure;

FIG. 8B is an illustration of a cross-sectional view taken along lines 8B-8B of FIG. 8A;

FIG. 11A is an illustration of a perspective view of another one of the embodiments of a tubesheet that may be used in one of the embodiments of the fluid separation assembly of the disclosure;

FIG. 11B is an illustration of a cross-sectional view taken along lines 11B-11B of FIG. 11A;

FIG. 12A is an illustration of a four opening pattern of radial through openings;

FIG. 12B is an illustration of a one opening pattern of radial through openings;

FIG. 12C is an illustration of spacing between the four opening pattern of radial through openings of FIG. 12A;

FIG. 17A is an illustration of a side view in partial cross-section showing fluid flow through the radial through openings of another one of the embodiments of a fluid separation assembly of the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art. In the following description, various components are described for exemplary embodiments and are not meant to be limiting.

Figure 1:
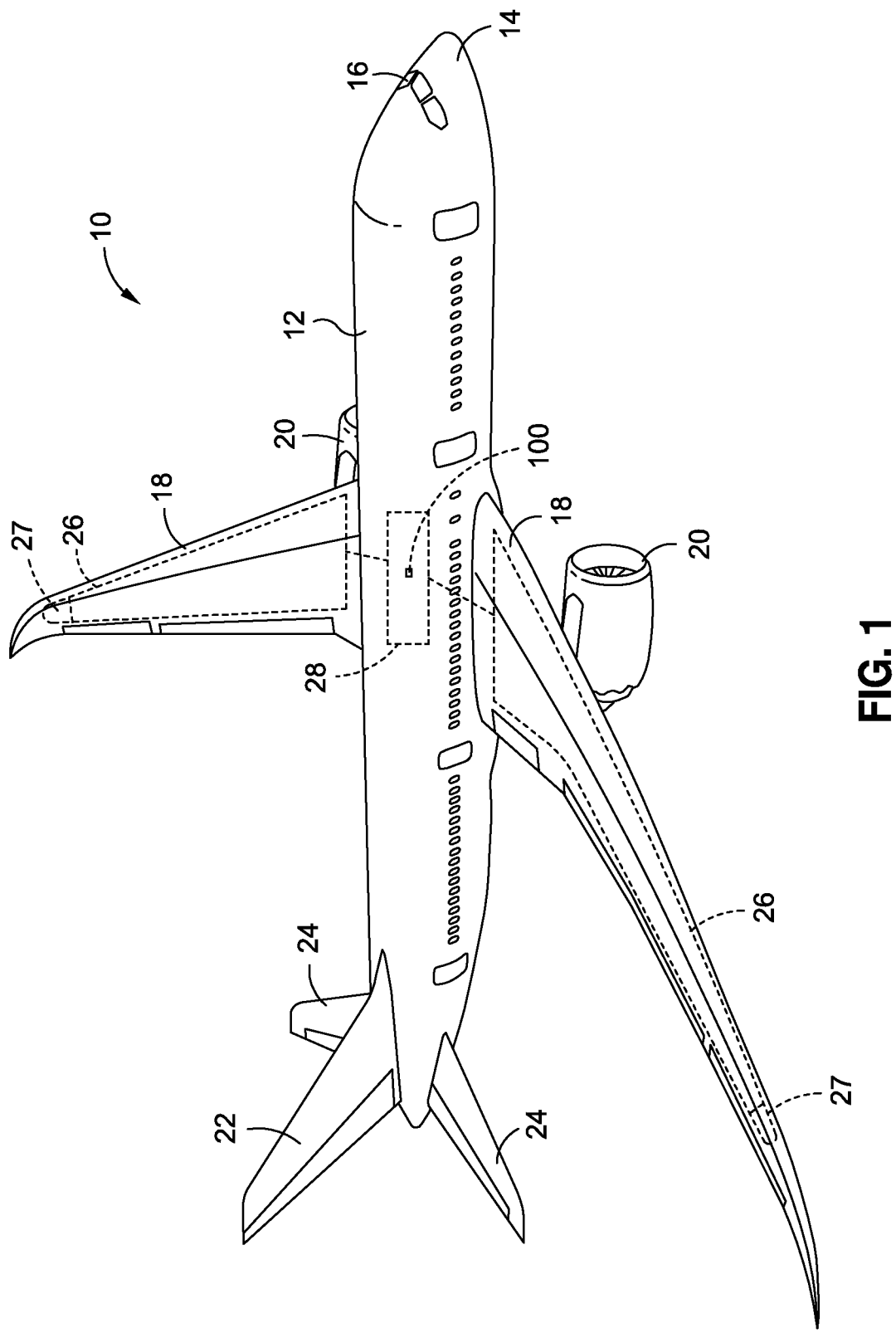
FIG. 1 is an illustration of a perspective view of an aircraft which may use one of the embodiments of a gas separation assembly and method of the disclosure.

Now referring to the Figures, FIG. 1 is an illustration of a perspective view of an aircraft 10 which may include and use one of the embodiments of a fluid separation assembly 100a (see FIG. 5A), 100b (see FIG. 5E), 100c (see FIG. 5I), or 100d (see FIG. 16), and methods 200 (see FIG. 13), 300 (see FIG. 14), 400 (see FIG. 15), or 500 (see FIG. 20) of the disclosure. The aircraft 10 comprises an airframe or fuselage 12, a nose 14, a cockpit 16, wings 18 operatively coupled to the airframe or fuselage 12, one or more propulsion units 20, a tail vertical stabilizer 22, and one or more tail horizontal stabilizers 24, fuel tanks 26, fuel tank vents 27, and an inert gas generating system 28. The inert gas generating system 28 may include embodiments of the fluid separation assembly disclosed herein.

Although the aircraft 10 shown in FIG. 1 is generally representative of a commercial passenger aircraft, embodiments of the fluid separation assembly disclosed herein may also be employed in other types of manned or unmanned aircraft. More specifically, the teachings of the disclosed embodiments may be applied to other passenger aircraft, cargo aircraft, military aircraft, rotorcraft, and other types of aircraft or aerial vehicles. It may also be appreciated that embodiments of systems, methods and apparatuses in accordance with the disclosure may be utilized in other vehicles, such as tanker ships, fuel supply ships, boats and other watercraft, trains, automobiles, trucks, buses, and other types of vehicles. It may also be appreciated that embodiments of systems, methods and apparatuses in accordance with the disclosure may be utilized in non-vehicle applications, such as portable ground support applications that require separation of fluids, for example, devices for filling tires, devices for welding joints, or other suitable portable ground support applications. Other non-vehicle applications may include medical applications, for example, medical oxygen use and generation; food storage applications, such as devices for food storage and preservation; purification of natural gas; Volatile Organic Compound (VOC) removal; dehumidification; and other suitable non-vehicle applications.

Figures 2A, 2B:
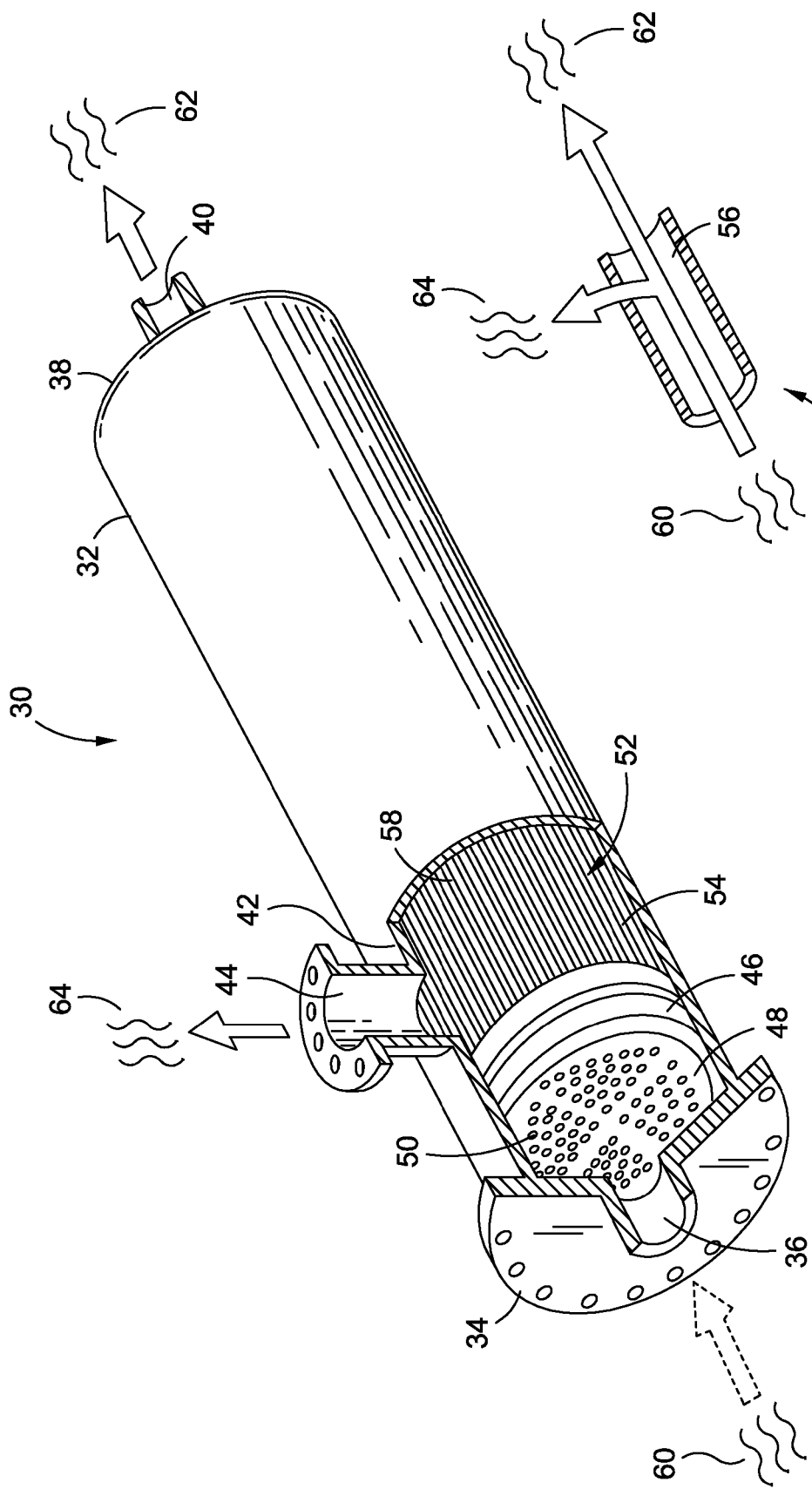
FIG. 2A is an illustration of a partial cut-away perspective view of a known gas separation assembly.
FIG. 2B is an illustration of a partial cut-away perspective view of the direction of gas flow through a hollow fiber membrane of the known gas separation assembly of FIG. 2A.

FIG. 2A is an illustration of a partial cut-away perspective view of a known gas separation assembly 30, such as an air separation module (ASM). As shown in FIG. 2A, the gas separation assembly 30 has a housing 32 with a first end 34 having a feed inlet port 36, a second end 38 having a non-permeate outlet port 40, and a side portion 42 having a permeate outlet port 44. The gas separation assembly 30 further has one or more tubesheets 46 each having a face 48 with a plurality of through openings 50. The gas separation assembly 30 further has a fiber bundle 52 comprising a plurality of hollow fiber membranes 54 arranged in a parallel configuration 58 that are held or potted in the tubesheet 46, where each hollow fiber membrane 54 has a fiber membrane wall 56 (see FIG. 2B). Feed gas 60, such as air, preferably under high pressure, enters the feed inlet port 36 and distributes across the face 48 of the tubesheet 46 into the hollow fiber membranes 54. As the feed gas 60, such as air, progresses along the length of the hollow fiber membranes 54, non-permeate gas 62, or inert gas, such as nitrogen enriched air (NEA), exits the hollow fiber membranes 54 through the non-permeate outlet port 40, and permeate gas 64, such as oxygen enriched waste air, which may comprise oxygen ($O_2$), carbon dioxide ($CO_2$), and/or water ($H_2O$), permeates through the fiber membrane walls 56 and exits out the permeate outlet port 44.

FIG. 2B is an illustration of a partial cut-away perspective view of the direction of gas flow, such as feed gas 60, non-permeate gas 62, and permeate gas 64, through the hollow fiber membranes 54 of the known gas separation assembly 30 of FIG. 2A.

FIG. 3A is an illustration of a side view in partial cross-section of another known gas separation assembly 70, such as an air separation module (ASM), in which the hollow fiber membranes 54 are arranged in a criss-cross or helical configuration 72. As shown in FIG. 3A, like the air separation module 30 of FIG. 2A, the gas separation assembly 70 has housing 32 with the first end 34 having the feed inlet port 36, the second end 38 having the non-permeate outlet port 40, and the side portion 42 having the permeate outlet port 44. The gas separation module 70 further has two tubesheets 46a, 46b. As shown in FIG. 3D, the tubesheet 46b has a face 48b with a plurality of through openings 50.

The gas separation assembly 70 further has the fiber bundle 52 comprising the plurality of hollow fiber membranes 54 arranged in a criss-cross or helical configuration 72 that are held or potted on each end by the two tubesheets 46a, 46b. Feed gas 60, such as air, preferably under high pressure, the feed inlet port 36 and distributes across the face 48a of the tubesheet 46a into the hollow fiber membranes 54. As the feed gas 60, such as air, progresses along the length of each hollow fiber membrane 54, non-permeate gas 62 or inert gas, such as nitrogen enriched air (NEA), exits the hollow fiber membranes 54 through the non-permeate outlet port 40, and permeate gas 64, such as oxygen enriched waste air stream which may comprise oxygen ($O_2$), carbon dioxide ($CO_2$), and/or water ($H_2O$), permeates through the fiber membrane walls 56 (see FIG. 2B) and exits out the permeate outlet port 44.

FIG. 3B is an illustration of a right end view of the second end 38 of the gas separation assembly 70 of FIG. 3A. FIG. 3B shows the second end 38 of the housing 32, the non-permeate outlet port 40, and the permeate outlet port 44.

FIG. 3C is an illustration of a side view of the fiber bundle 52 and the tubesheets 46a, 46b of the known gas separation assembly 70 of FIG. 3A. FIG. 3D is an illustration of a right end view of the fiber bundle 52 and face 48b of tubesheet 46b of FIG. 3C. FIG. 3D shows the face 48b of the tubesheet 46b, the fiber bundle 52, and the through openings 50 on the face 48b of the tubesheet 46b.

Figure 4A:
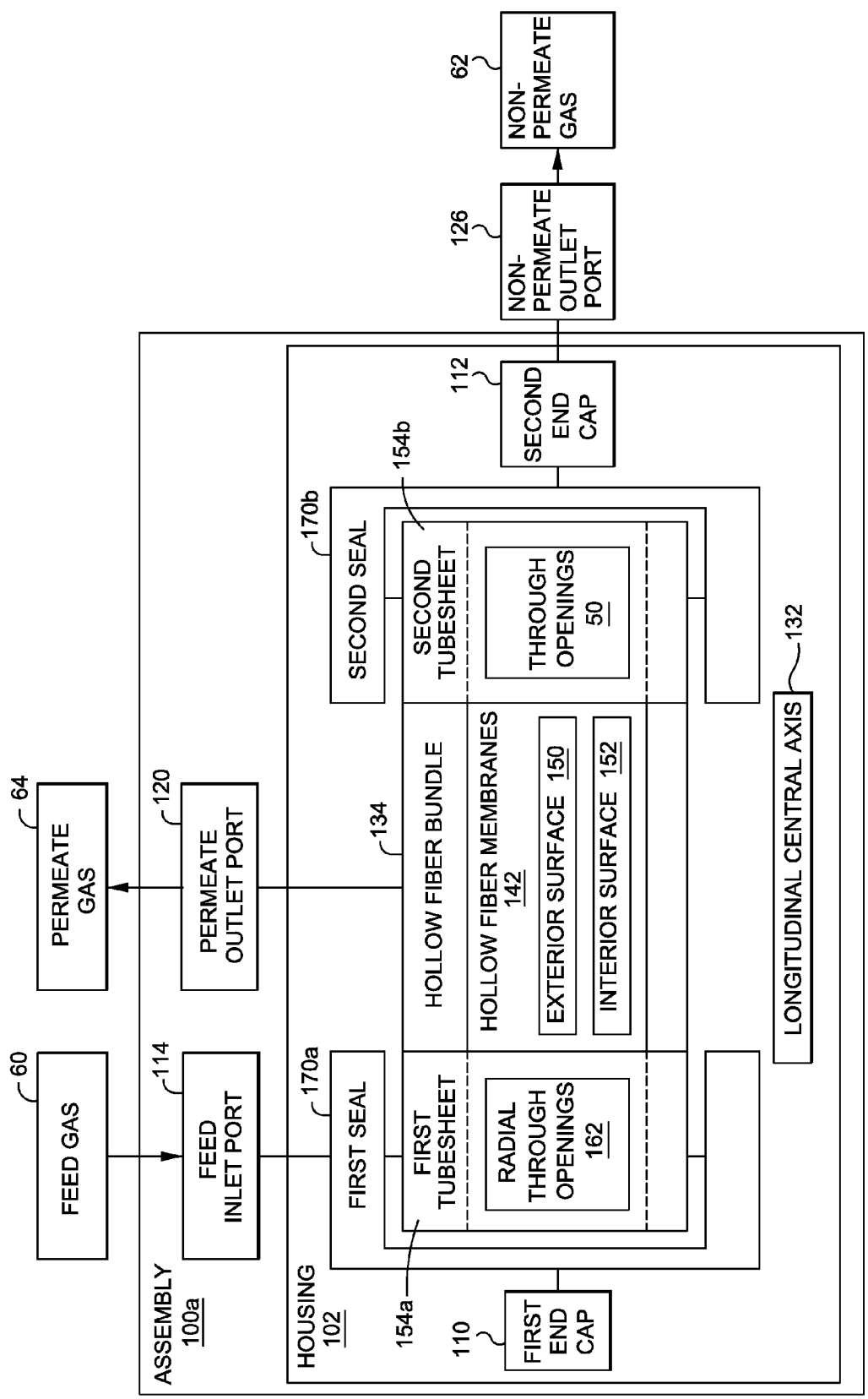
FIG. 4A is an illustration of a block diagram of one of the embodiments of a fluid separation assembly of the disclosure.
Figure 4B:
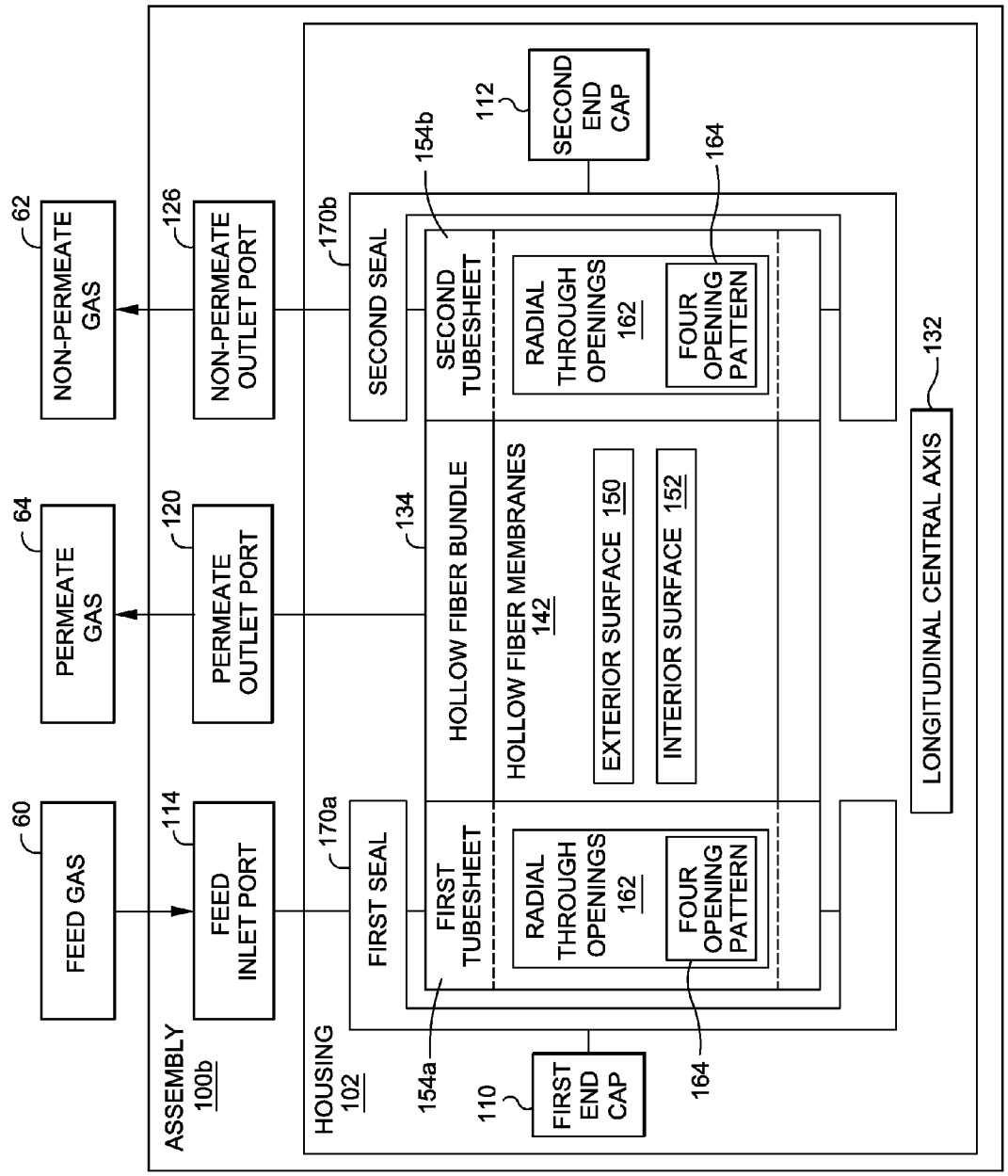
FIG. 4B is an illustration of a block diagram of another one of the embodiments of a fluid separation assembly of the disclosure.

Disclosed herewith are exemplary embodiments of novel designs of a fluid separation assembly 100a (see FIG. 5A), 100b (see FIG. 5E), 100c (see FIG. 5I), 100d (see FIG. 16), such as a gas separation module, for example, an air separation module (ASM). FIG. 4A is an illustration of a block diagram of one of the embodiments of a fluid separation assembly 100a of the disclosure. FIG. 4B is an illustration of a block diagram of another one of the embodiments of a fluid separation assembly 100b of the disclosure.

Figure 5B:
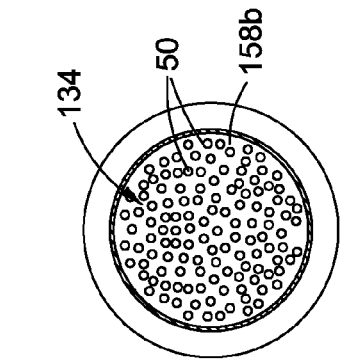
FIG. 5B is an illustration of a right end view of the fluid separation assembly of FIG. 5A.
Figure 5D:
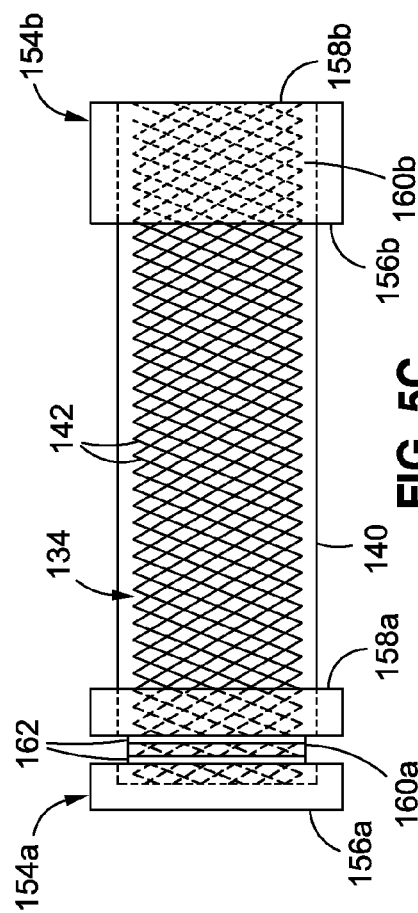
FIG. 5D is an illustration of a right end view of a tubesheet of FIG. 5C.
Figure 5A:
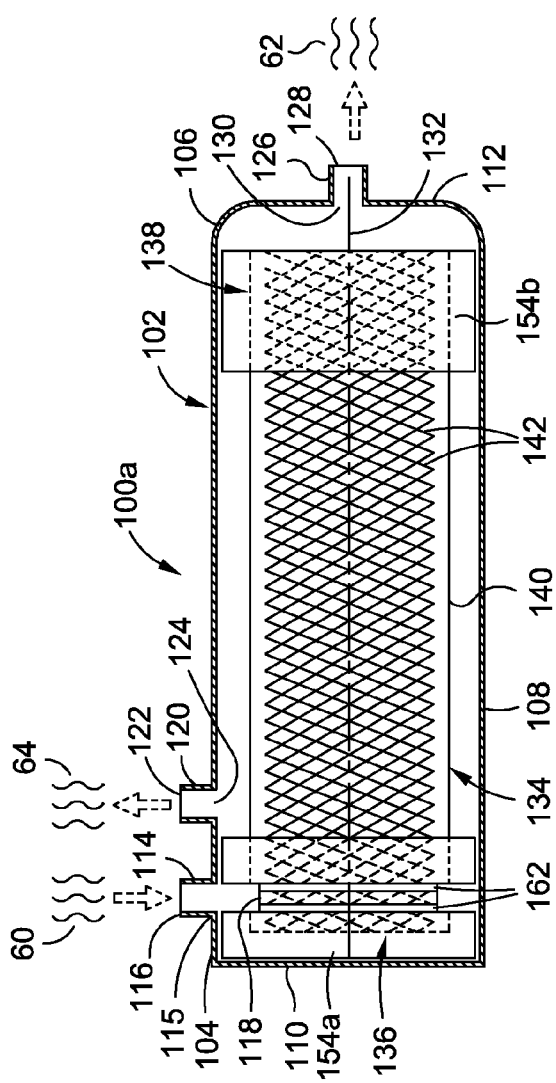
FIG. 5A is an illustration of a side view in cross-section of one of the embodiments of a fluid separation assembly of the disclosure.

FIG. 5A is an illustration of a side view in cross-section of one of the embodiments of the fluid separation assembly 100a of the disclosure having a plurality of hollow fiber membranes 142 in a criss-cross or helical configuration 172.

Figure 5C:
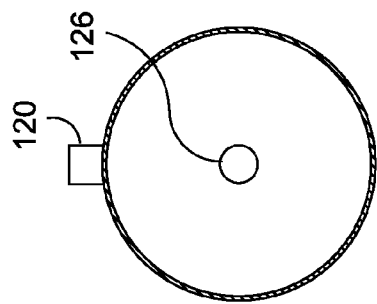
FIG. 5C is an illustration of a side view of the fiber bundle with tubesheets of the fluid separation assembly of FIG. 5A.

FIG. 5B is an illustration of a right end view of the fluid separation assembly 100a of FIG. 5A. FIG. 5C is an illustration of a side view of a hollow fiber bundle 134 with tubesheets 154a, 154b of the fluid separation assembly 100a of FIG. 5A. FIG. 5D is an illustration of a right end view of tubesheet 154b of FIG. 5C.

FIG. 5E is an illustration of a side view in cross-section of one of the embodiments of the fluid separation assembly 100b of the disclosure having a plurality of hollow fiber membranes 142 in a criss-cross or helical configuration 172. FIG. 5F is an illustration of a right end view of the fluid separation assembly 100b of FIG. 5E. FIG. 5G is an illustration of a side view of the hollow fiber bundle 134 with tubesheets 154a, 154b of the fluid separation assembly 100b of FIG. 5E. FIG. 5H is an illustration of a right end view of tubesheet 154b of FIG. 5G.

Figure 5J:
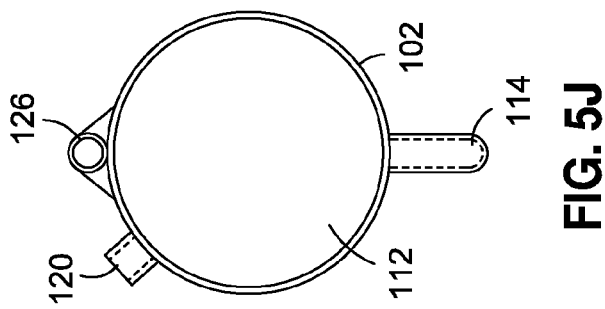
FIG. 5J is an illustration of a right end view of the fluid separation assembly of FIG. 5I.
Figure 5I:
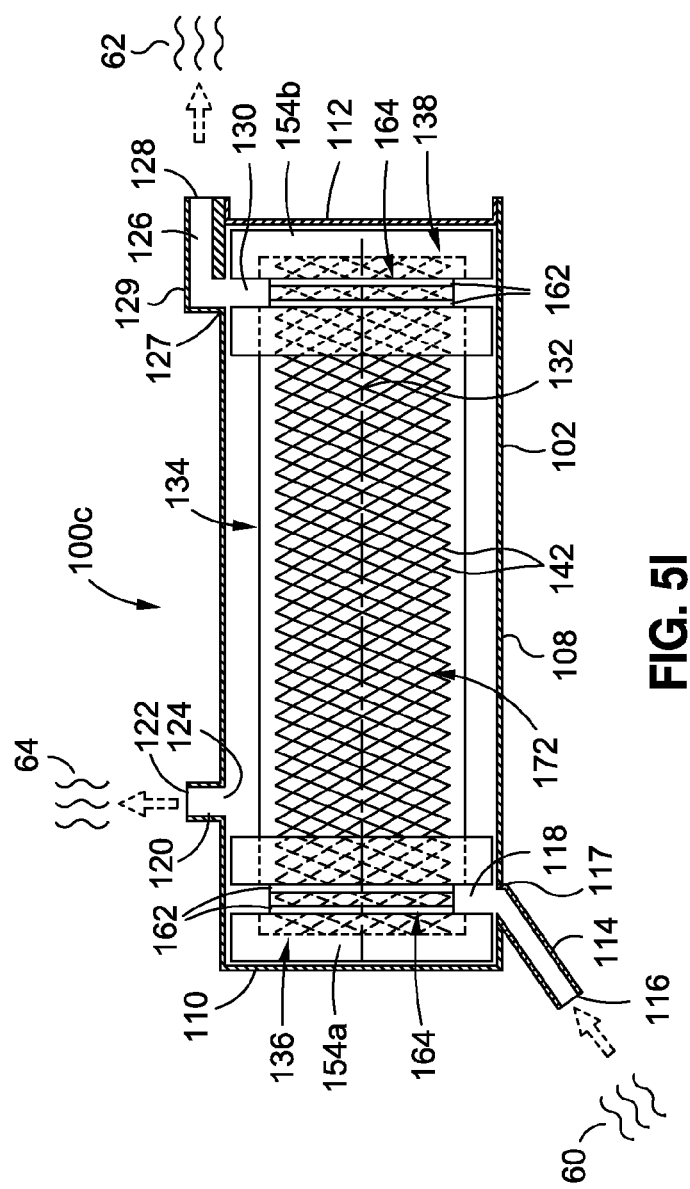
FIG. 5I is an illustration of a side view in cross-section of yet another one of the embodiments of a fluid separation assembly of the disclosure.

FIG. 5I is an illustration of a side view in cross-section of yet another one of the embodiments of a fluid separation assembly 100c of the disclosure. FIG. 5J is an illustration of a right end view of the fluid separation assembly 100c of FIG. 5I.

Figure 16:
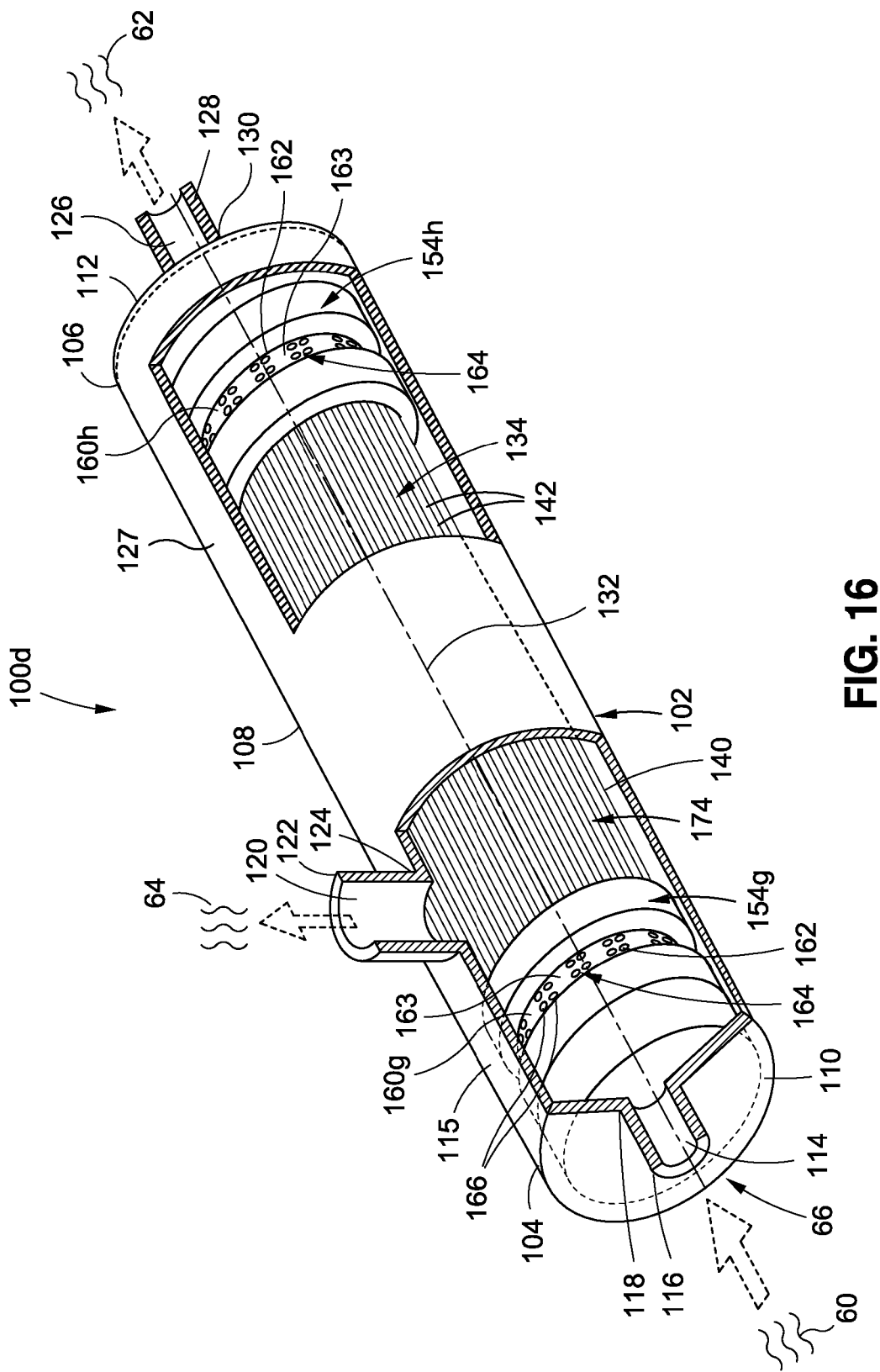
FIG. 16 is an illustration of a partial cut-away perspective view of another one of the embodiments of a fluid separation assembly of the disclosure.

FIG. 16 is an illustration of a partial cut-away perspective view of another one of the embodiments of a fluid separation assembly 100d of the disclosure. The fluid separation assembly 100d is directed to a center tube radial feed configuration 66 (see FIG. 16), discussed in more detail below.

Figure 6A:
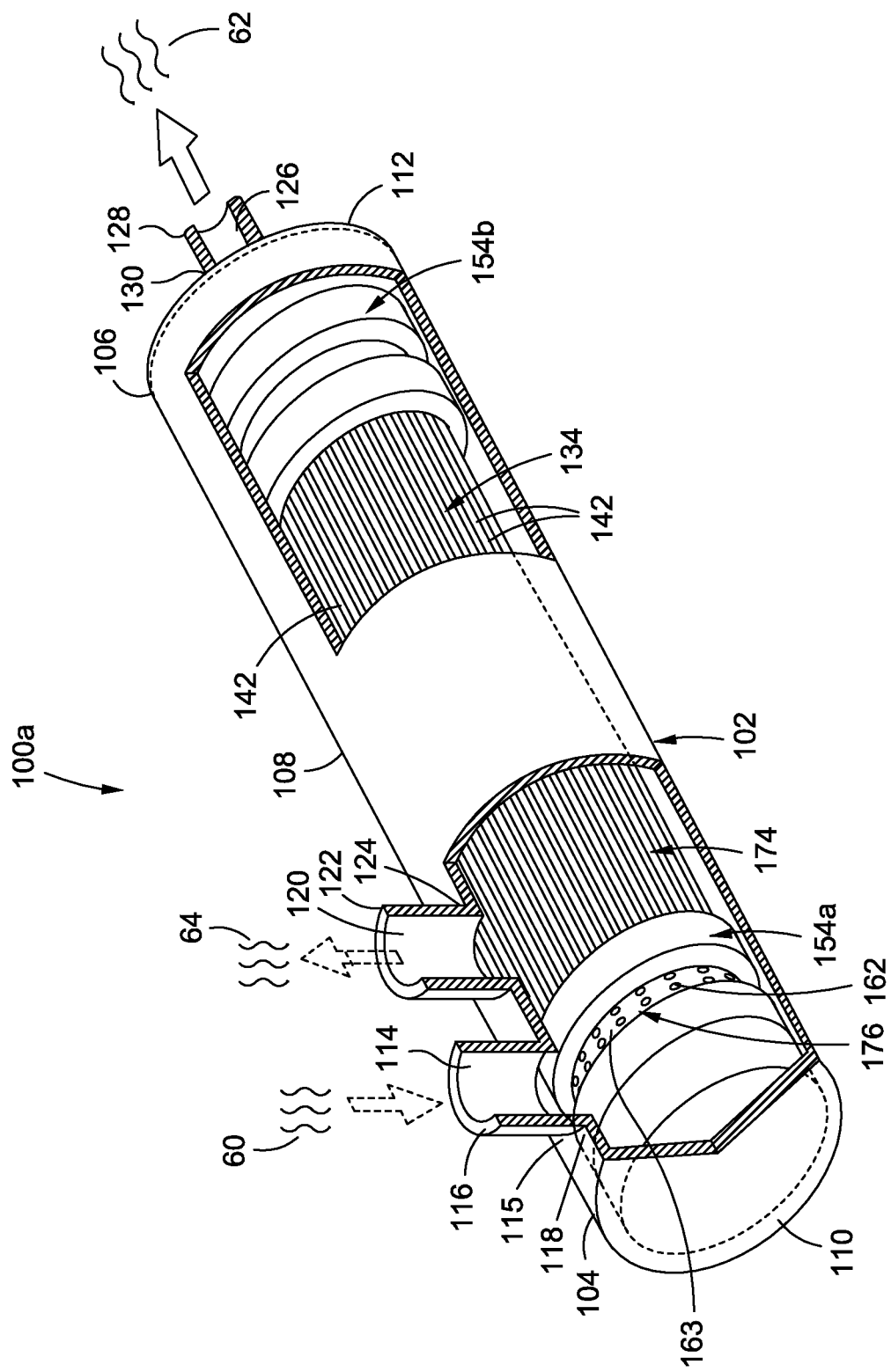
FIG. 6A is an illustration of a partial cut-away perspective view of one of the embodiments of a fluid separation assembly of the disclosure.
Figure 6B:
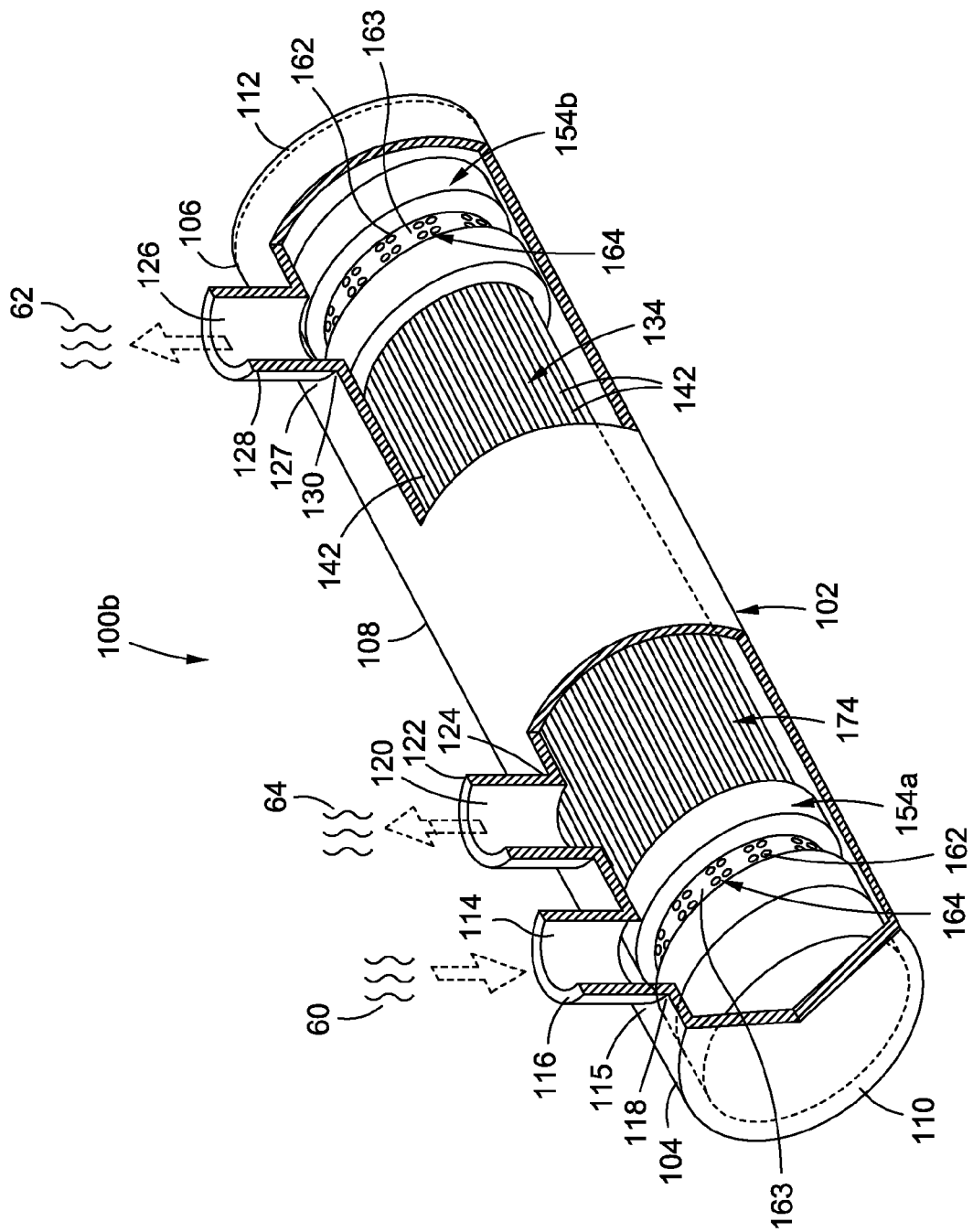
FIG. 6B is an illustration of a partial cut-away perspective view of another one of the embodiments of a fluid separation assembly of the disclosure.

FIG. 6A is an illustration of a partial cut-away perspective view of one of the embodiments of the fluid separation assembly 100a having a plurality of hollow fiber membranes 142 in a parallel configuration 174. FIG. 6B is an illustration of a partial cut-away perspective view of one of the embodiments of the fluid separation assembly 100b having the plurality of hollow fiber membranes 142 in a parallel configuration 174.

As shown in FIGS. 4A-6B, each fluid separation assembly 100a, 100b, 100c comprises a housing 102 that is preferably cylindrical in shape. However, the housing 102 may also comprise another suitable shape or design. As shown in FIGS. 5A, 6A, the housing 102 comprises a first end 104, a second end 106, and a body 108. A first end cap 110 may be removably or permanently attached to the first end 104 of the housing 102. A second end cap 112 may be removably or permanently attached to the second end 106 of the housing 102. Preferably, the first end cap 110 and the second end cap 112 are closed or sealed.

As shown in FIGS. 4A-6B, the housing 102 further comprises a feed inlet port 114 having a first feed inlet port end 116 and a second feed inlet port end 118. In one embodiment, as shown in FIGS. 5A, 5E, 6A, 6B, the feed inlet port 114 may be formed on or extends from an upper portion 115 of the body 108 or side of the housing 102 instead of the first end 34 (see FIG. 2A) as in existing designs.

In another embodiment, as shown in FIG. 5I, the feed inlet port 114 may be formed on or extends from a lower portion 117 of the body 108 of the housing 102. As shown in FIGS. 4A-6B, the housing 102 further comprises a permeate outlet port 120 having a first permeate outlet port end 122 and a second permeate outlet port end 124. As shown in FIGS. 4A-6B, the housing 102 further comprises a non-permeate outlet port 126 having a first non-permeate outlet port end 128 and a second non-permeate outlet port end 130.

In one embodiment of the fluid separation assembly 100a, as shown in FIGS. 4A, 5A, 6A, the non-permeate outlet port 126 is formed on or extends from the second end cap 112 at the second end 106 of the housing 102. In another embodiment of the fluid separation assembly 100b, as shown in FIGS. 4B, 5E, 6B, the non-permeate outlet port 126 may be formed on or extends from an upper portion 127 of the body 108 or side of the housing 102 instead of the second end cap 112.

In yet another embodiment of the fluid separation assembly 100c, as shown in FIG. 5I, the non-permeate outlet port 126 may be formed on or extends from the upper portion 127 of the body 108 or side of the housing 102 instead of the second end cap 112, and the non-permeate outlet port 126 may have a bent portion 129. The feed inlet port 114, the permeate outlet port 120, and/or the non-permeate outlet port 126 may be oriented tangentially to a longitudinal central axis 132 (see FIG. 5E) of the housing 102, may be oriented perpendicular to or inclined to the longitudinal central axis 132 (see FIG. 6B) of the housing 102, may be oriented non-tangentially to the longitudinal central axis 132 (see FIG. 5I) of the housing 102, or may be oriented in another suitable position. For the embodiment of the fluid separation assembly 100b shown in FIGS. 5E, 6B, preferably, the feed inlet port 114, the permeate outlet port 120, and the non-permeate outlet port 126 are tangential to and not parallel to the longitudinal central axis 132 of the housing 102.

As shown in FIGS. 4A-6B, each assembly 100a, 100b, 100c further comprises a hollow fiber bundle 134 positioned or disposed within the housing 102. As shown in FIG. 5A, the hollow fiber bundle 134 comprises end 136 formed and encapsulated by a first tubesheet 154a, discussed below, and comprises end 138 formed and encapsulated by a second tubesheet 154b, discussed below. The hollow fiber bundle 134 further comprises a body portion 140. The hollow fiber bundle 134 comprises a plurality of hollow fiber membranes 142.

Figure 7A:
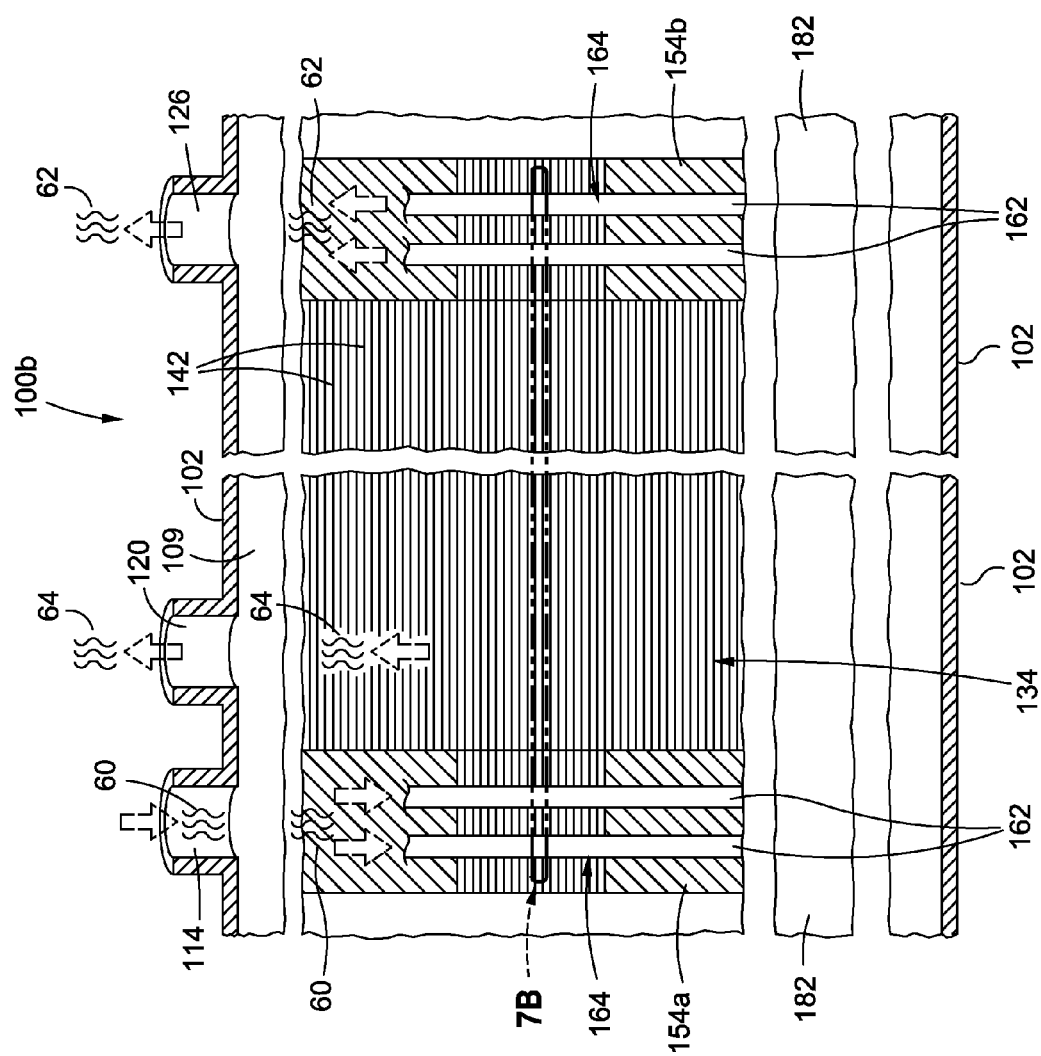
FIG. 7A is an illustration of a side view in partial cross-section showing fluid flow through the radial through openings of one of the embodiments of a fluid separation assembly of the disclosure.
Figure 7B:
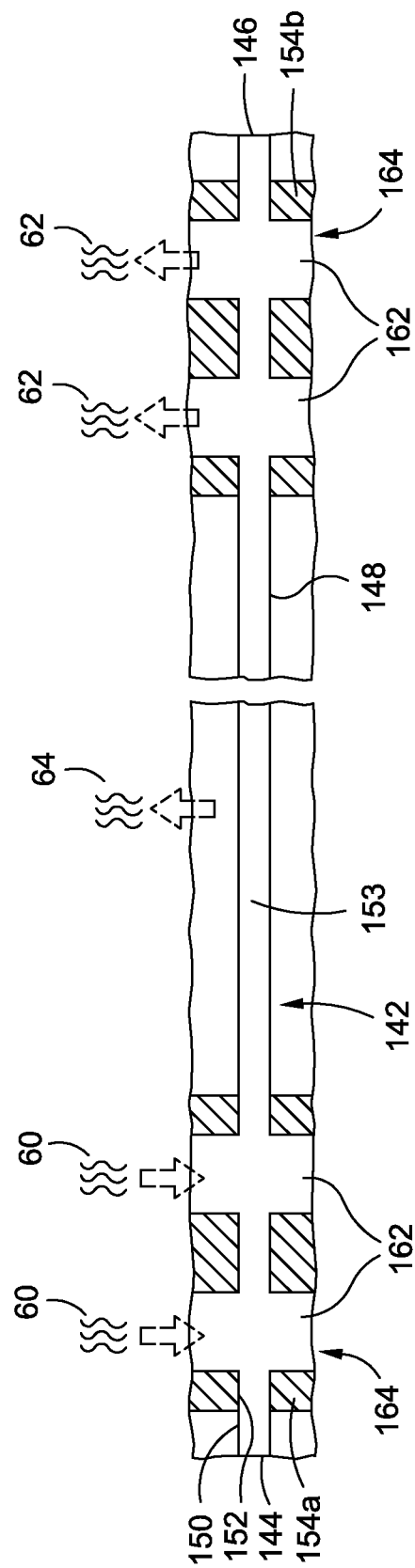
FIG. 7B is an illustration of an enlarged side view in partial cross-section showing fluid flow through an individual hollow fiber membrane of the fluid separation assembly of FIG. 7A.

As shown in FIG. 7B, each hollow fiber membrane 142 has a first end 144, a second end 146 and an elongated body portion 148, as well as an exterior surface 150 and an interior surface 152. The plurality of hollow fiber membranes 142 are preferably permeable or active along the body portion 140 of the hollow fiber bundle. The first ends 144 of the hollow fiber membranes 142 encapsulated by the first tubesheet 154a are not permeable, and the second ends 146 of the hollow fiber membranes 142 encapsulated by the second tubesheet 154b are not permeable. Preferably, the plurality of hollow fiber membranes 142 are made of a flexible polymeric material such as thermoplastic, PEEK (polyether ether ketone), polysulfones, polyimides, or another suitable flexible polymeric material. The plurality of hollow fiber membranes 142 may be arranged in various configurations. For example, the plurality of hollow fiber membranes 142 may be arranged in a criss-cross or helical configuration 172 (see FIGS. 5A, 5E, 5I), or the plurality of hollow fiber membranes 142 may be arranged in a parallel configuration 174 (see FIGS. 6A, 6B), or the plurality of hollow fiber membranes 142 may be arranged in another suitable configuration.

As shown in FIGS. 4A-6B, each assembly 100a, 100b, 100c further comprises a first tubesheet 154a and a second tubesheet 154b encapsulating respective ends 136, 138 of the hollow fiber bundle. Preferably, both of the first and second tubesheets 154a, 154b are both positioned or disposed within the housing 102. As shown in FIG. 5C, the first tubesheet 154a has a first end 156a, a second end 158a, and a body portion 160a. The first tubesheet 154a preferably encapsulates the first ends 144 of the hollow fiber membranes 142 and forms end 136 of the hollow fiber bundle 134. The first ends 144 of the hollow fiber membranes 142 which are exposed are preferably embedded in an epoxy matrix or another suitable polymer matrix to form the first tubesheet 154a. As shown in FIG. 5C, the second tubesheet 154b has a first end 156b, a second end 158b, and a body portion 160b. The second tubesheet 154b preferably encapsulates the second ends 146 of the hollow fiber membranes 142 and forms end 138 of the hollow fiber bundle 134. The second ends 146 of the hollow fiber membranes 142 which are exposed are preferably embedded in an epoxy matrix or another suitable polymer matrix to form the second tubesheet 154b. The housing 102 preferably surrounds the hollow fiber bundle 134 with the first and second tubesheets 154a, 154b. The first and second tubesheets 154a, 154b, as well as tubesheets 154c (see FIG. 8A), 154d (see FIG. 9A), 154e (see FIG. 10A), and 154f (see FIG. 11A), may preferably be comprised of a polymer material such as epoxy or another suitable material.

With embodiments of the fluid separation assembly 100a, 100b, 100c, 100d, if the fluid separation assembly is operated at higher air temperatures than known gas separation assemblies, e.g., air separation modules, the fluid separation assembly 100a, 100b, 100c, 100d, may have a useful service life of about the same as the known gas separation assemblies but requires less load than the known gas separation assemblies. With embodiments of the fluid separation assembly 100a, 100b, 100c, 100d, if the fluid separation assembly is operated at about the same temperature as known gas separation assemblies, e.g., air separation modules, the fluid separation assembly 100a, 100b, 100c, 100d, may have a longer useful service life than the known gas separation assemblies but about the same load as the known gas separation assemblies. Embodiments of the fluid separation assembly disclosed herein preferably are constructed or assembled in order to operate at their most optimum temperature and pressure for a desired application. For example, embodiments of the fluid separation assembly 100a, 100b, 100c, 100d, for aircraft may operate in a temperature range of about 120 degrees Fahrenheit to about 210 degrees Fahrenheit, or higher. There are circumstances that drive different temperature selections for different applications, for example, some epoxy materials may operate at higher temperatures than others. In addition, size, weight, and upstream cooling requirements may be reduced as inlet temperature increases. For example, the preferred temperature range for an aircraft system, to minimize the fluid separation assembly or air separation module size and weight and upstream cooling requirements at the cost of increased air consumption, may be selected from the highest temperature the fluid separation assembly or air separation module can tolerate less the normal temperature control band and design margin. Further, embodiments of the fluid separation assembly 100a, 100b, 100c, 100d for aircraft may operate in a pressure range of about 20 psi (pounds per square inch) to about 80 psi. The fluid separation assembly or air separation module size and weight may be reduced as the inlet pressure increases.

As shown in FIG. 4A, 4B, the assembly 100a, 100b, respectively, may further comprise a first seal 170a adjacent the first tubesheet 154a and a second seal 170b adjacent the second tubesheet 154b, wherein the first and second seals 170a, 170b are fluid tight. Preferably, the first and second seals 170a, 170b are O-ring seals or another type of seal made of a synthetic rubber material, a thermoplastic material, or another suitable material. Alternatively, the first and second seals 170a, 170b may each comprise one or more seals adapted to fit within circumferential grooves 180 (see FIGS. 8A, 9A, 11A) of each of the first and second tubesheets 154a, 154b.

As shown in FIGS. 4A-6B, each assembly 100a, 100b, 100c further comprises a plurality of radial through openings 162 formed, in one embodiment, in one of the tubesheets 154a (see FIGS. 4A, 5A, 6A), and formed, in another embodiment, in each of the first and second tubesheets 154a, 154b (see FIGS. 4B, 5E, 6B). If the first tubesheet 154a has radial through openings 162, the radial through openings 162 are preferably formed in the body portion 160a of the first tubesheet 154a by cutting or drilling into the body portion 160a of the first tubesheet 154a around or along the circumference or perimeter 163 (see FIG. 6A) of the first tubesheet 154a. If the second tubesheet 154b has radial through openings 162, the radial through openings 162 are preferably formed in the body portion 160b of the second tubesheet 154b by cutting or drilling into the body portion 160b of the second tubesheet 154b around or along the circumference or perimeter 163 (see FIG. 6B) of the second tubesheet 154b. The radial through openings 162 preferably intersect or sever at least the exterior surface 150 (see FIG. 7B) and the interior surface 152 (see FIG. 7B) of each, or substantially each, of the hollow fiber membranes 142. The shape of the radial through openings 162 may be circular or round, elliptical, or another suitable shape.

FIGS. 4A, 5A-5D, and 6A show the embodiment of the fluid separation assembly 100a where only the first tubesheet 154a has the radial through openings 162. As shown in FIG. 5A, the radial through openings 162 intersect the plurality of hollow fiber membranes 142 encapsulated by the first tubesheet 154a to form end 136, and the radial through openings 162 are open to the feed inlet port 114. Cutting or drilling the radial through openings 162 through the plurality of hollow fiber membranes 142 encapsulated by the first tubesheet 154a allows feed gas 60, preferably pressurized feed gas, access to the interiors of the plurality of hollow fiber membranes 142, and the feed gas 60 flows into the individual hollow fiber membranes 142 from the feed inlet port 114. The feed gas 60 is preferably introduced into the plurality of hollow fiber membranes 142 via the plurality of radial through openings 162 formed in the first tubesheet 154a.

As shown in FIGS. 4A and 5D, the second tubesheet 154b has a plurality of non-radial through openings 50 that open through the second end 158b of the second tubesheet 154b and are open to the second end cap 112 and the non-permeate outlet port 126. The radial through openings 162 formed in one of the tubesheets 154a or 154b minimize pressure loads and bending moments or stress on the first tubesheet 154a or the second tubesheet 154b.

FIGS. 4B, 5E-5J, and 6B show the embodiments of the fluid separation assembly 100b, 100c where both the first tubesheet 154a and the second tubesheet 154b have the radial through openings 162 in a four opening pattern 164, discussed in detail below. As shown in FIG. 5E, the radial through openings 162 intersect the plurality of hollow fiber membranes 142 encapsulated by the first tubesheet 154a to form end 136, and the radial through openings 162 are open to the feed inlet port 114. Cutting or drilling the radial through openings 162 through the plurality of hollow fiber membranes 142 encapsulated by the first tubesheet 154a allows feed gas 60, preferably pressurized feed gas, access to the interiors of the hollow fiber membranes 142, and the feed gas 60 flows into the individual hollow fiber membranes 142 from the feed inlet port 114. The feed gas 60 is preferably introduced into the plurality of hollow fiber membranes 142 via the plurality of radial through openings 162 formed in the first tubesheet 154a.

As shown in FIGS. 4B and 5E, the second tubesheet 154b also has a plurality of radial through openings 162 with a four opening pattern 164. The radial through openings 162 intersect the plurality of hollow fiber membranes 142 encapsulated by the second tubesheet 154b to form end 138, and the radial through openings 162 are open to the non-permeate outlet port 126 at the second end 138 of the hollow fiber bundle 134 that is encapsulated by the second tubesheet 154b. Cutting or drilling the radial through openings 162 through the plurality of hollow fiber membranes 142 encapsulated by the second tubesheet 154b allows non-permeate gas 62 or inert gas, such as nitrogen enriched air (NEA), to flow out of the individual hollow fiber membranes 142 and out through the non-permeate outlet port 126. The non-permeate gas 62 is preferably removed from the plurality of hollow fiber membranes 142 via the plurality of radial through openings 162 formed in the second tubesheet 154b. The radial through openings 162 intersect or sever the plurality of hollow fiber membranes 142 in the first and second tubesheets 154a, 154b, so that feed gas 60, permeate gas 64, and/or non-permeate gas 62 may be introduced into or removed from the plurality of hollow fiber membranes 142 via the plurality of radial through openings 162. The radial through openings 162 formed in each of the first and second tubesheets 154a, 154b minimize pressure loads and bending moments or stress on each of the first and second tubesheets 154a, 154b.

Thus, in one embodiment of the fluid separation assembly 100a (see FIG. 4A), the assembly 100a comprises a hollow fiber bundle 134 comprising a plurality of hollow fiber membranes 142, a first tubesheet 154a and a second tubesheet 154b encapsulating respective ends 136, 138 of the hollow fiber bundle 134, wherein one of the tubesheets 154a has a plurality of radial through openings 162 formed in the tubesheet 154a. The assembly 100a further comprises a housing 102 surrounding the hollow fiber bundle 134 and the first and second tubesheets 154a, 154b, the housing 102 having a feed inlet port 114, a permeate outlet port 120, and a non-permeate outlet port 126. The feed gas 60, permeate gas 64, or non-permeate gas 62 are introduced into or removed from the plurality of hollow fiber membranes 142 via the plurality of radial through openings 162 formed in the tubesheet 154a, such that the radial through openings 162 of the tubesheet 154a intersect each or substantially each of the hollow fiber membranes 142.

In another embodiment of the fluid separation assembly 100b (see FIG. 4B), the assembly 100b comprises a hollow fiber bundle 134 comprising a plurality of hollow fiber membranes 142, a first tubesheet 154a and a second tubesheet 154b encapsulating respective ends 136, 138 of the hollow fiber bundle 134, wherein at least one tubesheet 154a, and preferably both first and second tubesheets 154a, 154b have a plurality of radial through openings 162 formed in the at least one tubesheet 154a or both first and second tubesheets 154a, 154b. The radial through openings 162 are preferably in a repeating four opening pattern 164 comprising four openings 166 in a substantially square configuration 168.

The fluid separation assembly 100b (see FIG. 4B) further comprises a housing 102 surrounding the hollow fiber bundle 134 and the first and second tubesheets 154a, 154b, the housing 102 having a feed inlet port 114, a permeate outlet port 120, and a non-permeate outlet port 126. Feed gas 60, permeate gas 64, or non-permeate gas 62 are introduced into or removed from the plurality of hollow fiber membranes 142 via the plurality of radial through openings 162 formed in the at least one tubesheet 154a or both tubesheets 154a, 154b, such that the radial through openings 162 of the at least one tubesheet 154a or both the first and second tubesheets 154a, 154b intersect each, or substantially each, of the hollow fiber membranes 142. The feed inlet port 114 is in flow communication with at least a portion of the radial through openings 162 on the first tubesheet 154a, so that the feed gas 60 comprising air can flow into the intersected hollow fiber membranes 142. The non-permeate outlet port 126 is in flow communication with at least a portion of the radial through openings 162 on the second tubesheet 154b, so that the non-permeate gas 62 comprising nitrogen enriched air can flow out of the intersected hollow fiber membranes 142 and out of the housing 102. The permeate outlet port 120 is in flow communication with an interior 109 (see FIG. 7A) of the housing 102, so that the permeate gas 64 comprising one or more of oxygen, carbon dioxide, and water can permeate out of the intersected hollow fiber membranes 142 and out of the housing 102. The fluid separation assembly 100b (see FIG. 4B) may further comprise at least one first seal 170a adjacent the first tubesheet 154a and at least one second seal 170b adjacent the second tubesheet 154b, wherein the first and second seals 170a, 170b are fluid tight. The fluid separation assembly 100a, 100b, 100c is preferably part of an inert gas generating system 28 in a transport vehicle, such as an aircraft 10. The transport vehicle may also comprise an aerospace vehicle, a space launch vehicle, a rocket, a satellite, a rotorcraft, a watercraft, a boat, a ship, a train, an automobile, a truck, a bus, or another suitable transport vehicle.

The radial through openings 162 may be formed in varying patterns around or along the circumference or perimeter 163 of the tubesheet and radially through the tubesheet by cutting or drilling radially into the body portion of the tubesheet from the circumference or perimeter of the tubesheet. The pattern and spacing of the radial through openings 162 are selected so as to reduce or minimize the pressure load and bending moments or stress on the tubesheet and maximize the strength of the tubesheet. Moreover, the pattern and depth of the radial through openings 162 are selected depending on the diameter of the tubesheet and/or diameter of the housing of the fluid separation assembly. Preferably, the wind angle of the hollow fiber membranes 142 and the size and location of the radial through openings 162 are selected so that the radial through openings 162 intersect or sever all, or substantially all, of the hollow fiber membranes 142. More preferably, the wind angle of the hollow fiber membranes 142 and the size and location of the radial through openings 162 are selected so that the radial through openings 162 intersect or sever all of the hollow fiber membranes 142.

In one exemplary embodiment, as shown in FIG. 6A, one tubesheet 154a has a two opening pattern 176 of radial through openings 162 in rows of two openings that repeat around or along the circumference or perimeter 163 of the tubesheet 154a and radially through the tubesheet 154a. As shown in FIG. 6A, the two opening pattern 176 is spaced evenly around or along the circumference or perimeter 163 of the tubesheet 154a.

In another exemplary embodiment as shown in FIGS. 4B, 5E, 5I, 6B, 8A, 9A, the tubesheets 154a, 154b (FIG. 6B), tubesheet 154c (FIG. 8A), and tubesheet 154d (FIG. 9A) all have radial through openings 162 in a repeating four opening pattern 164 that comprises four spaced openings 166 that form a substantially square configuration 168. The four opening pattern 164 of radial through openings 162 repeats around or along the circumference or perimeter 163 of the tubesheet and radially through the tubesheet. Preferably, the four opening pattern 164 may be used with the fluid separation assembly 100b, 100c having the hollow fiber membranes 142 in the criss-cross or helical configuration 172 (see FIGS. 5E, 5I).

FIG. 8A is an illustration of a side view of the exemplary embodiment of the tubesheet 154c that may be used in one of the embodiments of the fluid separation assembly 100b, 100c, disclosed herein. FIG. 8A shows the repeating four opening pattern 164 of radial through openings 162 comprised of four spaced openings 166 that form a substantially square configuration 168. Preferably, the four opening pattern 164 shown in FIG. 8A has thirty-two (32) total radial through openings 162.

As shown in FIG. 8A, the tubesheet 154c has a first end 156c, a second end 158c, and a body portion 160c. In this embodiment, tubesheet 154c further comprises a manifold or plenum 178 and further comprises grooves 180 in the first end 156c and the second end 158c of the tubesheet 154c. The manifold or plenum 178 is a space or open portion in the tubesheet 154c intended to contain a fluid, such as gas, that flows into and out of the radial through openings 162 at a positive pressure. Having the manifold or plenum 178 within the tubesheet 154c may also simplify the manufacture of the housing 102. The manifold or plenum may also be formed into the housing 102 to allow the fluid to flow from the inlet port 114 to the radial through openings 162. The grooves 180 may preferably be adapted to contain or hold one or more fluid tight seals 170a, 170b (see FIG. 4B), such as O-ring seals or another suitable seal. As discussed above, the O-ring seals or other suitable seals may preferably be made of a synthetic rubber material, a thermoplastic material, or another suitable material. FIG. 8B is an illustration of a cross-sectional view taken along lines 8B-8B of the tubesheet 154c of FIG. 8A. FIG. 8B shows the radial through openings 162, the manifold or plenum 178, and a central opening 182 formed longitudinally through the center of the tubesheet 154c. The radial through openings 162 formed in the tubesheet 154c minimize or reduce pressure loads and bending moments or stress on the tubesheet 154c. FIG. 8B further shows a spacing 195 of the radial through openings 162 which is preferably the maximum distance between each four opening pattern 164.

Figure 9B:
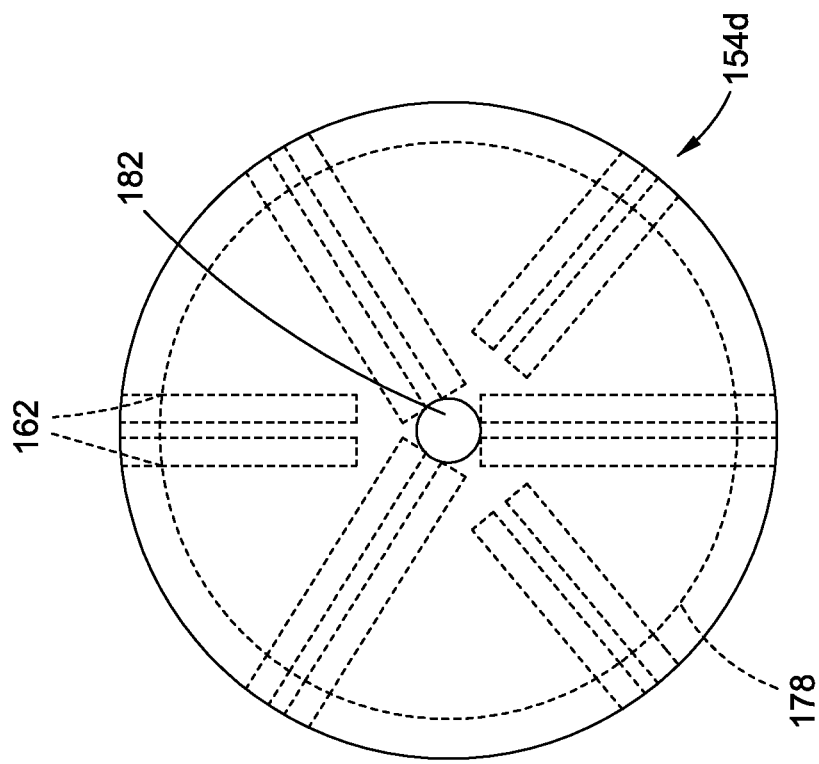
FIG. 9B is an illustration of a cross-sectional view taken along lines 9B-9B of FIG. 9A.
Figure 9A:
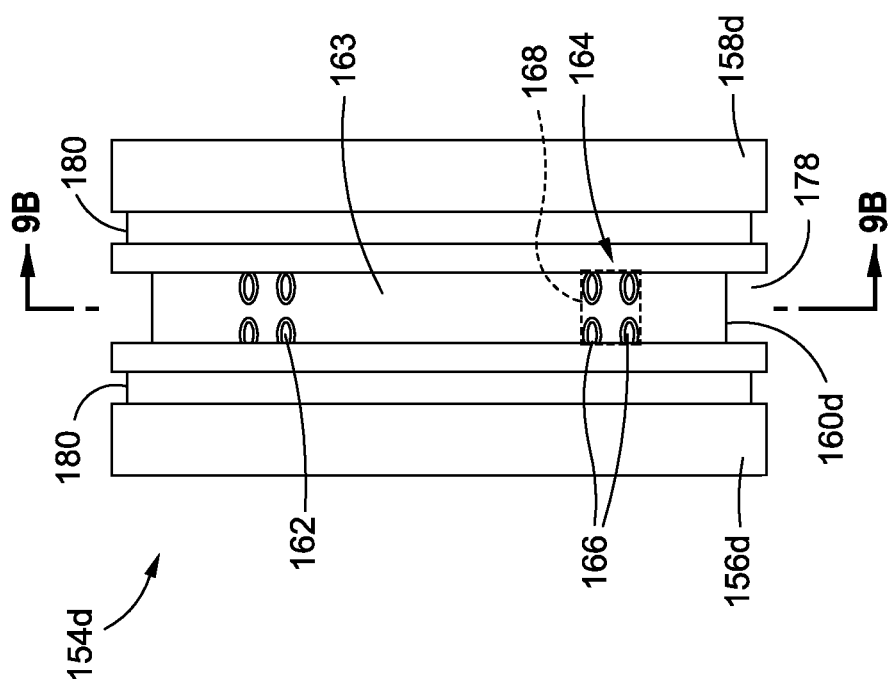
FIG. 9A is an illustration of a side view of another one of the embodiments of a tubesheet that may be used in one of the embodiments of the fluid separation assembly of the disclosure.

In another exemplary embodiment as shown in FIG. 9A, tubesheet 154d also has a four opening pattern 164 that comprises four spaced openings 166 that form a substantially square configuration 168. For example, tubesheet 154d has the four opening pattern 164 of radial through openings 162 that repeats around or along the circumference or perimeter 163 of the tubesheet 154d and radially through the tubesheet 154d. Preferably, this four opening pattern 164 of tubesheet 154d has twenty-four (24) total radial through openings 162, and each four opening pattern 164 of tubesheet 154d is spaced farther apart than each four opening pattern 164 in tubesheet 154c of FIG. 8A.

FIG. 9A is an illustration of a side view of the exemplary embodiment of the tubesheet 154d that may be used in one of the embodiments of the fluid separation assembly 100b, 100c disclosed herein. As shown in FIG. 9A, the tubesheet 154d has a first end 156d, a second end 158d, and a body portion 160d. In this embodiment, tubesheet 154d further comprises the manifold or plenum 178 and further comprises grooves 180 in the first end 156d and the second end 158d of the tubesheet 154d. As discussed above, the manifold or plenum 178 is a space or open portion in the tubesheet 154d intended to contain a fluid, such as gas, that flows into and out of the radial through openings 162 at a positive pressure. Having the manifold or plenum 178 within the tubesheet 154d may also simplify the manufacture of the housing 102. The grooves 180 may preferably be adapted to contain or hold one or more fluid tight seals 170a, 170b (see FIG. 4B), such as O-ring seals or another suitable seal. As discussed above, the O-ring seals or other suitable seals may preferably be made of a synthetic rubber material, a thermoplastic material, or another suitable material.

FIG. 9B is an illustration of a cross-sectional view taken along lines 9B-9B of the tubesheet 154d of FIG. 9A. FIG. 9B shows the radial through openings 162, the manifold or plenum 178, and the central opening 182 formed longitudinally through the center of the tubesheet 154d. The radial through openings 162 formed in the tubesheet 154d minimize or reduce pressure loads and bending moments or stress on the tubesheet 154d.

Figure 10A:
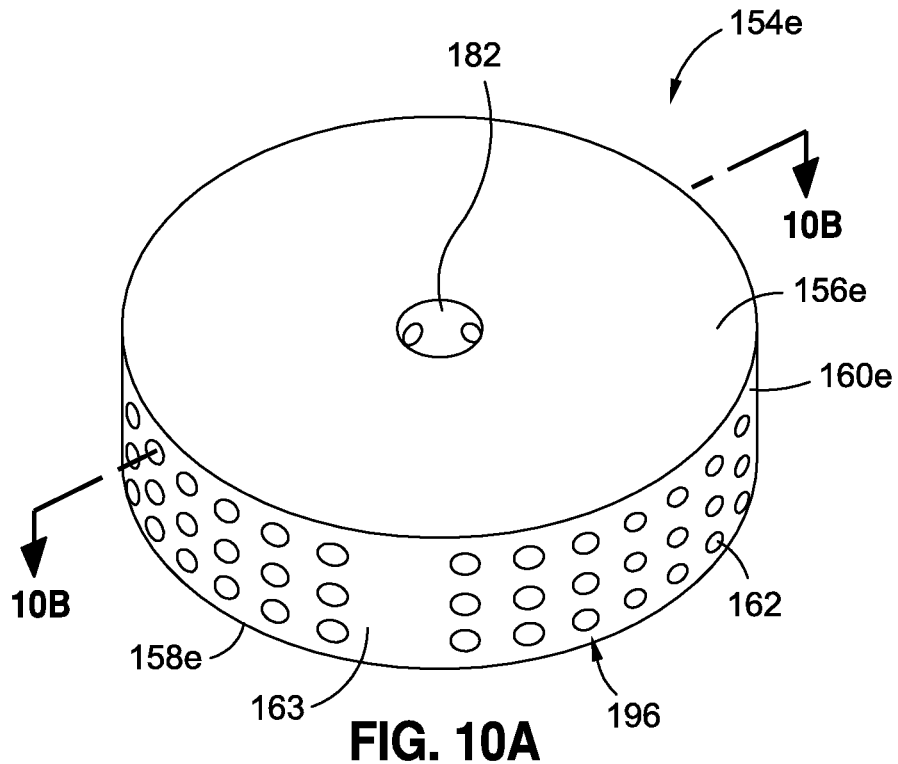
FIG. 10A is an illustration of a perspective view of another one of the embodiments of a tubesheet that may be used in one of the embodiments of the fluid separation assembly of the disclosure.
Figure 10B:
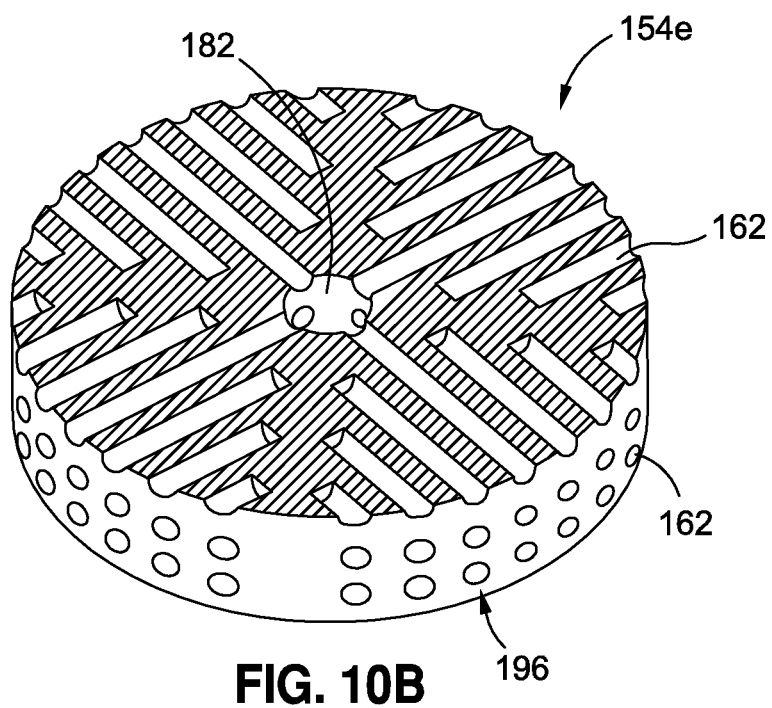
FIG. 10B is an illustration of a cross-sectional view taken along lines 10B-10B of FIG. 10A.

In another exemplary embodiment as shown in FIG. 10A, tubesheet 154e has a three opening pattern 196 of radial through openings 162 in rows of three openings that repeat around or along the circumference or perimeter 163 of the tubesheet 154e and radially through the tubesheet 154e. FIG. 10A is an illustration of a perspective view of the exemplary embodiment of the tubesheet 154e that may be used in one of the embodiments of the fluid separation assembly 100a disclosed herein. As shown in FIG. 10A, the tubesheet 154e has a first end 156e, a second end 158e, and a body portion 160e. FIG. 10B is an illustration of a cross-sectional view taken along lines 10B-10B of the tubesheet 154e of FIG. 10A. FIG. 10B shows the radial through openings 162 and the central opening 182 formed longitudinally through the center of the tubesheet 154e. The radial through openings 162 formed in the tubesheet 154e minimize or reduce pressure loads and bending moments or stress on the tubesheet 154e.

In another exemplary embodiment as shown in FIG. 11A, tubesheet 154f has an alternating row pattern 198 of two or more rows of radial through openings 162 around or along the circumference or perimeter 163 of the tubesheet 154f. FIG. 11A is an illustration of a perspective view of the exemplary embodiment of the tubesheet 154f that may be used in one of the embodiments of the fluid separation assembly 100a disclosed herein, preferably having the plurality of hollow fiber membranes 142 in the parallel configuration 174 (see FIG. 6A).

As shown in FIG. 11A, the tubesheet 154f has a first end 156f, a second end 158f, and a body portion 160f. In this embodiment, tubesheet 154f further comprises the manifold or plenum 178 and further comprises grooves 180 in the first end 156f and the second end 158f of the tubesheet 154f. As discussed above, the manifold or plenum 178 is a space or open portion in the tubesheet 154f intended to contain a fluid, such as gas, that flows into and out of the radial through openings 162 at a positive pressure. Having the manifold or plenum 178 within the tubesheet 154f may also simplify the manufacture of the housing 102.

The grooves 180 may preferably be adapted to contain or hold one or more fluid tight seals 170a, 170b (see FIG. 4A), such as O-ring seals or another suitable seal. As discussed above, the O-ring seals or other suitable seals may preferably be made of a synthetic rubber material, a thermoplastic material, or another suitable material. FIG. 11B is an illustration of a cross-sectional view taken along lines 11B-11B of the tubesheet 154f of FIG. 11A. FIG. 11B shows the radial through openings 162 and the central opening 182 formed longitudinally through the center of the tubesheet 154f. The radial through openings 162 formed in the tubesheet 154f minimize or reduce pressure loads and bending moments or stress on the tubesheet 154f.

In particular, the four opening pattern 164 of radial through openings 162 has several advantages. FIG. 12A is an illustration of the four opening pattern 164 comprising four spaced openings 166 that form a substantially square configuration 168.

FIG. 12B is an illustration of a one opening pattern 188 comprising a single opening 190. FIG. 12C is an illustration of spacing 195 between the four opening pattern 164 of radial through openings 162 of FIG. 12A.

A comparison was made between the four opening pattern 164 and the one opening pattern 188. It was found that the four openings 166 of the four opening pattern 164 intersected or opened as many hollow fiber membranes as the single opening 190 which was four (4) times the diameter size of each opening 166 with only a minimal amount of the tubesheet material being removed in order to form the four openings 166. Dotted lines 184 (see FIG. 12A) represent the hollow fiber membranes the four smaller openings 166 intersected or opened, and dotted lines 192 (see FIG. 12B) represent the hollow fiber membranes the single opening 190 intersected or opened. There are several advantages of the four opening pattern 164. For example, the four opening pattern 164 intersects or opens substantially all of the hollow fiber membranes. In addition, the smaller openings 166 of the four opening pattern 164 allows for more of the tubesheet material to support a load on the tubesheet. Once the hollow fiber membranes are intersected or opened, the feed gas 60, preferably under high pressure, or supply air may enter the hollow fiber membranes so the separation process can take place. When the overall opening pattern size is smaller, for example, dimension A 186 (see FIG. 12A) is smaller than dimension B 194 (see FIG. 12B), and such smaller opening pattern size allows for increased manufacturing tolerance in a distance between the openings 166.

Moreover, the tubesheet may be smaller in size with the four opening pattern 164, and the overall weight of the tubesheet and fluid separation assembly may be decreased. Thus, the four opening pattern 164 maintains the strength of the material while minimizing the size of the tubesheet. The size of the openings 166 and the spacing of the openings 166 may be dependent on the thickness and diameter of the tubesheet and the wind angle of the hollow fiber membranes 142 and the diameter of the hollow fiber bundle 134. The four openings 166 in the substantially square configuration 168 of the four opening pattern 164 may vary depending on the thickness and diameter of the tubesheet and the wind angle of the hollow fiber membranes 142.

FIG. 12C shows that the four radial through openings 162 of each four opening pattern 164 intersect all of the hollow fiber membranes 142 that are in the area of each of the four radial through openings 162. This allows the next or subsequent four opening pattern 164 to be spaced farther apart from the preceding four opening pattern 164. FIG. 12C shows the spacing 195 between the four opening patterns 164. FIG. 8B also shows the spacing 195 of the radial through openings 162 which is preferably the maximum distance between each four opening pattern 164. The area below the radial through openings 162 (where the opening stops) may have the maximum distance between openings.

The flow of fluid through embodiments of the fluid separation assembly disclosed herein may be carried out in various ways depending on the embodiment of the fluid separation assembly used. FIG. 7A is an illustration of a side view in partial cross-section showing fluid flow through the radial through openings 162 of one of the embodiments of the fluid separation assembly 100b of the disclosure. As shown in FIG. 7A, the radial through openings 162 may be intersected by a central opening 182 that is longitudinal and may run parallel to the length of the hollow fiber bundle 134.

FIG. 7B is an illustration of an enlarged side view in partial cross-section showing fluid flow through an individual hollow fiber membrane 142 of the fluid separation assembly 100b of FIG. 7A. As shown in FIG. 7B, the radial through openings 162 intersect or sever an exterior surface 150 and an interior surface 152 of the hollow fiber membrane 142, so that the feed fluid or feed gas 60, preferably air or high pressure air, can flow into the intersected hollow fiber membrane 142 and proceed into the hollow fiber membrane 142 and down the length of the hollow fiber membrane 142.

FIG. 7A shows feed gas 60 entering through the feed inlet port 114. The feed inlet port 114 is in flow communication with at least a portion of the radial through openings 162 on the first tubesheet 154a, so that the feed gas 60 can flow into each or substantially each of the intersected hollow fiber membranes 142. Instead of entering the plurality of hollow fiber membranes 142 through, for example, end 156a (see FIG. 5C) of the tubesheet 154a, the feed gas 60 is channeled around or along the circumference or perimeter 163 of the tubesheet 154a and enters the radial through openings 162 around or along the circumference or perimeter 163 of the tubesheet 154a and radially through the tubesheet 154a. Preferably, the feed fluid or feed gas 60 comprises air, high pressure air, natural gas, flue gas or another suitable feed fluid or gas.

As the feed gas 60, preferably under high pressure, progresses down the length of the intersected hollow fiber membranes 142, permeate fluid or permeate gas 64 of oxygen enriched waste gas or air molecules, which may comprise non-nitrogen waste or exhaust gas. Preferably, the permeate fluid or permeate gas 64 comprises one or more of oxygen ($O_2$), carbon dioxide ($CO_2$), and/or water ($H_2O$); or methane or another suitable permeate fluid or gas. The permeate gas 64 may permeate through walls 153 (see FIG. 7B) of the hollow fiber membranes 142 and through the exterior surface 150 (see FIG. 7B) of the hollow fiber membranes 142 to the low pressure permeate outlet port 120 (see FIG. 7A) and may be exhausted overboard. FIG. 7A shows permeate gas 64 permeating out of the hollow fiber membranes 142 and out through the permeate outlet port 120. The permeate outlet port 120 is in flow communication with an interior 109 of the housing 102, so that the permeate gas 64 can permeate out of the exterior surface 150 of the hollow fiber membranes 142 and out of the housing 102.

As the feed gas 60, preferably under high pressure, progresses down the length of the hollow fiber membranes 142, non-permeate fluid or non-permeate gas 62, such as nitrogen molecules, continues down the length of the hollow fiber membranes 142 until they reach the radial through openings 162 of the second tubesheet 154b. The non-permeate fluid or non-permeate gas 62 preferably comprises nitrogen enriched air (NEA), nitrogen, nitrogen oxide, carbon monoxide, sulfur oxide, or another suitable non-permeate fluid or gas. The non-permeate gas 62 or inert gas, for example, nitrogen enriched air (NEA), may be collected and flows through the radial through openings 162 of the second tubesheet 154b and out through the non-permeate outlet port 126 where the nitrogen enriched air may be used in the inert gas generating system 28 and the fuel tank 26 (see FIG. 1).

FIG. 7A shows non-permeate gas 62 flowing out of the intersected hollow fiber membranes 142 into the radial through openings 162 and out through the non-permeate outlet port 126. The non-permeate outlet port 126 is in flow communication with at least a portion of the radial through openings 162 on the second tubesheet 154b, so that the non-permeate gas 62 can flow out of each or substantially each of the intersected hollow fiber membranes 142 and out of the housing 102.

Preferably, the fluid separation assembly 100a, 100b, 100c, 100d is part of an inert gas generating system 28 (see FIG. 1) in a transport vehicle, such as an aircraft 10 (see FIG. 1). The transport vehicle may also comprise an aerospace vehicle, a space launch vehicle, a rocket, a satellite, a rotorcraft, a watercraft, a boat, a ship, a train, an automobile, a truck, a bus or another suitable transport vehicle. As discussed above, embodiments of the fluid separation assembly in accordance with the disclosure may also be utilized in non-vehicle applications, such as portable ground support applications, medical applications, food storage applications, purification of natural gas applications, VOC removal applications, dehumidification applications, and other suitable non-vehicle applications.

In another embodiment of the disclosure, there is provided an aircraft 10 (see FIG. 1) comprising an airframe or fuselage 12 (see FIG. 1), at least one fuel tank 26 (see FIG. 1) mounted on the airframe or fuselage 12 (see FIG. 1), at least one fuel tank vent 27 (see FIG. 1) operatively connected to the fuel tank 26 (see FIG. 1), and an inert gas generating system 28 (see FIG. 1) for generating inert gas on board the aircraft 10 (see FIG. 1). The inert gas generating system 28 (see FIG. 1) preferably includes a fluid separation assembly 100a, 100b, 100c, or 100d as discussed above, and preferably the fluid separation assembly is in the form of a gas separation assembly. The fluid separation assembly, preferably in the form of the gas separation assembly, comprises a hollow fiber bundle 134 comprising a plurality of hollow fiber membranes 142. The fluid separation assembly, preferably in the form of the gas separation assembly, further comprises a first tubesheet 154a and a second tubesheet 154b, or tubesheets 154g, 154h (see FIG. 16) encapsulating respective ends 136, 138 of the hollow fiber bundle 134, wherein one of the tubesheets 154a, or tubesheets 154g, 154h (see FIG. 16) have a plurality of radial through openings 162 formed in the tubesheet 154a, or tubesheets 154g, 154h (see FIG. 16).

The fluid separation assembly, preferably in the form of the gas separation assembly, further comprises a housing 102 surrounding the hollow fiber bundle 134 and the first and second tubesheets 154a, 154b, or tubesheets 154g, 154h (see FIG. 16). The housing 102 has a feed inlet port 114, a permeate outlet port 120, and a non-permeate outlet port 126. Feed gas 60, permeate gas 64, or non-permeate gas 62 may be introduced into or removed from the plurality of hollow fiber membranes 142 via a plurality of radial through openings 162 formed in the tubesheet 154a, or tubesheets 154g, 154h (see FIG. 16), such that the radial through openings 162 of the tubesheet 154a, or tubesheets 154g, 154h (see FIG. 16) intersect each, or substantially each, of the hollow fiber membranes 142.

As discussed above, the radial through openings 162 may preferably be formed in a repeating four opening pattern 164 comprising four openings 166 in a substantially square configuration 168. The fluid separation assembly, preferably in the form of the gas separation assembly, is preferably part of an inert gas generating system 28 in a transport vehicle, such as an aircraft 10 (see FIG. 1). The transport vehicle may further comprise an aerospace vehicle, a space launch vehicle, a rocket, a satellite, a rotorcraft, a watercraft, a boat, a ship, a train, an automobile, a truck, and a bus, or another suitable transport vehicle.

Figure 13:
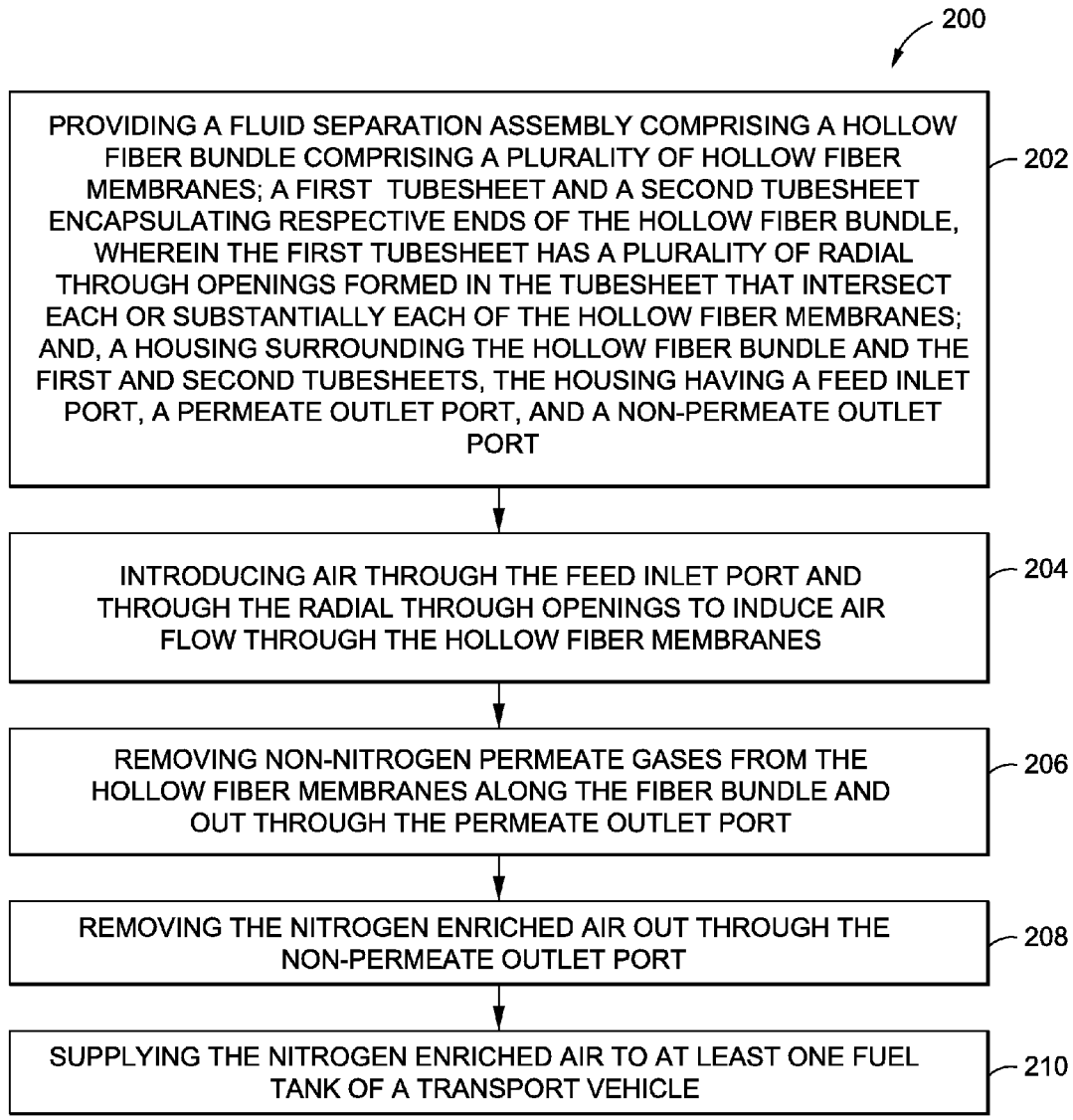
FIG. 13 is a flow diagram illustrating one of the embodiments of a method of the disclosure.

In another embodiment of the disclosure, there is provided a method 200 for supplying non-permeate gas 62 or inert gas, such as nitrogen enriched air, from a fluid separation assembly 100a, 100b, 100c, or 100d, to at least one fuel tank 26 (see FIG. 1) of a transport vehicle such as an aircraft 10 (see FIG. 1). FIG. 13 is a flow diagram illustrating one of the embodiments of the method 200 of the disclosure.

As shown in FIG. 13, the method 200 comprises step 202 of providing the fluid separation assembly 100a (see FIG. 5A), 100b (see FIG. 5E), 100c (see FIG. 5I), or 100d (see FIG. 16), as discussed herein. The fluid separation assembly 100a, 100b, 100c, 100d, as discussed herein, each comprises a hollow fiber bundle 134 comprising a plurality of hollow fiber membranes 142.

As discussed above, the fluid separation assembly 100a, 100b, 100c, 100d, each further comprises a first tubesheet 154a and a second tubesheet 154b, or tubesheets 154g, 154h (see FIG. 16) encapsulating respective ends 136, 138 of the hollow fiber bundle 134, wherein the first tubesheet 154a, or tubesheets 154g, 154h (see FIG. 16) have a plurality of radial through openings 162 formed in the first tubesheet 154a that intersect each, or substantially each, of the hollow fiber membranes 142. Alternatively, each of the two first and second tubesheets 154a, 154b have radial through openings 162 formed in a repeating four opening pattern 164 comprising four openings 166 in a substantially square configuration 168 (see FIG. 6B). As discussed above, the fluid separation assembly 100a, 100b, 100c, 100d, each further comprises a housing 102 surrounding the hollow fiber bundle 134 and the first and second tubesheets 154a, 154b, or tubesheets 154g, 154h (see FIG. 16). The housing 102 preferably has a feed inlet port 114, a permeate outlet port 120, and a non-permeate outlet port 126.

As shown in FIG. 13, the method 200 further comprises step 204 of introducing feed gas 60, such as air, and preferably pressurized air, through the feed inlet port 114 and through the radial through openings 162 to induce air flow, preferably pressurized air flow, through the plurality of hollow fiber membranes 142 (see FIG. 5A, 5E). As shown in FIG. 13, the method 200 further comprises step 206 of removing non-nitrogen permeate gases 64, such as one or more of oxygen, carbon dioxide, and/or water, from the plurality of hollow fiber membranes 142 along the hollow fiber bundle 134 and out through the permeate outlet port 120 (see FIG. 5A, 5E).

As shown in FIG. 13, the method 200 further comprises step 208 of removing non-permeate gas 62, such as nitrogen enriched air, out through the non-permeate outlet port 126 (see FIG. 5A, 5E). As shown in FIG. 13, the method 200 further comprises step 210 of supplying the non-permeate gas 62, such as the nitrogen enriched air, to at least one fuel tank 26 (see FIG. 1) of a transport vehicle such as an aircraft 10 (see FIG. 1).

Figure 14:
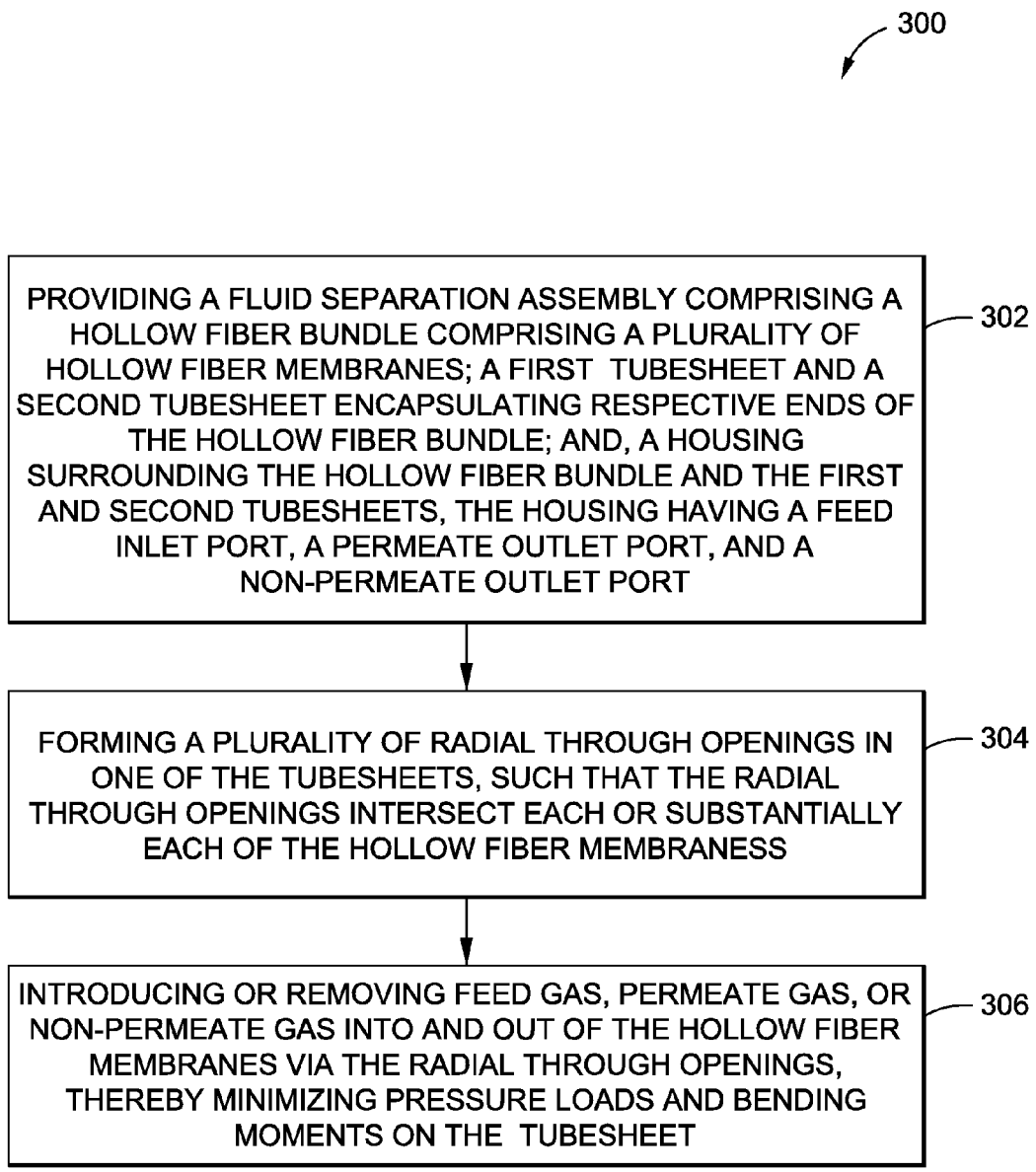
FIG. 14 is a flow diagram illustrating another one of the embodiments of a method of the disclosure.

In another embodiment of the disclosure, there is provided a method 300 for minimizing pressure loads and bending moments in the fluid separation assembly 100a, 100b, 100c, or 100d. FIG. 14 is a flow diagram illustrating one of the embodiments of another method 300 of the disclosure.

As shown in FIG. 14, the method 300 comprises step 302 of providing a fluid separation assembly 100a (see FIG. 5A), 100b (see FIG. 5E), 100c (see FIG. 5I), or 100d (see FIG. 16). As discussed above, the fluid separation assembly 100a, 100b, 100c, 100d, each comprises a hollow fiber bundle 134 comprising a plurality of hollow fiber membranes 142. As discussed above, the fluid separation assembly 100a, 100b, 100c, 100d, each further comprises a first tubesheet 154a and a second tubesheet 154b, or tubesheets 154g, 154h (see FIG. 16), encapsulating respective ends 136, 138 of the hollow fiber bundle 134. As discussed above, the fluid separation assembly 100a, 100b, 100c, 100d, each further comprises a housing 102 surrounding the hollow fiber bundle 134 and the first and second tubesheets 154a, 154b, or tubesheets 154g, 154h (see FIG. 16). The housing 102 has a feed inlet port 114, a permeate outlet port 120, and a non-permeate outlet port 126.

As shown in FIG. 14, the method 300 further comprises step 304 of forming a plurality of radial through openings 162 (for example, see FIGS. 4A-11B) in, for example, one of the first tubesheet 154a or second tubesheet 154b, or in one of tubesheet 154c (see FIG. 8A), tubesheet 154d (see FIG. 9A), tubesheet 154e (see FIG. 10A), tubesheet 154f (see FIG. 11A), tubesheet 154g (see FIG. 16) and/or tubesheet 154h (see FIG. 16), or another suitable tubesheet. The radial through openings 162 intersect or sever at least an exterior surface 150 (see FIG. 7B) and an interior surface 152 (see FIG. 7B) of each, or substantially each, of the hollow fiber membranes 142.

As shown in FIG. 14, the method 300 further comprises step 306 of introducing or removing feed gas 60, permeate gas 64, or non-permeate gas 62 (for example, see FIGS. 4A and 7A) into and out of the plurality of hollow fiber membranes 142 via the radial through openings 162, thereby minimizing pressure loads and bending moments on, for example, the first tubesheet 154a or on tubesheet 154c, or another suitable tubesheet. The feed gas 60 may preferably comprise air or pressurized air, the non-permeate gas 62 may preferably comprise nitrogen enriched air, and the permeate gas 64 may preferably comprise one or more non-nitrogen permeate gases such as oxygen, carbon dioxide, and/or water. The fluid separation assembly 100a, 100b, 100c, 100d, is preferably part of an inert gas generating system 28 (see FIG. 1) in a transport vehicle, such as an aircraft 10 (see FIG. 1). The transport vehicle may also comprise an aerospace vehicle, a space launch vehicle, a rocket, a satellite, a rotorcraft, a watercraft, a boat, a ship, a train, an automobile, a truck, and a bus, or another suitable transport vehicle.

Figure 15:
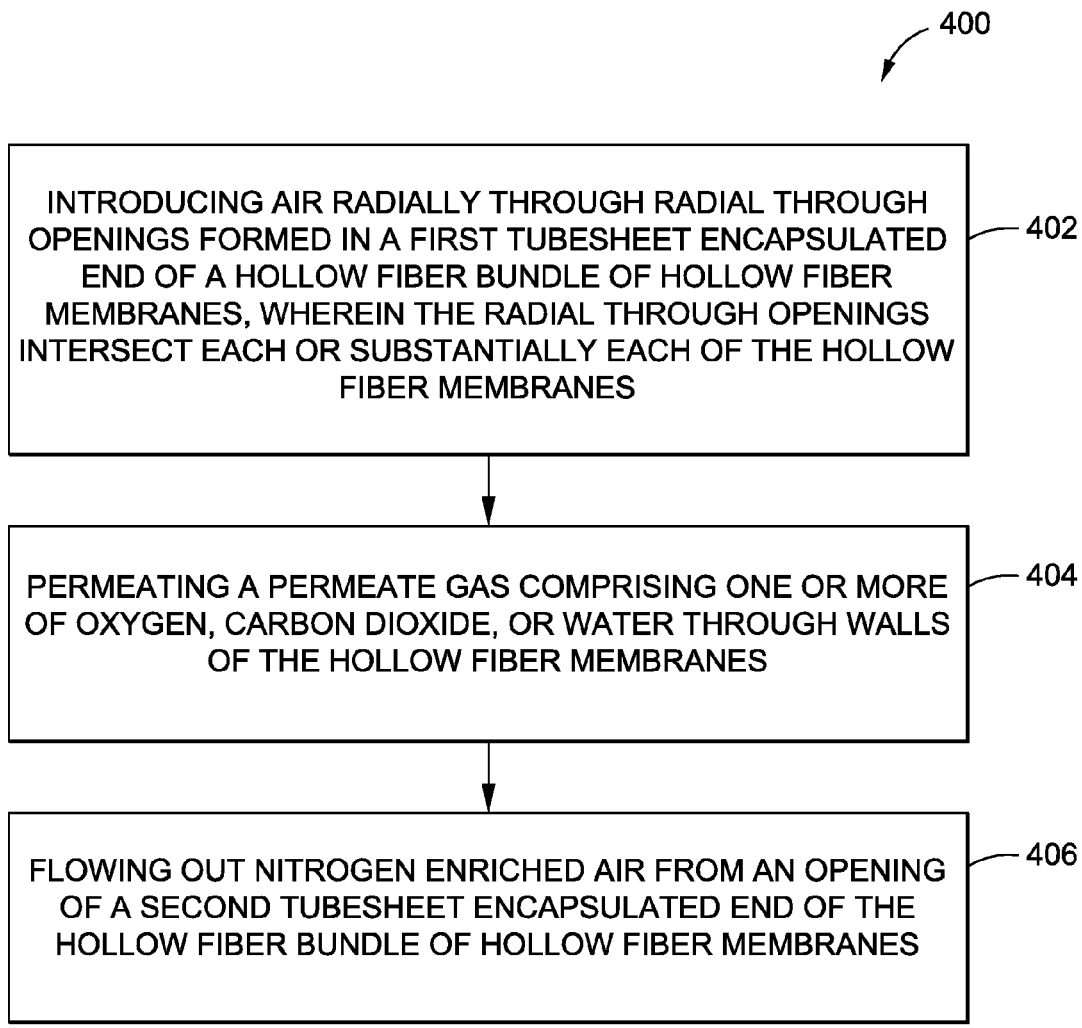
FIG. 15 is a flow diagram illustrating yet another one of the embodiments of a method of the disclosure.

In another embodiment of the disclosure, there is provided a method 400 for generating nitrogen enriched air (NEA). FIG. 15 is a flow diagram illustrating one of the embodiments of the method 400 of the disclosure. As shown in FIG. 15, the method 400 comprises step 402 of introducing feed gas 60 (FIG. 6B), preferably comprising air, and more preferably, comprising pressurized high temperature air, radially through radial through openings 162 (FIG. 6B) formed in a first tubesheet 154a (FIG. 6B) encapsulated end 136 (FIG. 5E) of a hollow fiber bundle 134 (FIG. 6B) of hollow fiber membranes 142 (FIG. 6B).

The radial through openings 162 (FIG. 6B) are formed along or around a circumference or perimeter 163 (see FIG. 6B) of and radially through a body portion 160a (see FIGS. 5C, 5G) of the first tubesheet 154a (see FIG. 6B), and preferably intersect each, or substantially each, of the hollow fiber membranes 142 (FIG. 6B). The radial through openings 162 (FIG. 6B) may be formed in a repeating four opening pattern 164 (FIGS. 6B, 8A) comprising four openings 166 (see FIG. 8A) in a substantially square configuration 168 (see FIG. 8A).

As shown in FIG. 15, the method 400 further comprises step 404 of permeating a permeate gas 64 (see FIGS. 6B, 7B) comprising one or more of oxygen, carbon dioxide, and water, through walls 153 (see FIG. 7B) of the hollow fiber membranes 142 (see FIGS. 6B, 7B). As shown in FIG. 15, the method 400 further comprises step 406 of flowing out non-permeate gas 62 (see FIG. 6B), such as nitrogen enriched air (NEA), from an opening of a second tubesheet 154b (see FIG. 6B) encapsulated end 138 (see FIG. 5E) of the hollow fiber bundle 134 (FIG. 6B) of the hollow fiber membranes 142 (FIG. 6B). The opening of the second tubesheet 154b (FIG. 6B) may comprise a plurality of through openings 50 (see FIG. 5D) formed in the second end 158b (see FIG. 5D) of the second tubesheet 154b (see FIG. 5C), or the opening of the second tubesheet 154b (see FIG. 6B) may comprise radial through openings 162 (FIG. 6B) formed around or along the circumference or perimeter 163 (FIG. 6B) of the second tubesheet 154b (FIG. 6B).

FIG. 16 is an illustration of a partial cut-away perspective view of another one of the exemplary embodiments of a fluid separation assembly 100d of the disclosure. As shown in FIG. 16, the fluid separation assembly 100d has a center tube radial feed configuration 66, and comprises a hollow fiber bundle 134; a pair of tubesheets 154g, 154h, each encapsulating respective ends 136, 138 (see FIG. 5A) of the hollow fiber bundle 134; and a housing 102 surrounding the hollow fiber bundle 134 and the pair of tubesheets 154g, 154h.

As shown in FIG. 16, the hollow fiber bundle 134 comprises a plurality of hollow fiber membranes 142 (see FIG. 16) positioned or disposed within the housing 102. The hollow fiber bundle 134 further comprises a body portion 140 (see FIG. 16) and ends 136, 138 (see FIG. 5A). The plurality of hollow fiber membranes 142 (see FIG. 16) are preferably permeable or active along the body portion 140 (see FIG. 16) of the hollow fiber bundle 134 (see FIG. 16).

Preferably, the hollow fiber membranes 142 (see FIG. 16) are made of a flexible polymeric material such as thermoplastic, PEEK (polyether ether ketone), polysulfones, polyimides, or another suitable flexible polymeric material. The plurality of hollow fiber membranes 142 (see FIG. 16) may be arranged in various configurations. For example, the plurality of hollow fiber membranes 142 (see FIG. 16) may be arranged in a parallel configuration 174 (see FIG. 16), in a criss-cross or helical configuration 172 (see FIGS. 5A, 5E, 5I), or in another suitable configuration.

As shown in FIG. 16, both of the tubesheets 154g, 154h are positioned or disposed within the housing 102. The tubesheets 154g, 154h (see FIG. 16) may preferably be comprised of a polymer material, such as epoxy, or another suitable material.

Tubesheet 154g (see FIGS. 16, 17B) encapsulates the first ends 144 (see FIG. 17B) of the plurality of hollow fiber membranes 142 (see FIGS. 16, 17B) and forms end 136 (see FIG. 5A) of the hollow fiber bundle 134 (see FIG. 16). Tubesheet 154h (see FIGS. 16, 17B) encapsulates the second ends 146 (see FIG. 17B) of the plurality of hollow fiber membranes 142 (see FIGS. 16, 17B) and forms end 138 (see FIG. 5A) of the hollow fiber bundle 134 (see FIG. 16).

The first ends 144 (see FIG. 17B) of the plurality of hollow fiber membranes 142 (see FIGS. 16, 17B), which are exposed, are preferably embedded in an epoxy matrix or another suitable polymer matrix to form the tubesheet 154g (see FIG. 16). The second ends 146 (see FIG. 17B) of the plurality of hollow fiber membranes 142 (see FIGS. 16, 17B), which are exposed, are preferably embedded in an epoxy matrix or another suitable polymer matrix to form the tubesheet 154h (see FIG. 16).

The housing 102 (see FIG. 16) is preferably cylindrical in shape. However, the housing 102 (see FIG. 16) may also comprise another suitable shape or design. As shown in FIG. 16, the housing 102 comprises a first end 104, a second end 106, and a body 108. A first end cap 110 (see FIG. 16) may be removably or permanently attached to the first end 104 (see FIG. 16) of the housing 102 (see FIG. 16). A second end cap 112 (see FIG. 16) may be removably or permanently attached to the second end 106 (see FIG. 16) of the housing 102 (see FIG. 16).

As shown in FIG. 16, the housing 102 further comprises a feed inlet port 114 having a first feed inlet port end 116 and a second feed inlet port end 118. In this embodiment, the feed inlet port 114 (see FIG. 16) may be coupled to, formed on, or coextensive with the first end cap 110 (see FIG. 16), and extends outwardly from the first end cap 110 (see FIG. 16) at the first end 104 (see FIG. 16) of the housing 102 (see FIG. 16). As shown in FIG. 16, feed gas 60 (see FIG. 16) is introduced into the fluid separation assembly 100d via the feed inlet port 114.

As shown in FIG. 16, the housing 102 further comprises a permeate outlet port 120 having a first permeate outlet port end 122 and a second permeate outlet port end 124. In this embodiment, the permeate outlet port 120 (see FIG. 16) may be coupled to, formed on, or coextensive with the upper portion 115 (see FIG. 16) of the body 108 (see FIG. 16) or side of the housing 102 (see FIG. 16), and extends outwardly from the upper portion 115 (see FIG. 16) of the body 108 (see FIG. 16) or side of the housing 102 (see FIG. 16). The permeate outlet port 120 (see FIG. 16) is preferably in flow communication with an interior 109 (see FIG. 17A) of the housing 102 (see FIGS. 16, 17A), so that the permeate gas 64 (see FIGS. 16, 17A) can permeate out of the plurality of hollow fiber membranes 142 (see FIGS. 16, 17A) that have been intersected and can flow out of the housing 102 (see FIGS. 16, 17A). As shown in FIG. 16, permeate gas 64 (see FIG. 16) is removed from the fluid separation assembly 100d via the permeate outlet port 120.

As shown in FIG. 16, the housing 102 further comprises a non-permeate outlet port 126 having a first non-permeate outlet port end 128 and a second non-permeate outlet port end 130. In this embodiment, the non-permeate outlet port 126 (see FIG. 16) may be coupled to, formed on, or coextensive with the second end cap 112 (see FIG. 16) and extends outwardly from the second end cap 112 (see FIG. 16) at the second end 106 (see FIG. 16) of the housing 102 (see FIG. 16), instead of from the upper portion 127 (see FIG. 16) of the body 108 (as FIG. 16), as with the embodiment of the fluid separation assembly 100b shown in FIG. 6B. The non-permeate outlet port 126 (see FIG. 16) is preferably in flow communication with one of the tubesheets, such as tubesheet 154h (see FIG. 16), so that the non-permeate gas 62 (see FIG. 16) can flow out of the plurality of hollow fiber membranes 142 (see FIG. 16) and out of the housing 102 (see FIG. 16). As shown in FIG. 16, the non-permeate gas 62 (see FIG. 16) is removed or exhausted from the fluid separation assembly 100d via the non-permeate outlet port 126.

In the embodiment shown in FIG. 16, the feed inlet port 114 and the non-permeate outlet port 126 are preferably positioned or oriented in parallel alignment with a longitudinal central axis 132 of the housing 102. In this embodiment, the permeate outlet port 120 (see FIG. 16) is preferably positioned or oriented perpendicular to the longitudinal central axis 132 (see FIG. 16) of the housing 102 (see FIG. 16).

As shown in FIG. 16, the fluid separation assembly 100d further comprises a plurality of radial through openings 162 formed in each of the tubesheets 154g, 154h. Preferably, as shown in FIG. 16, the plurality of radial through openings 162 are formed around or along the circumference or perimeter 163 of one or both of the tubesheets 154g, 154h, and radially through a respective body portion 160g, 160h, in one or both of the respective tubesheets 154g, 154h. More preferably, both of the tubesheets 154g, 154h (see FIG. 16) have the plurality of radial through openings 162 (see FIG. 16).

The radial through openings 162 (see FIG. 16) are preferably formed in the body portion 160g (see FIG. 16) of tubesheet 154g (see FIG. 16) by cutting or drilling into the body portion 160g (see FIG. 16) of tubesheet 154g (see FIG. 16) around or along the circumference or perimeter 163 (see FIG. 16) of the tubesheet 154g (see FIG. 16). The radial through openings 162 (see FIG. 16) are preferably formed in the body portion 160h (see FIG. 16) of tubesheet 154h (see FIG. 16) by cutting or drilling into the body portion 160h (see FIG. 16) of tubesheet 154h (see FIG. 16) around or along the circumference or perimeter 163 (see FIG. 16) of the tubesheet 154h (see FIG. 16).

The plurality of radial through openings 162 (see FIG. 16) preferably intersect each, or substantially each, of the hollow fiber membranes 142 (see FIG. 16). In particular, the plurality of radial through openings 162 (see FIGS. 16, 17B) preferably intersect or sever at least an exterior surface 150 (see FIG. 17B) and an interior surface 152 (see FIG. 17B) of each, or substantially each, of the hollow fiber membranes 142 (see FIGS. 16, 17B).

Cutting or drilling the plurality of radial through openings 162 (see FIG. 16) through the plurality of hollow fiber membranes 142 (see FIG. 16) encapsulated by the tubesheet 154g (see FIG. 16) allows feed gas 60 (see FIG. 16), preferably pressurized feed gas, to be introduced into the interiors or bores of the plurality of hollow fiber membranes 142 (see FIG. 16) via the plurality of radial through openings 162 (see FIG. 16) formed in the tubesheet 154g (see FIG. 16). The feed gas 60 (see FIG. 16) flows into the individual hollow fiber membranes 142 (see FIG. 16) from the feed inlet port 114 (see FIG. 16).

Cutting or drilling the plurality of radial through openings 162 (see FIG. 16) through the plurality of hollow fiber membranes 142 (see FIG. 16) encapsulated by the tubesheet 154h allows non-permeate gas 62 (see FIG. 16) or inert gas, such as nitrogen enriched air (NEA), to flow out of the individual hollow fiber membranes 142 (see FIG. 16) and out through the non-permeate outlet port 126 (see FIG. 16). The non-permeate gas 62 (see FIG. 16) is preferably removed from the plurality of hollow fiber membranes 142 (see FIG. 16) via the plurality of radial through openings 162 (see FIG. 16) formed in the tubesheet 154h (see FIG. 16).

The radial through openings 162 (see FIG. 16) intersect or sever the plurality of hollow fiber membranes 142 (see FIG. 16) in the tubesheets 154g, 154h (see FIG. 16), so that feed gas 60 (see FIG. 16), permeate gas 64 (see FIG. 16), or non-permeate gas 62 (see FIG. 16), or a combination thereof, or one or more of feed gas 60 (see FIG. 16), permeate gas 64 (see FIG. 16), and non-permeate gas 62 (see FIG. 16), may be introduced into or removed from the plurality of hollow fiber membranes 142 (see FIG. 16) via the plurality of radial through openings 162 (see FIG. 16) formed in one or both of the tubesheets 154g, 154h (see FIG. 16). Preferably, the feed gas 60 (see FIG. 16), or feed fluid, comprises air, high pressure air, natural gas, flue gas, or another suitable feed gas 60 or feed fluid. Preferably, the non-permeate gas 62 (see FIG. 16), or non-permeate fluid, comprises an inert gas, such as nitrogen enriched air (NEA), nitrogen, nitrogen oxide, carbon monoxide, sulfur oxide, or another suitable non-permeate gas 62 or non-permeate fluid. Preferably, the permeate gas 64 (see FIG. 16), or permeate fluid, such as oxygen enriched waste air, comprises one or more of oxygen ($O_2$), carbon dioxide ($CO_2$), and/or water ($H_2O$); or methane, or another suitable permeate gas 64 or permeate fluid.

The shape of each radial through opening 162 (see FIG. 16) may be circular or round, elliptical, or another suitable shape. The radial through openings 162 (see FIG. 16) preferably comprise center connected radial through openings 162a (see FIG. 18) and partial radial through openings 162b (see FIG. 18), discussed in more detail below. In this embodiment, some of the radial through openings 162 (see FIG. 16), and in particular, the partial radial through openings 162b (see FIG. 18), may be formed in a four opening pattern 164 (see FIG. 16) comprising four openings 166 (see FIG. 16) shaped in a substantially square configuration 168 (see FIG. 8A). The four opening pattern 164 of radial through openings 162 is preferably a repeating four opening pattern that repeats around or along the circumference or perimeter 163 of one or both of the 154g, 154h (see FIG. 16) and radially through on or both of the tubesheets 154g, 154h (see FIG. 16).

The plurality of radial through openings 162 (see FIG. 16) formed in one or both of the tubesheets 154g, 154h (see FIG. 16) preferably reduce or minimize pressure loads and bending moments or stress on each of the tubesheets 154g, 154h (see FIG. 16). Preferably, the fluid separation assembly 100d is part of an inert gas generating system 28 (see FIG. 1) in an aircraft 10 (see FIG. 1).

FIG. 17A is an illustration of a side view in partial cross-section showing fluid flow through the plurality of radial through openings 162 of another one of the embodiments of the fluid separation assembly 100d of the disclosure. As shown in FIG. 17A, the plurality of radial through openings 162 may be intersected by a central opening 182 that is longitudinal and may run parallel to the length of the hollow fiber bundle 134. As discussed above, in this embodiment, some of the radial through openings 162 (see FIG. 16), and in particular, the partial radial through openings 162b (see FIG. 18) may be formed in the four opening pattern 164 (see FIG. 17A), such as the repeating four opening pattern, or another suitable pattern of openings.

FIG. 17A shows the feed gas 60 entering through the feed inlet port 114. The feed gas 60 (see FIG. 17A) flows through the central opening 182 (see FIG. 17A) of tubesheet 154g (see FIG. 17A) and splits out radially through the radial through openings 162 (see FIG. 17A). The feed inlet port 114 (see FIG. 17A) is in flow communication with at least a portion of the radial through openings 162 (see FIG. 17A) on the tubesheet 154g (see FIG. 17A), so that the feed gas 60 (see FIG. 17A) can flow into each, or substantially each, of the hollow fiber membranes 142 (see FIG. 17A) that have been intersected.

Figure 17B:
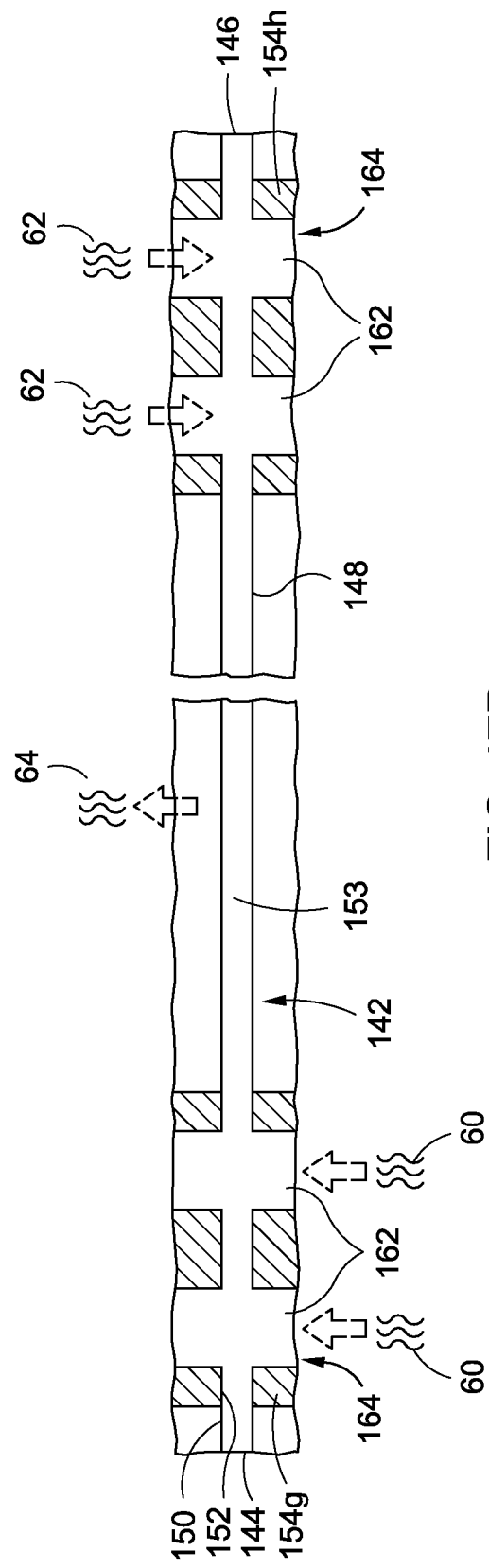
FIG. 17B is an illustration of an enlarged side view in partial cross-section showing fluid flow through an individual hollow fiber membrane of the fluid separation assembly of FIG. 17A.

As shown in FIG. 17A, the permeate gas 64 flows through the hollow fiber bundle 134, through the interior 109 of the housing 102 and out through the fluid separation assembly 100d via the permeate outlet port 120. The permeate gas 64 (see FIG. 17A) permeates out of the plurality of hollow fiber membranes 142 (see FIG. 17A) and out through the permeate outlet port 120 (see FIG. 17A). The permeate outlet port 120 (see FIG. 17A) is in flow communication with the interior 109 (see FIG. 17A) of the housing 102 (see FIG. 17A), so that the permeate gas 64 (see FIG. 17A) can permeate out of the exterior surface 150 (see FIG. 17B) of the hollow fiber membranes 142 (see FIG. 17A) and out of the housing 102 (see FIG. 17A).

As further shown in FIG. 17A, the non-permeate gas 62 flows out of the fluid separation assembly 100d via the non-permeate outlet port 126. As the feed gas 60 (see FIG.

17A), preferably under high pressure, progresses down the length of the plurality of hollow fiber membranes 142 (see FIG. 17A), the non-permeate gas 62 (see FIG. 17A), or non-permeate fluid, such as nitrogen enriched air (NEA), continues down the length of the plurality of hollow fiber membranes 142 (see FIG. 17A), until it reaches the radial through openings 162 (see FIG. 17A) of the tubesheet 154h (see FIG. 17A). The non-permeate gas 62 (see FIG. 17A), for example, nitrogen enriched air (NEA), may collect and flow through the radial through openings 162 (see FIG. 17A) of the tubesheet 154h (see FIG. 17A), and out through the non-permeate outlet port 126 (see FIG. 17A), where the nitrogen enriched air (NEA) may be used in the inert gas generating system 28 (see FIG. 1) and the fuel tank 26 (see FIG. 1).

FIG. 17A shows the non-permeate gas 62 flowing out of the plurality of hollow fiber membranes 142 that have been intersected and into the radial through openings 162 and out through the non-permeate outlet port 126. The non-permeate outlet port 126 (see FIG. 17A) is in flow communication with at least a portion of the radial through openings 162 (see FIG. 17A) on the tubesheet 154h (see FIG. 17A), so that the non-permeate gas 62 (see FIG. 17A) can flow out of each, or substantially each, of the intersected hollow fiber membranes 142 (see FIG. 17A) and out of the housing 102 (see FIG. 17A).

FIG. 17B is an illustration of an enlarged side view in partial cross-section showing fluid flow through an individual hollow fiber membrane 142 of the fluid separation assembly 100d of FIG. 17A. As shown in FIG. 17B, the radial through openings 162 intersect or sever an exterior surface 150 and an interior surface 152 of the hollow fiber membrane 142, so that the feed gas 60, or feed fluid, such as air or high pressure air, can flow into the hollow fiber membrane 142 that has been intersected and proceed into the hollow fiber membrane 142 and down the length of the hollow fiber membrane 142.

As shown in FIG. 17B, each hollow fiber membrane 142 has a first end 144, a second end 146, and an elongated body portion 148, as well as the exterior surface 150 and the interior surface 152. The first ends 144 (see FIG. 17B) of the hollow fiber membranes 142 (see FIG. 17B) encapsulated by the tubesheet 154g (see FIG. 17B) are not permeable, and the second ends 146 (see FIG. 17B) of the hollow fiber membranes 142 (see FIG. 17B) encapsulated by the tubesheet 154h (see FIG. 17B) are not permeable.

As shown in FIG. 17B, the feed gas 60 flows through a portion of the radial through openings 162 on the tubesheet 154g, and the non-permeate gas 62 flows through a portion of the radial through openings 162 on the tubesheet 154h. The permeate gas 64 (see FIG. 17B) may permeate through wall 153 (see FIG. 17B) of the hollow fiber membrane 142 (see FIG. 17B) and through the exterior surface 150 (see FIG. 17B) of the hollow fiber membrane 142 (see FIGS. 17A, 17B) to the low pressure permeate outlet port 120 (see FIG. 17A) and may be exhausted overboard. As discussed above, some of the plurality of radial through openings 162 (see FIG. 17B), may have the four opening pattern 164 (see FIG. 17B), or another suitable pattern of openings.

Figure 18:
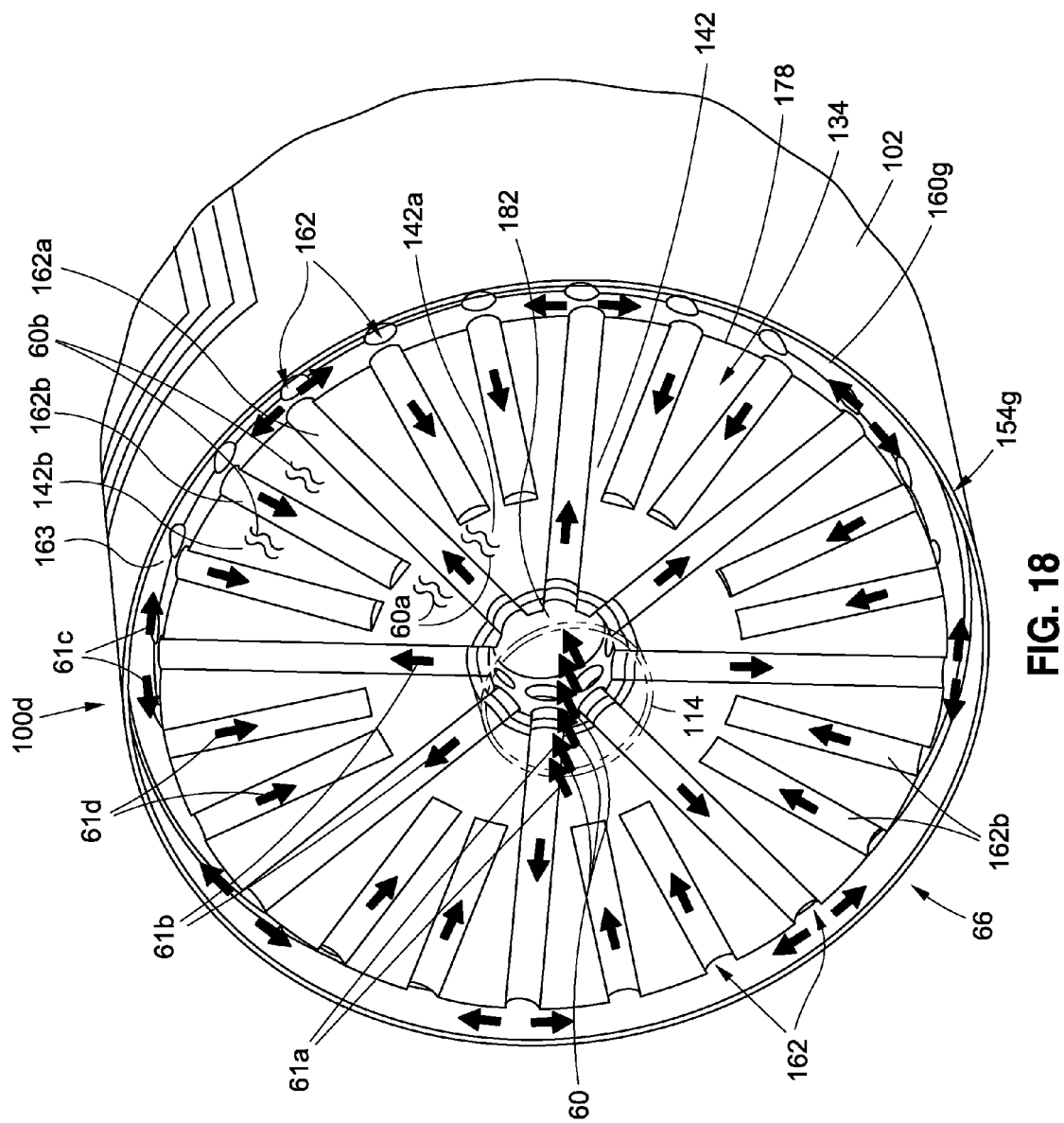
FIG. 18 is an illustration of a cross-sectional view of an embodiment of a tubesheet that may be used in one of the embodiments of the fluid separation assembly of the disclosure and shows exemplary fluid flow through the tubesheet.

FIG. 18 is an illustration of a cross-sectional view of an embodiment of the tubesheet 154g that may be used in one of the embodiments of the fluid separation assembly 100d of the disclosure. FIG. 18 also shows exemplary fluid flow directions through the tubesheet 154g with directional arrows 61a-61d.

The fluid separation assembly 100d (see FIG. 18) preferably has the center tube radial feed configuration 66 (see FIG. 18). As shown in FIG. 18, with the center tube radial feed configuration 66, the feed gas 60, or feed fluid, such as air, high pressure air, natural gas, flue gas, or another suitable feed gas 60 or feed fluid, enters the fluid separation assembly 100d via the feed inlet port 114 at the central opening 182. The feed gas 60 (see FIG. 18), or feed fluid, flows into the feed inlet port 114 (see FIG. 18), as shown with inlet fluid flow directional arrows 61a (see FIG. 18).

As shown in FIG. 18, the plurality of radial through openings 162 are formed around or along the circumference or perimeter 163 of the tubesheet 154g. The radial through openings 162 (see FIG. 18) are preferably formed in the body portion 160g (see FIG. 18) of the tubesheet 154g (see FIG. 18) by cutting or drilling into the body portion 160g of the tubesheet 154g (see FIG. 18) around or along the circumference or perimeter 163 (see FIG. 18) of the tubesheet 154g (see FIG. 18). The plurality of radial through openings 162 (see FIG. 18) preferably comprise center connected radial through openings 162a (see FIG. 18) and partial radial through openings 162b (see FIG. 18).

In this embodiment, the feed gas 60 (see FIG. 18) enters via the feed inlet port 114 (see FIG. 18) at the central opening 182 (see FIG. 18), where the feed gas 60 (see FIG. 18) then divides and flows through radial through openings 162 (see FIG. 18), such as in the form of the center connected radial through openings 162a (see FIG. 18). As used herein, "center connected radial through opening" means a radial through opening that extends continuously lengthwise from a central opening of a tubesheet (e.g., tubesheet 154g (see FIG. 18)) to a circumference or perimeter of the tubesheet, and the center connected radial through opening penetrates or connects to the central opening through the center of the tubesheet (e.g., tubesheet 154g (see FIG. 18)).

The feed inlet port 114 (see FIG. 18) is preferably in flow communication with the center connected radial through openings 162a (see FIG. 18), so that a first portion 60a (see FIG. 18) of the feed gas 60 (see FIG. 18) flows into and directly enters a first portion 142a (see FIG. 18) of the plurality of hollow fiber membranes 142 (see FIG. 18). The feed gas 60 (see FIG. 18) flows through the center connected radial through openings 162a (see FIG. 18), as shown with center connected radial fluid flow directional arrows 61b (see FIG. 18). The center connected radial through openings 162a (see FIG. 18) intersect many of the hollow fiber membranes 142 (see FIG. 18) of the hollow fiber bundle 134 (see FIG. 18).

As shown in FIG. 18, the feed gas 60 that flows to the circumference or perimeter 163 of the tubesheet 154g from each center connected radial through opening 162a, then divides further into opposite directions at the circumference or perimeter 163 of the tubesheet 154g. The feed gas 60 (see FIG. 18)) then flows in opposite directions around the circumference or perimeter 163 (see FIG. 18) of the tubesheet 154g (see FIG. 18), as shown with circumference fluid flow directional arrows 61c (see FIG. 18), until the feed gas 60 (see FIG. 18) reaches radial through openings 162 (see FIG. 18), such as in the form of partial radial through openings 162b (see FIG. 18). As used herein, "partial radial through opening" means a radial through opening that extends from a circumference or perimeter of a tubesheet (e.g., tubesheet 154g (see FIG. 18)) partially through the hollow fiber membranes toward a central opening of the tubesheet but not connecting to the central opening of the tubesheet, and the partial radial through opening does not penetrate or connect to the central opening through the center of the tubesheet (e.g., tubesheet 154g (see FIG. 18)).

As shown in FIG. 18, a second portion 60b of the feed gas 60 flows around the circumference or perimeter 163 of tubesheet 154g (and/or tubesheet 154h (see FIG. 16)) into the partial radial through openings 162b and flows into a second portion 142b of the hollow fiber membranes 142, such as the remaining hollow fiber membranes 142. The feed gas 60 (see FIG. 18) flows into each partial radial through opening 162b (see FIG. 18), as shown with partial radial fluid flow directional arrows 61d (see FIG. 18).

The center connected radial through openings 162a (see FIG. 18) are preferably drilled holes that are longer in length than the partial radial through openings 162b (see FIG. 18), which are shorter in length and do not extend to the central opening 182 (see FIG. 18) of the tubesheet 154g (see FIG. 18). In this embodiment, there is no concentration, or minimal concentration, of high fluid flow at the circumference or perimeter 163 (see FIG. 18) of the tubesheet 154g. This may preferably result in a lower or decreased pressure drop 68 (see FIG. 19), as compared to a side port radial feed design of the feed inlet port 114, such as shown in FIG. 6A. As used here, "pressure drop" means the difference in pressure or decrease in pressure from one point in a gas or fluid carrying tube or pipe to another point downstream, and which occurs when flow resistance resulting in frictional forces acts on the gas or fluid while it is flowing through the tube or pipe.

In the side port radial feed design, such as shown in FIGS. 6A and 7A, where the feed inlet port 114 (see FIGS. 6A, 7A) is formed on or extends from the upper portion 115 (see FIG. 6A) of the body 108 (see FIG. 6A) or side of the housing 102 (see FIG. 6A), all the feed gas 60 (see FIGS. 6A, 7A) enters via the feed inlet port 114 (see FIGS. 6A, 7A), where it divides in opposite directions and flows around the circumference or perimeter 163 (see FIG. 6A) of the tubesheet 154a (see FIGS. 6A, 7A). As the feed gas 60 (see FIGS. 6A, 7A) flows around the tubesheet 154a (see FIGS. 6A, 7A), the feed gas 60 (see FIGS. 6A, 7A) flows into and enters the radial through openings 162 (see FIGS. 6A, 7A), where it then flows into and enters the plurality of hollow fiber membranes 142 (see FIGS. 6A, 7A). There is a high flow of feed gas 60 (see FIGS. 6A, 7A), such as air or high pressure air, in the channel or area near the feed inlet port 114 (see FIGS. 6A, 7A), with a corresponding higher pressure drop.

The partial radial through openings 162b (see FIG. 18), which are shorter in length than the center connected radial through openings 162a (see FIG. 18), preferably use the four opening pattern 164 (see FIG. 16), or another suitable opening pattern. Since the center connected radial through openings 162a (see FIG. 18) are longer in length than the partial radial through openings 162b (see FIG. 18) and need to intersect or connect with the central opening 182 (see FIG. 18) of the tubesheet 154g (see FIG. 18), another opening pattern besides the four opening pattern 164 (see FIG. 16) may be used.

As further shown in FIG. 18, the tubesheet 154g preferably comprises a manifold or plenum 178 which comprises a space or open portion in the tubesheet 154g intended to contain a fluid, such as gas, that flows into and out of the radial through openings 162 at a positive pressure. Having the manifold or plenum 178 (see FIG. 18) within the tubesheet 154g (see FIG. 18) may also simplify the manufacture of the housing 102 (see FIG. 18). The manifold or plenum 178 (see FIG. 18) may also be formed into the housing 102 (see FIG. 18) to allow the fluid to flow from the inlet port 114 (see FIG. 18) to the radial through openings 162 (see FIG. 18).

With a nitrogen enriched air (NEA) product tubesheet, the directions of the fluid flow, gas flow, or air flow may be opposite in direction to the directions of the fluid flow, gas flow, or air flow in the fluid separation assembly 100d (see FIG. 18) with the center tube radial feed configuration 66 (see FIG. 18).

Figure 19:
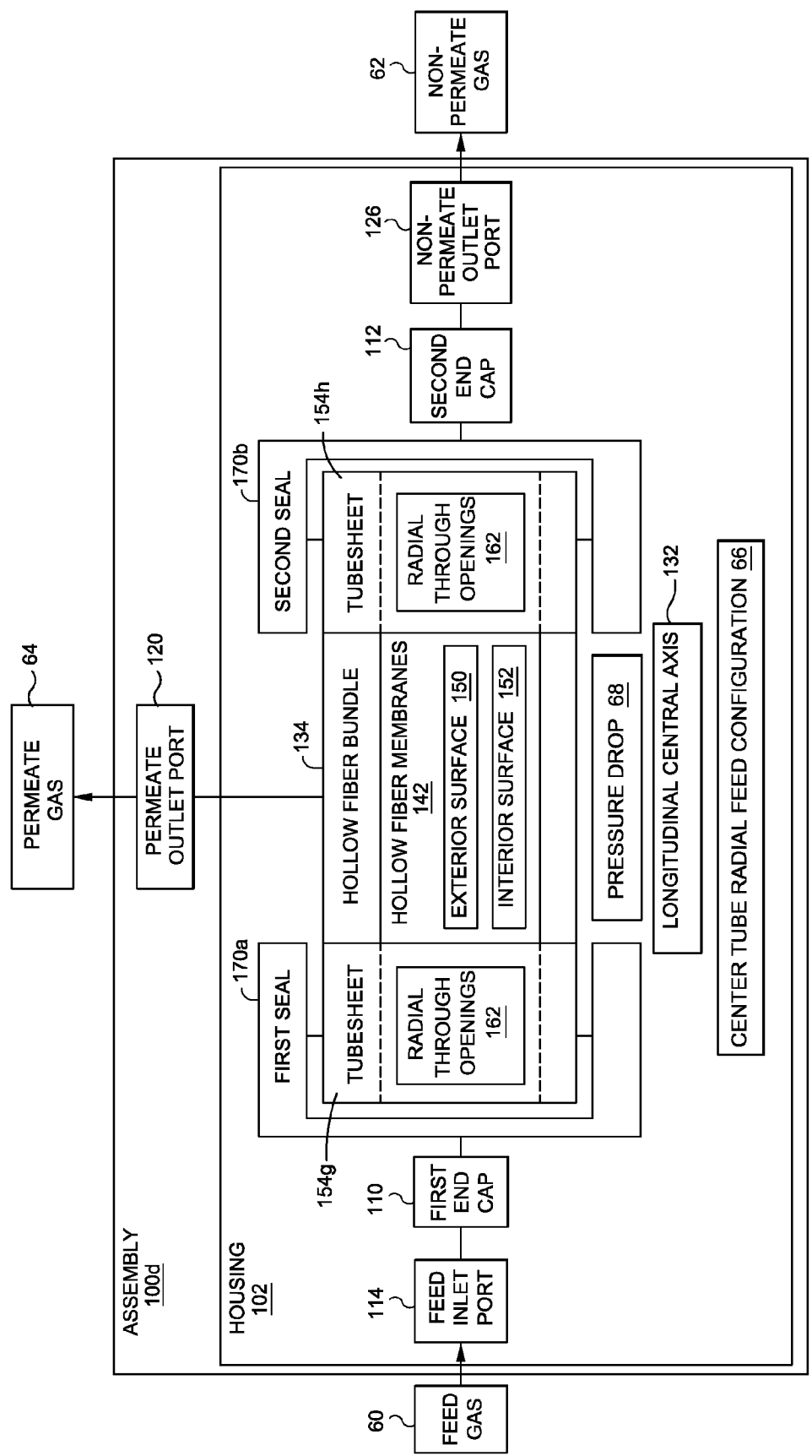
FIG. 19 is an illustration of a block diagram of another one of the embodiments of a fluid separation assembly of the disclosure; and, FIG. 20 is a flow diagram illustrating yet another one of the embodiments of a method of the disclosure.

FIG. 19 is an illustration of a block diagram of the embodiment of the fluid separation assembly 100d of the disclosure, where the fluid separation assembly 100d has a center tube radial feed configuration 66. As shown in FIG. 19, the fluid separation assembly 100d comprises the housing 102 having a first end cap 110 coupled to, or coextensive with, the feed inlet port 114 which is configured to receive feed gas 60. The housing 102 (see FIG. 19) further comprises a second end cap 112 (see FIG. 19) with a non-permeate outlet port 126 (see FIG. 19) configured to remove non-permeate gas 62 (see FIG. 19). The housing 102 (see FIG. 19) further comprises a permeate outlet port 120 (see FIG. 19) configured to remove permeate gas 64 (see FIG. 19). The feed inlet port 114 (see FIG. 19) and the permeate outlet port 120 (see FIG. 19) are preferably in alignment with and parallel to a longitudinal central axis 132 (see FIG. 19) of the housing 102 (see FIG. 19).

As shown in FIG. 19, the fluid separation assembly 100d further comprises a hollow fiber bundle 134 positioned or disposed within the housing 102. The hollow fiber bundle 134 (see FIG. 19) is encapsulated at each end by tubesheets 154g, 154h (see FIG. 19), respectively. The hollow fiber bundle 134 (see FIG. 19) comprises a plurality of hollow fiber membranes 142 (see FIG. 19). Each hollow fiber membrane 142 (see FIG. 19) has an exterior surface 150 (see FIG. 19) and an interior surface 152 (see FIG. 19).

As shown in FIG. 19, the fluid separation assembly 100d further comprises a plurality of radial through openings 162 formed, in one embodiment, in each of the tubesheets 154g, 154h, respectively. In another embodiment, the plurality of radial through openings 162 (see FIG. 19) are formed in one tubesheet 154g (see FIG. 19). The radial through openings 162 (see FIG. 19) preferably intersect or sever at least the exterior surface 150 (see FIG. 19) and the interior surface 152 (see FIG. 19) of each, or substantially each, of the hollow fiber membranes 142 (see FIG. 19). The radial through openings 162 (see FIG. 19) intersect or sever the hollow fiber membranes 142 (see FIG. 19) in the tubesheets 154g, 154h (see FIG. 19), so that feed gas 60 (see FIG. 19), permeate gas 64 (see FIG. 19), and/or non-permeate gas 62 (see FIG. 19) may be introduced into or removed from the interiors or bores of the plurality of hollow fiber membranes 142 (see FIG. 19) via the plurality of radial through openings 162 (see FIG. 19). One or more of the feed gas 60, permeate gas 64, and non-permeate gas 62 may be introduced into or removed from the plurality of hollow fiber membranes 142. The radial through openings 162 (see FIG. 19) formed in each of the tubesheets 154g, 154h (see FIG. 19) reduce or minimize pressure loads and bending moments or stress on each of the tubesheets 154g, 154h (see FIG. 19).

As shown in FIG. 19, the fluid separation assembly 100d may further comprise at least one first seal 170a adjacent tubesheet 154g and at least one second seal 170b adjacent tubesheet 154h. Preferably, the first and second seals 170a, 170b are fluid tight. As used herein, "fluid tight" means that the feed gas or liquid and the non-permeate gas or liquid, cannot leak around the exterior or edges of the one or more tubesheets and flow to the permeate and/or non-permeate outlet ports and/or outside of the fluid separation assembly, and the feed gas or liquid and the non-permeate gas or liquid is therefore forced to flow through the radial through openings, and in turn, through the interiors or bores of the hollow fiber membranes. For example, the first seal 170a (see FIG. 19) preferably prevents feed gas 60 (see FIG. 19) or liquid from leaking into the permeate outlet port 120 (see FIG. 19) and/or the non-permeate outlet port 126 (see FIG. 19), or leaking outside of the fluid separation assembly 100d (see FIG. 19) without permeating through the hollow fiber membranes 142 (see FIG. 19) first. For example, the second seal 170b (see FIG. 19) preferably prevents the non-permeate gas 62 (see FIG. 19) or liquid from leaking into the permeate outlet port 120 (see FIG. 19) and/or the non-permeate outlet port 126 (see FIG. 19), or leaking outside of the fluid separation assembly 100d (see FIG. 19) without permeating through the hollow fiber membranes 142 (see FIG. 19) first.

Preferably, the first and second seals 170a, 170b are O-ring seals, or another type of seal made of a synthetic rubber material, a thermoplastic material, or another suitable material. Alternatively, the first and second seals 170a, 170b may each comprise one or more seals adapted to fit within circumferential grooves 180 (see FIGS. 8A, 9A, 11A) that may be formed in the tubesheets 154g, 154h.

In this embodiment, as discussed above, the fluid separation assembly 100d (see FIG. 19) with the center tube radial feed configuration 66 (see FIG. 19), preferably has a lower or decreased pressure drop 68 (see FIG. 19), as compared to the side port radial feed design of the feed inlet port 114, such as shown in FIG. 6A.

In another embodiment of the disclosure, there is provided an aircraft 10 (see FIG. 1). The aircraft 10 (see FIG. 1) comprises a fuselage 12 (see FIG. 1), at least one fuel tank 26 (see FIG. 1) mounted on the fuselage 12 (see FIG. 1), at least one fuel tank vent 27 (see FIG. 1) operatively connected to the fuel tank 26 (see FIG. 1), and an inert gas generating system 28 (see FIG. 1) for generating a non-permeate gas 62 on board the aircraft 10 (see FIG. 1).

The inert gas generating system 28 (see FIG. 1) comprises the fluid separation assembly 100d (see FIG. 16) having the center tube radial feed configuration 66 (see FIGS. 16, 19). The fluid separation assembly 100d (see FIG. 16) comprises the hollow fiber bundle 134 (see FIG. 16) comprising the plurality of hollow fiber membranes 142 (see FIG. 16). The fluid separation assembly 100d (see FIG. 16) further comprises the pair of tubesheets 154g, 154h (see FIG. 16) each encapsulating respective ends 136, 138 (see FIG. 5A) of the hollow fiber bundle 134 (see FIG. 16).

The fluid separation assembly 100d (see FIG. 16) further comprises the plurality of radial through openings 162 (see FIG. 16) formed around or along the circumference or perimeter 163 (see FIG. 16) of one or both of the tubesheets 154g, 154h (see FIG. 16) and radially through the respective body portions 160g, 160h (see FIG. 16) in one or both of the respective tubesheets 154g, 154h (see FIG. 16). The plurality of radial through openings 162 (see FIGS. 16, 18) comprises center connected radial through openings 162a (see FIG. 18) and partial radial through openings 162b (see FIG. 18), and the plurality of radial through openings 162 (see FIG. 16) intersect each, or substantially each, of the hollow fiber membranes 142 (see FIG. 16).

The fluid separation assembly 100d (see FIG. 16) further comprises the housing 102 (see FIG. 16) surrounding the hollow fiber bundle 134 (see FIG. 16) and the pair of tubesheets 154g, 154h (see FIG. 16). The housing 102 (see FIG. 16) has the feed inlet port 114 (see FIG. 16), the permeate outlet port 120 (see FIG. 16), and the non-permeate outlet port 126 (see FIG. 16). The feed inlet port 114 (see FIG. 16) and the non-permeate outlet port 126 (see FIG. 16) are preferably in parallel alignment with the longitudinal central axis 132 (see FIG. 16) of the housing 102 (see FIG. 16). The feed gas 60 (see FIG. 16), permeate gas 64 (see FIG. 16), or non-permeate gas 62 (see FIG. 16), or a combination thereof, or one or more of the feed gas 60 (see FIG. 16), permeate gas 64 (see FIG. 16), or non-permeate gas 62 (see FIG. 16) are preferably introduced into or removed from the plurality of hollow fiber membranes 142 (see FIG. 16) via the plurality of radial through openings 162 (see FIG. 16) formed in one or both of the tubesheets 154g, 154h (see FIG. 16).

Figure 20:
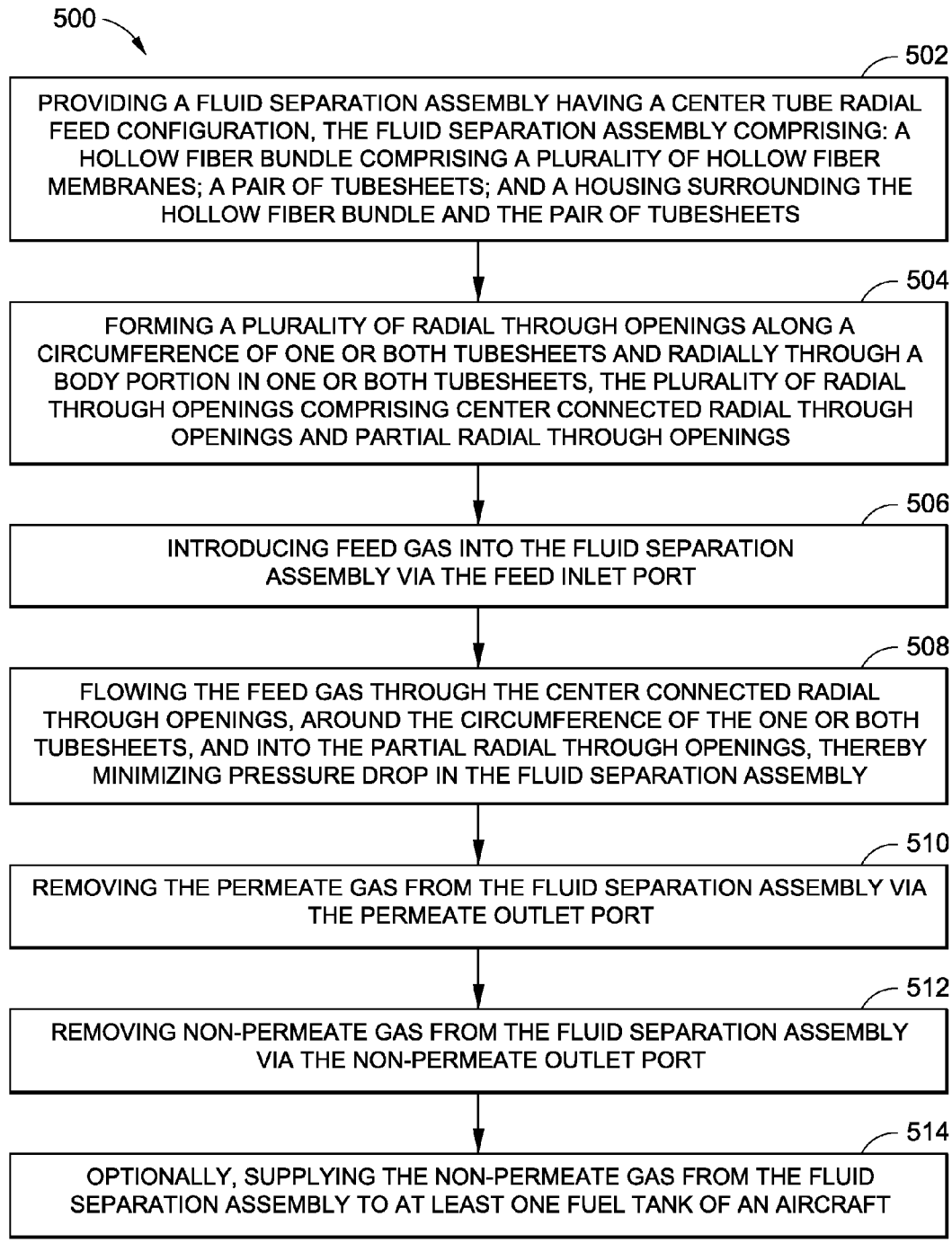

In another embodiment of the disclosure, there is provided a method 500 for reducing pressure drop 68 (see FIG. 19) in a fluid separation assembly 100d (see FIG. 19). FIG. 20 is a flow diagram illustrating yet another one of the embodiments of the method 500 of the disclosure.

As shown in FIG. 20, the method 500 comprises step 502 of providing the fluid separation assembly 100d (see FIGS. 16, 19) having the center tube radial feed configuration 66 (see FIGS. 16, 19). As discussed in detail above, the fluid separation assembly 100d (see FIGS. 16, 19) comprises the hollow fiber bundle 134 (see FIGS. 16, 19) comprising the plurality of hollow fiber membranes 142 (see FIGS. 16, 19). The fluid separation assembly 100d (see FIGS. 16, 19) further comprises the pair of tubesheets 154g, 154h (see FIGS. 16, 19), each encapsulating respective ends 136, 138 (see FIG. 5A) of the hollow fiber bundle 134 (see FIGS. 16, 19).

The fluid separation assembly 100d (see FIGS. 16, 19) further comprises the housing 102 (see FIGS. 16, 19) surrounding the hollow fiber bundle 134 (see FIGS. 16, 19) and the pair of tubesheets 154g, 154h (see FIGS. 16, 19). The housing 102 (see FIGS. 16, 19) has the feed inlet port 114 (see FIGS. 16, 19), the permeate outlet port 120 (see FIGS. 16, 19), and the non-permeate outlet port 126 (see FIGS. 16, 19). With the center tube radial feed configuration 66 (see FIGS. 16, 19), the feed inlet port 114 (see FIGS. 16, 19) and the non-permeate outlet port 126 (see FIG. 16, 19) are in parallel alignment with the longitudinal central axis 132 (see FIGS. 16, 19) of the housing 102 (see FIGS. 16, 19).

As shown in FIG. 20, the method 500 further comprises step 504 of forming the plurality of radial through openings 162 (see FIGS. 16, 18, 19) around or along a circumference or perimeter 163 (see FIGS. 16, 18) of one or both of the tubesheets 154g, 154h (see FIGS. 16, 19), and radially through respective body portions 160g, 160h (see FIG. 16) in one or both of the tubesheets 154g, 154h (see FIGS. 16, 19), such that the plurality of radial through openings 162 (see FIGS. 16, 17A) intersect each, or substantially each, of the hollow fiber membranes 142 (see FIGS. 16, 17A). The plurality of radial through openings 162 (see FIGS. 16, 18) preferably comprise center connected radial through openings 162a (see FIG. 18) and partial radial through openings 162b (see FIG. 18).

The step 504 (see FIG. 20) of forming the plurality of radial through openings 162 (see FIGS. 16, 18, 19) around or along the circumference or perimeter 163 (see FIGS. 16, 18) of one or both of the tubesheets 154g, 154h (see FIGS. 16, 19) and radially through the respective body portions 160g, 160h (see FIG. 16) in one or both of the tubesheets 154g, 154h (see FIGS. 16, 19) may further comprise forming the partial radial through openings 162b (see FIG. 18) in a repeating four opening pattern 164 (see FIG. 16) comprising four openings 166 (see FIG. 16) in a substantially square configuration 168 (see FIG. 8A).

As shown in FIG. 20, the method 500 further comprises step 506 of introducing feed gas 60 (see FIGS. 16, 19) into the fluid separation assembly 100d (see FIGS. 16, 19) via the feed inlet port 114 (see FIGS. 16, 18, 19). Preferably, the feed gas 60 (see FIG. 16), or feed fluid, comprises air, high pressure air, natural gas, flue gas, or another suitable feed gas 60 or feed fluid.

As shown in FIG. 20, the method 500 further comprises step 508 of flowing the feed gas 60 (see FIG. 18) through the center connected radial through openings 162a (see FIG. 18), and then around or along the circumference or perimeter 163 (see FIG. 18) of the one or both tubesheets 154g, 154h (see FIGS. 16, 18), and then into the partial radial through openings 162b (see FIG. 18), thereby reducing pressure drop 68 (see FIG. 19) in the fluid separation assembly 100d (see FIGS. 16, 18, 19).

The step 508 (see FIG. 20) of flowing the feed gas 60 (see FIG. 18) through the center connected radial through openings 162a (see FIG. 18) may further comprise flowing a first portion 60a (see FIG. 18) of the feed gas 60 (see FIG. 18) into a first portion 142a (see FIG. 18) of the plurality of hollow fiber membranes 142 (see FIG. 18). The step 508 (see FIG. 20) of flowing the feed gas 60 (see FIG. 18) around or along the circumference or perimeter 163 (see FIG. 18) of the one or both tubesheets 154g, 154h (see FIGS. 16, 18) and into the partial radial through openings 162b (see FIG. 18) may further comprise flowing a second portion 60b (see FIG. 18) of the feed gas 60 (see FIG. 18) into a second portion 142b (see FIG. 18) of the plurality of hollow fiber membranes 142 (see FIG. 18).

As shown in FIG. 20, the method 500 further comprises step 510 of removing permeate gas 64 (see FIGS. 16, 19) from the fluid separation assembly 100d (see FIGS. 16, 19) via the permeate outlet port 120 (see FIGS. 16, 19). Preferably, the permeate gas 64 (see FIG. 16), or permeate fluid, such as oxygen enriched waste air, comprises one or more of oxygen ($O_2$), carbon dioxide ($CO_2$), and/or water ($H_2O$); or methane, or another suitable permeate gas 64 or permeate fluid.

As shown in FIG. 20, the method 500 further comprises step 512 of removing non-permeate gas 62 (see FIGS. 16, 19) from the fluid separation assembly 100d (see FIGS. 16, 19) via the non-permeate outlet port 126 (see FIGS. 16, 19). Preferably, the non-permeate gas 62 (see FIG. 16), or non-permeate fluid, comprises an inert gas, such as nitrogen enriched air (NEA), nitrogen, nitrogen oxide, carbon monoxide, sulfur oxide, or another suitable non-permeate gas 62 or non-permeate fluid.

As shown in FIG. 20, the method 500 further comprises step 514 of optionally, supplying the non-permeate gas 62 (see FIGS. 16, 19) from the fluid separation assembly 100d (see FIGS. 16, 19) to at least one fuel tank 26 (see FIG. 1) of an aircraft 10 (see FIG. 1).

Embodiments of the fluid separation assembly 100a (see FIG. 5A), 100b (see FIG. 5E), 100c (see FIG. 5I), 100d (see FIG. 16), and methods 200 (see FIG. 13), 300 (see FIG. 14), 400 (see FIG. 15), 500 (see FIG. 20) provide a fluid separation assembly with a radial feed design that allows feed gas 60, such as air, to enter the circumference or perimeter 163 of, for example, a first tubesheet 154a (see FIGS. 6A-6B), or for example, tubesheets 154g, 154h (see FIG. 16), via a plurality of radial through openings 162, rather than through a potted end or face 48 (see FIG. 2A) of the tubesheet 46 (see FIG. 2A) as in existing designs. The feed gas 60 (see FIG. 2A), preferably under high pressure, that flows through the openings in the potted end or face 48 (see FIG. 2A) of such existing potted end design can place pressure and compression loads on the end or face 48 (see FIG. 2A) of the tubesheet and wear the material of the tubesheet down over time.

The novel radial feed design of the tubesheet of the disclosed fluid separation assembly can easily handle such pressure and compression load on, for example, the first tubesheet 154a (see FIGS. 6A-6B), or for example, tubesheets 154g, 154h (see FIG. 16), and thus the fluid separation assembly 100a (see FIG. 5A), 100b (see FIG. 5E), 100c (see FIG. 5I), 100d (see FIG. 16), and methods 200 (see FIG. 13), 300 (see FIG. 14), 400 (see FIG. 15), 500 (see FIG. 20) may reduce or minimize or eliminate pressure loads and bending moments or bending stresses on the tubesheet. The radial feed design thus eliminates the need for the tubesheet to be a pressure boundary. Therefore, the tubesheet will not have bending moments placed on it and will have a longer service life. By reducing or minimizing or eliminating the stresses associated with a pressure boundary, disclosed embodiments of the fluid separation assembly may operate at their most optimum temperature and pressure for a desired application.

Moreover, since the tubesheet is typically the life-limiting component of the fluid separation assembly, by extending the service life of the tubesheet, this may, in turn, extend the service life of the fluid separation assembly. This may result in increased reliability of the fluid separation assembly, and in turn, increased reliability of the transport vehicle, such as an aircraft, reduced maintenance costs of the transport vehicle, and reduced overall weight of the transport vehicle. A benefit of the radial feed design is that the inlet pressure can be increased to reduce the fluid separation assembly or air separation module size and weight without a decrease in the fluid separation assembly or air separation module ASM life, or in other words, the fluid separation assembly or air separation module life can be increased while maintaining the same inlet pressure and therefore the fluid separation assembly or air separation module size and weight.

In addition, the fluid separation assembly 100a (see FIG. 5A), 100b (see FIG. 5E), 100c (see FIG. 5I), 100d (see FIG. 16), and methods 200 (see FIG. 13), 300 (see FIG. 14), 400 (see FIG. 15), 500 (see FIG. 20) provide a radial feed design that increases the efficiency of the plurality of hollow fiber membranes 142 which may produce more non-permeate gas 62 or inert gas, such as nitrogen enriched air (NEA), as the radial feed design may operate at higher temperatures, and higher temperatures may increase the efficiency of the separation of nitrogen and oxygen. The nitrogen enriched air provided by embodiments of the fluid separation assembly 100a (see FIG. 5A), 100b (see FIG. 5E), 100c (see FIG. 5I), 100d (see FIG. 16), and methods 200 (see FIG. 13), 300 (see FIG. 14), 400 (see FIG. 15), 500 (see FIG. 20) of the disclosure may further be supplied to at least one fuel tank 26 (see FIG. 1) of a transport vehicle, such as an aircraft 10 (see FIG. 1).

In particular, the fluid separation assembly 100d (see FIGS. 16-19) and method 500 (see FIG. 20), provide a fluid separation assembly 100d with a center tube radial feed configuration 66 (see FIGS. 16, 19), where the feed gas 60 (see FIG. 16) or feed fluid, such as air or high pressure air, is supplied through the central opening 182 (see FIG. 18) of the tubesheet 154g (see FIGS. 16, 18) and the feed inlet port 114 (see FIGS. 16, 18) extending from the first end cap 110 (see FIG. 19), instead of through the feed inlet port 114 (see FIG. 6A) extending from the upper portion 115 (see FIG. 6A) of the body 108 (see FIG. 6A) of the housing 102 (see FIG. 6A).

In this embodiment, the fluid separation assembly 100d (see FIGS. 16-19) includes radial through openings 162 (see FIGS. 16, 18) comprising center connected radial through openings 162a (see FIG. 18) and partial radial through openings 162b (see FIG. 18). The center connected radial through openings 162a (see FIG. 18) are longer or deeper than the partial radial through openings 162b (see FIG. 18). The center connected radial through openings 162a (see FIG. 18) penetrate or connect to the central opening 182 (see FIG. 18) through the center of the tubesheet 154g (see FIG. 18) and/or tubesheet 154h (see FIG. 16), while the partial radial through openings 162b (see FIG. 18) do not penetrate or connect to the central opening 182 (see FIG. 18) through the center of the tubesheet 154g (see FIG. 18) and/or tubesheet 154h (see FIG. 16).

As discussed in further detail above, with the center tube radial feed configuration 66 (see FIGS. 16, 19) of the fluid separation assembly 100d (see FIGS. 16, 19), the feed gas 60 (see FIGS. 16, 18), or feed fluid, such as air or high pressure air, flows in the feed inlet port 114 (see FIGS. 16, 18) and the central opening 182 (see FIG. 18) of the tubesheet 154g (see FIGS. 16, 18), and then divides and flows through the center connected radial through openings 162a (see FIG. 18). The center connected radial through openings 162a (see FIG. 18) supply the feed gas 60 (see FIG. 18) to the walls 153 (see FIG. 17B) and bores or interiors of the hollow fiber membranes 142 (see FIGS. 17B, 18) that were intersected by the center connected radial through openings 162a (see FIG. 18). A first portion 60a (see FIG. 18) of the feed gas 60 (see FIG. 18) flows into and directly enters a first portion 142a (see FIG. 18) of the plurality of hollow fiber membranes 142 (see FIG. 18).

The feed gas 60 (see FIG. 18) then divides further into opposite directions at the circumference or perimeter 163 (see FIG. 18) of the tubesheet 154g (see FIG. 18) and flows into the channel or area around the circumference or perimeter 163 (see FIG. 18) of the tubesheet 154g (see FIG. 18), until the feed gas 60 (see FIG. 18) reaches the partial radial through openings 162b (see FIG. 18).

A second portion 60b (see FIG. 18) of the feed gas 60 (see FIG. 18) flows around the circumference or perimeter 163 (see FIG. 18) of tubesheet 154g (see FIG. 18) into the partial radial through openings 162b (see FIG. 18) and flows into a second portion 142b (see FIG. 18) of the hollow fiber membranes 142 (see FIG. 18), such as the remaining hollow fiber membranes 142 (see FIG. 18), to supply feed gas 60 (see FIG. 18) to the remaining hollow fiber membranes 142 (see FIG. 18).

An advantage of the center tube radial feed configuration 66 (see FIGS. 16, 19) of the fluid separation assembly 100d (see FIGS. 16, 19) includes a decreased or lower pressure drop 68 (see FIG. 19) and no concentration of high gas flow or fluid flow in any part of the channel or area at the circumference or perimeter 163 (see FIG. 18) of the tubesheet 154g (see FIG. 18), as compared to known fluid separation assembly designs, such as the side port radial feed design (see FIG. 6A). In the side port radial feed design, there is a local area of high gas or fluid flow rate immediately downstream of the side port, where half of the feed gas or feed air has to flow through the narrow channel or area each way around the circumference or perimeter of the tubesheet. With the center tube radial feed configuration 66 (see FIGS. 16, 19), there is no similar concentration of feed gas 60 (see FIG. 18) or feed fluid flow in any part of the channel or area around the circumference or perimeter 163 (see FIG. 18) of the tubesheet 154g (see FIG. 18).

Moreover, the fluid separation assembly 100d (see FIGS. 16-19) and method 500 (see FIG. 20), provide a fluid separation assembly 100d with a center tube radial feed configuration 66 (see FIGS. 16, 19), that does not use the tubesheet or tubesheets as a pressure boundary, and thus eliminates the stresses associated with a pressure boundary, and may further allow the air separation module (ASM) to operate at its most optimum temperature and pressure for a desired application.

In addition, the feed inlet port 114 (see FIG. 16), the permeate outlet port 120 (see FIG. 16), and the non-permeate outlet port 126 (see FIG. 16) of the housing 102 (see FIG. 16) are in similar locations or positions as these ports in certain known gas separation assemblies 30 (see FIG. 2A), such as air separation modules (ASM). This simplifies retrofitting and minimizes interface changes required to replace known gas separation assemblies, such as air separation modules (ASM), with the fluid separation assembly 100d (see FIGS. 16, 19) with the center tube radial feed configuration 66 (see FIGS. 16, 19), disclosed herein.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A fluid separation assembly comprising:
a hollow fiber bundle comprising a plurality of hollow fiber membranes;
a pair of tubesheets, each encapsulating respective ends of the hollow fiber bundle;
a plurality of radial through openings formed along a circumference of one or both of the tubesheets and radially through a body portion in one or both of the tubesheets, the plurality of radial through openings comprising both center connected radial through openings and partial radial through openings both formed along the circumference and through the body portion in one or both of the pair of tubesheets, and the plurality of radial through openings intersecting each, or substantially each, of the hollow fiber membranes; and,
a housing surrounding the hollow fiber bundle and the pair of tubesheets, the housing having a feed inlet port, a permeate outlet port, and a non-permeate outlet port, wherein the feed inlet port and the non-permeate outlet port are in parallel alignment with a longitudinal central axis of the housing,
wherein a feed gas, a permeate gas, or a non-permeate gas are introduced into or removed from the plurality of hollow fiber membranes via the plurality of radial through openings formed in one or both of the tubesheets.

2. The assembly of claim 1, further comprising at least one first seal adjacent one tubesheet of the pair of tubesheets, and at least one second seal adjacent the other tubesheet of the pair of tubesheets, wherein the first and second seals are fluid tight.

3. The assembly of claim 1, wherein the housing further comprises a first end cap coupled to the feed inlet port, and a second end cap coupled to the non-permeate outlet port.

4. The assembly of claim 1, wherein the feed inlet port is in flow communication with the center connected radial through openings, so that a first portion of the feed gas flows into a first portion of the plurality of hollow fiber membranes, and a second portion of the feed gas flows around the circumference of one tubesheet of the pair of tubesheets into the partial radial through openings and flows into a second portion of the plurality of hollow fiber membranes.

5. The assembly of claim 1, wherein the non-permeate outlet port is in flow communication with one of the tubesheets, so that the non-permeate gas can flow out of the plurality of hollow fiber membranes and out of the housing.

6. The assembly of claim 1, wherein the permeate outlet port is in flow communication with an interior of the housing, so that the permeate gas can permeate out of the hollow fiber membranes that have been intersected and flow out of the housing.

7. The assembly of claim 1, wherein one or more of the feed gas, permeate gas, and non-permeate gas are introduced into or removed from the plurality of hollow fiber membranes, and wherein the feed gas comprises air, natural gas, or flue gas; the non-permeate gas comprises nitrogen enriched air (NEA), nitrogen, nitrogen oxide, carbon monoxide, or sulfur oxide; and the permeate gas comprises methane or one or more of oxygen, carbon dioxide, and water.

8. The assembly of claim 1, wherein the partial radial through openings are formed in a repeating four opening pattern, each repeating four opening pattern consisting of four partial radial through openings in a substantially square configuration.

9. The assembly of claim 1, wherein the assembly is part of an inert gas generating system in an aircraft.

10. An aircraft comprising:
a fuselage;
at least one fuel tank mounted to the fuselage;
at least one fuel tank vent operatively connected to the fuel tank; and,
an inert gas generating system for generating a non-permeate gas on board the aircraft, the inert gas generating system comprising:
a fluid separation assembly comprising:
a hollow fiber bundle comprising a plurality of hollow fiber membranes;
a pair of tubesheets, each encapsulating respective ends of the hollow fiber bundle;
a plurality of radial through openings formed along a circumference of one or both of the tubesheets and radially through a body portion in one or both of the tubesheets, the plurality of radial through openings comprising both center connected radial through openings and partial radial through openings both formed along the circumference and through the body portion in one or both of the pair of tubesheets, and the plurality of radial through openings intersecting each, or substantially each, of the hollow fiber membranes; and,
a housing surrounding the hollow fiber bundle and the pair of tubesheets, the housing having a feed inlet port, a permeate outlet port, and a non-permeate outlet port, wherein the feed inlet port and the non-permeate outlet port are in parallel alignment with a longitudinal central axis of the housing,
wherein a feed gas, a permeate gas, or a non-permeate gas are introduced into or removed from the plurality of hollow fiber membranes via the plurality of radial through openings formed in one or both of the tubesheets.

11. The aircraft of claim 10, wherein the feed inlet port of the assembly is in flow communication with the center connected radial through openings, so that a first portion of the feed gas flows into a first portion of the hollow fiber membranes, and a second portion of the feed gas flows around the circumference of one tubesheet of the pair of tubesheets into the partial radial through openings and flows into a second portion of the hollow fiber membranes.

12. The aircraft of claim 10, wherein one or more of the feed gas, permeate gas, and non-permeate gas are introduced into or removed from the plurality of hollow fiber membranes, and wherein the feed gas comprises air, natural gas, or flue gas; the non-permeate gas comprises nitrogen enriched air (NEA), nitrogen, nitrogen oxide, carbon monoxide, or sulfur oxide; and the permeate gas comprises methane or one or more of oxygen, carbon dioxide, and water.

13. The aircraft of claim 10, wherein the partial radial through openings of the assembly are formed in a repeating four opening pattern, each repeating four opening pattern consisting of four partial radial through openings in a substantially square configuration.

14. A method for reducing pressure drop in a fluid separation assembly, the method comprising:
providing a fluid separation assembly comprising:
a hollow fiber bundle consisting of a plurality of hollow fiber membranes;
a pair of tubesheets, each encapsulating respective ends of the hollow fiber bundle;
a housing surrounding the hollow fiber bundle and the pair of tubesheets, the housing having a feed inlet port, a permeate outlet port, and a non-permeate outlet port, wherein the feed inlet port and the non-permeate outlet port are in parallel alignment with a longitudinal central axis of the housing;
forming a plurality of radial through openings along a circumference of one or both of the tubesheets and radially through a body portion in one or both of the tubesheets, such that the plurality of radial through openings intersect each, or substantially each, of the hollow fiber membranes, and wherein the plurality of radial through openings comprise both center connected radial through openings and partial radial through openings both formed along the circumference and through the body portion in one or both of the pair of tubesheets;
introducing a feed gas into the fluid separation assembly via the feed inlet port;
flowing the feed gas through the center connected radial through openings, around the circumference of the one or both tubesheets, and into the partial radial through openings, thereby reducing pressure drop in the fluid separation assembly;
removing a permeate gas from the fluid separation assembly via the permeate outlet port; and,
removing a non-permeate gas from the fluid separation assembly via the non-permeate outlet port.

15. The method of claim 14, further comprising supplying the non-permeate gas from the fluid separation assembly to at least one fuel tank of an aircraft.

16. The method of claim 14, wherein the flowing the feed gas through the center connected radial through openings further comprises flowing a first portion of the feed gas into a first portion of the plurality of hollow fiber membranes.

17. The method of claim 14, wherein the flowing the feed gas around the circumference of one tubesheet of the pair of tubesheets and into the partial radial through openings further comprises flowing a second portion the feed gas into a second portion of the plurality of hollow fiber membranes.

18. The method of claim 14, wherein the forming the plurality of radial through openings along the circumference of one or both of the tubesheets and radially through the body portion in one or both of the tubesheets comprises forming the partial radial through openings in a repeating four opening pattern, each repeating four opening pattern consisting of four partial radial through openings in a substantially square configuration.

19. A method of generating nitrogen enriched air comprising:

forming a plurality of radial through openings in a first tubesheet, by cutting or drilling along a circumference of and radially through a body portion of the first tubesheet, the plurality of radial through openings comprising both center connected radial through openings and partial radial through openings, both formed along the circumference and through the body portion of the first tubesheet;

cutting or drilling the plurality of radial through openings through a first end of a hollow fiber bundle of hollow fiber membranes encapsulated by the first tubesheet;

introducing a feed gas comprising air, radially through the plurality of radial through openings formed in the first tubesheet;

permeating a permeate gas comprising one or more of oxygen, carbon dioxide, and water through walls of the hollow fiber membranes; and, flowing out a non-permeate gas comprising nitrogen enriched air, from an opening of a second tubesheet encapsulating a second end of the hollow fiber bundle of hollow fiber membranes.

20. The method of claim 19, wherein the radial through openings are formed in a repeating four opening pattern, each repeating four opening pattern consisting of four radial through openings in a substantially square configuration.

* * * * *